(12) United States Patent
Braedt et al.

(10) Patent No.: US 12,337,935 B2
(45) Date of Patent: *Jun. 24, 2025

(54) BICYCLE REAR DERAILLEUR AND FRAME CONNECTION

(71) Applicant: SRAM DEUTSCHLAND GmbH, Schweinfurt (DE)

(72) Inventors: Henrik Braedt, Hambach (DE); Sebastian Heyna, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,822

(22) Filed: Oct. 11, 2023

(65) Prior Publication Data
US 2024/0034433 A1 Feb. 1, 2024

Related U.S. Application Data

(63) Continuation of application No. 17/125,027, filed on Dec. 17, 2020, now Pat. No. 11,939,029.

(30) Foreign Application Priority Data

Dec. 18, 2019 (DE) ...................... 10 2019 008 796.8
Dec. 3, 2020 (DE) ...................... 10 2020 132 208.9

(51) Int. Cl.
*B62M 9/125* (2010.01)
*B62M 9/121* (2010.01)
(Continued)

(52) U.S. Cl.
CPC ............ *B62M 9/125* (2013.01); *B62M 9/121* (2013.01); *B62M 2009/12413* (2013.01); *B62M 9/126* (2013.01)

(58) Field of Classification Search
CPC ...... B62M 9/121; B62M 9/125; B62M 9/126; B62M 9/124; B62M 2009/12406; B62K 19/30
See application file for complete search history.

(56) References Cited

U.S. PATENT DOCUMENTS

| 539,727 A | 5/1895 | Cutler |
| 4,504,250 A * | 3/1985 | Juy ...................... B62M 9/1244 474/78 |

(Continued)

FOREIGN PATENT DOCUMENTS

| CN | 1498815 | 5/2004 |
| CN | 101152894 | 4/2008 |

(Continued)

*Primary Examiner* — Henry Y Liu
*Assistant Examiner* — Raveen J Dias

(57) ABSTRACT

A system including a base element of a rear derailleur and a mounting kit is described. The mounting kit has a mounting element for mounting the base element to a bracket portion of a bicycle frame. The first portion of the mounting element has a through hole that is associated and coaxial with the bracket mounting hole. The second portion of the mounting element has a base element mounting hole to which the base element of the rear derailleur is mounted. The mounting kit also has a retaining bolt having an internal thread into which an external thread of a through axle is screwed to fix the mounting element to the bracket portion. The first coupling formation is coupled to an end portion of the retaining bolt. The second coupling formation is radially offset from the first coupling formation and is coupled to the second portion of the mounting element.

17 Claims, 46 Drawing Sheets

(51) Int. Cl.
*B62M 9/124* (2010.01)
*B62M 9/126* (2010.01)

(56) References Cited

U.S. PATENT DOCUMENTS

| | | | | |
|---|---|---|---|---|
| 4,690,663 | A * | 9/1987 | Nagano | B62M 9/125 474/80 |
| 4,789,379 | A * | 12/1988 | Ozaki | B62M 9/1248 474/82 |
| 5,931,753 | A * | 8/1999 | Ichida | B62M 9/125 474/82 |
| 6,015,360 | A * | 1/2000 | Chang | B62M 9/123 474/82 |
| 6,287,228 | B1 * | 9/2001 | Ichida | B62M 25/02 474/82 |
| 7,033,294 | B2 * | 4/2006 | Chamberlain | B62J 13/00 474/80 |
| 7,048,660 | B2 * | 5/2006 | Shahana | B62M 9/125 474/80 |
| 7,090,603 | B2 * | 8/2006 | Shahana | B62M 9/125 474/80 |
| 7,166,048 | B2 * | 1/2007 | Shahana | B62J 23/00 474/82 |
| 7,189,172 | B2 * | 3/2007 | Shahana | B62M 9/125 474/80 |
| 7,207,914 | B2 * | 4/2007 | Chamberlain | B62M 9/128 474/144 |
| 7,614,972 | B2 * | 11/2009 | Oseto | B62M 9/1244 474/82 |
| 7,666,111 | B2 * | 2/2010 | Shahana | B62M 9/125 474/83 |
| 7,703,785 | B2 | 4/2010 | Colegrove | |
| 7,824,285 | B2 * | 11/2010 | Tan | B62M 9/127 474/82 |
| 7,905,804 | B2 * | 3/2011 | Yamaguchi | B62M 9/125 474/80 |
| 8,419,573 | B2 * | 4/2013 | Yamaguchi | B62M 9/126 267/155 |
| 8,491,427 | B2 | 7/2013 | Gratz | |
| 8,899,606 | B2 * | 12/2014 | Cocalis | B62K 19/24 280/281.1 |
| 9,227,465 | B2 * | 1/2016 | Nakajima | B60B 27/026 |
| 9,308,961 | B2 * | 4/2016 | McDonald | B62K 25/02 |
| 9,334,016 | B2 * | 5/2016 | Shahana | B62M 9/121 |
| 9,545,971 | B2 | 1/2017 | Beutner | |
| 10,427,747 | B2 * | 10/2019 | Choi | B62K 19/34 |
| 10,870,464 | B2 * | 12/2020 | Braedt | B62M 9/125 |
| 10,981,626 | B2 * | 4/2021 | Braedt | B62M 9/12 |
| 11,230,350 | B2 * | 1/2022 | Braedt | B62M 9/121 |
| 11,401,006 | B2 * | 8/2022 | Braedt | B62M 9/124 |
| 11,661,142 | B2 * | 5/2023 | Braedt | B62M 9/126 474/82 |
| 11,667,349 | B2 * | 6/2023 | Tsai, Jr | B62M 9/126 474/80 |
| 11,713,096 | B2 * | 8/2023 | Braedt | B62M 9/126 474/82 |
| 11,939,029 | B2 * | 3/2024 | Braedt | B62M 9/125 |
| 2003/0171176 | A1 * | 9/2003 | Shahana | B62M 9/125 474/82 |
| 2004/0110586 | A1 * | 6/2004 | Shahana | B62J 23/00 474/80 |
| 2004/0110587 | A1 * | 6/2004 | Shahana | B62J 23/00 474/82 |
| 2004/0116222 | A1 * | 6/2004 | Shahana | B62M 9/125 474/82 |
| 2004/0177713 | A1 * | 9/2004 | Shahana | B62M 9/125 74/473.14 |
| 2004/0254038 | A1 * | 12/2004 | Chamberlain | B62M 9/128 474/82 |
| 2006/0172831 | A1 * | 8/2006 | Wen | B62M 9/128 474/82 |
| 2006/0189424 | A1 * | 8/2006 | Chamberlain | B62M 9/12 474/82 |
| 2006/0194660 | A1 * | 8/2006 | Shahana | B62M 9/1244 474/82 |
| 2007/0021246 | A1 * | 1/2007 | Shahana | B62M 9/126 474/82 |
| 2007/0021248 | A1 * | 1/2007 | Shahana | B62M 9/16 474/83 |
| 2007/0026985 | A1 * | 2/2007 | Yamaguchi | B62M 9/127 474/82 |
| 2007/0191160 | A1 * | 8/2007 | Chamberlain | B62J 23/00 474/82 |
| 2008/0051237 | A1 * | 2/2008 | Shahana | B62M 9/1244 474/82 |
| 2008/0064544 | A1 * | 3/2008 | Yamaguchi | B62M 9/125 474/82 |
| 2008/0081716 | A1 * | 4/2008 | Watarai | B62M 9/125 474/80 |
| 2008/0153639 | A1 * | 6/2008 | Tan | B62M 9/1244 474/80 |
| 2010/0137082 | A1 * | 6/2010 | Gratz | B60B 5/02 474/78 |
| 2013/0241175 | A1 | 9/2013 | Talavasek | |
| 2014/0018199 | A1 * | 1/2014 | Shahana | B62M 9/126 474/82 |
| 2014/0306512 | A1 * | 10/2014 | Nakajima | B60B 35/004 301/132 |
| 2016/0039494 | A1 * | 2/2016 | Mikesell | B62K 3/02 474/82 |
| 2017/0334518 | A1 | 11/2017 | Bortoli | |
| 2018/0050758 | A1 | 2/2018 | Pfeiffer | |
| 2018/0265169 | A1 * | 9/2018 | Braedt | B62M 9/1242 |
| 2019/0016411 | A1 | 1/2019 | Ueda | |
| 2019/0291818 | A1 * | 9/2019 | Braedt | B62M 9/12 |
| 2019/0322333 | A1 * | 10/2019 | Braedt | B62M 9/121 |
| 2020/0062343 | A1 * | 2/2020 | Braedt | B62M 9/124 |
| 2020/0198728 | A1 * | 6/2020 | Braedt | B62M 9/125 |
| 2020/0255090 | A1 * | 8/2020 | Chiang | B62M 9/125 |
| 2020/0298933 | A1 * | 9/2020 | Braedt | B62M 9/125 |
| 2020/0339220 | A1 * | 10/2020 | Boehm | B62M 9/122 |
| 2021/0070395 | A1 * | 3/2021 | Braedt | B62M 9/127 |
| 2021/0188396 | A1 * | 6/2021 | Braedt | B62K 25/02 |
| 2021/0339822 | A1 * | 11/2021 | Roman | B62K 25/286 |
| 2021/0371047 | A1 * | 12/2021 | Tsai | B62M 9/125 |
| 2022/0177075 | A1 * | 6/2022 | Braedt | B62M 9/125 |
| 2022/0204134 | A1 * | 6/2022 | Shahana | B62M 9/124 |
| 2022/0204135 | A1 * | 6/2022 | Shahana | B62M 9/128 |
| 2022/0363339 | A1 * | 11/2022 | Braedt | B62M 9/125 |
| 2022/0411017 | A1 * | 12/2022 | Braedt | B62M 9/125 |
| 2023/0102982 | A1 * | 3/2023 | Liao | B62M 9/126 474/80 |
| 2023/0106097 | A1 * | 4/2023 | Braedt | B62K 25/02 474/82 |
| 2024/0092457 | A1 * | 3/2024 | Boehm | B62M 9/122 |

FOREIGN PATENT DOCUMENTS

| | | |
|---|---|---|
| CN | 103282219 | 9/2013 |
| CN | 104002919 | 8/2014 |
| CN | 104648604 | 5/2015 |
| CN | 109803880 | 5/2019 |
| DE | 102008064057 | 6/2013 |
| DE | 102018001253 | 9/2018 |
| DE | 102018206104 | 10/2019 |
| DE | 102018222834 | 6/2020 |
| DE | 102020201229 | 9/2020 |
| EP | 2557029 | 2/2013 |
| EP | 2594473 | 5/2013 |
| EP | 2982587 | 2/2016 |
| EP | 3095684 | 11/2016 |
| EP | 3187402 | 7/2017 |
| EP | 3187406 | 7/2017 |
| EP | 3388324 | 10/2018 |
| EP | 3556643 | 10/2019 |
| EP | 3556647 | 10/2019 |
| EP | 3670315 | 6/2020 |
| EP | 3712052 | 9/2020 |
| ES | 2693614 | 12/2018 |
| GB | 722363 | 1/1955 |

(56) References Cited

FOREIGN PATENT DOCUMENTS

| | | |
|---|---|---|
| TW | 201441087 | 11/2014 |
| TW | 201902779 | 1/2019 |
| TW | 201945244 | 12/2019 |
| WO | 9910224 | 3/1999 |

* cited by examiner

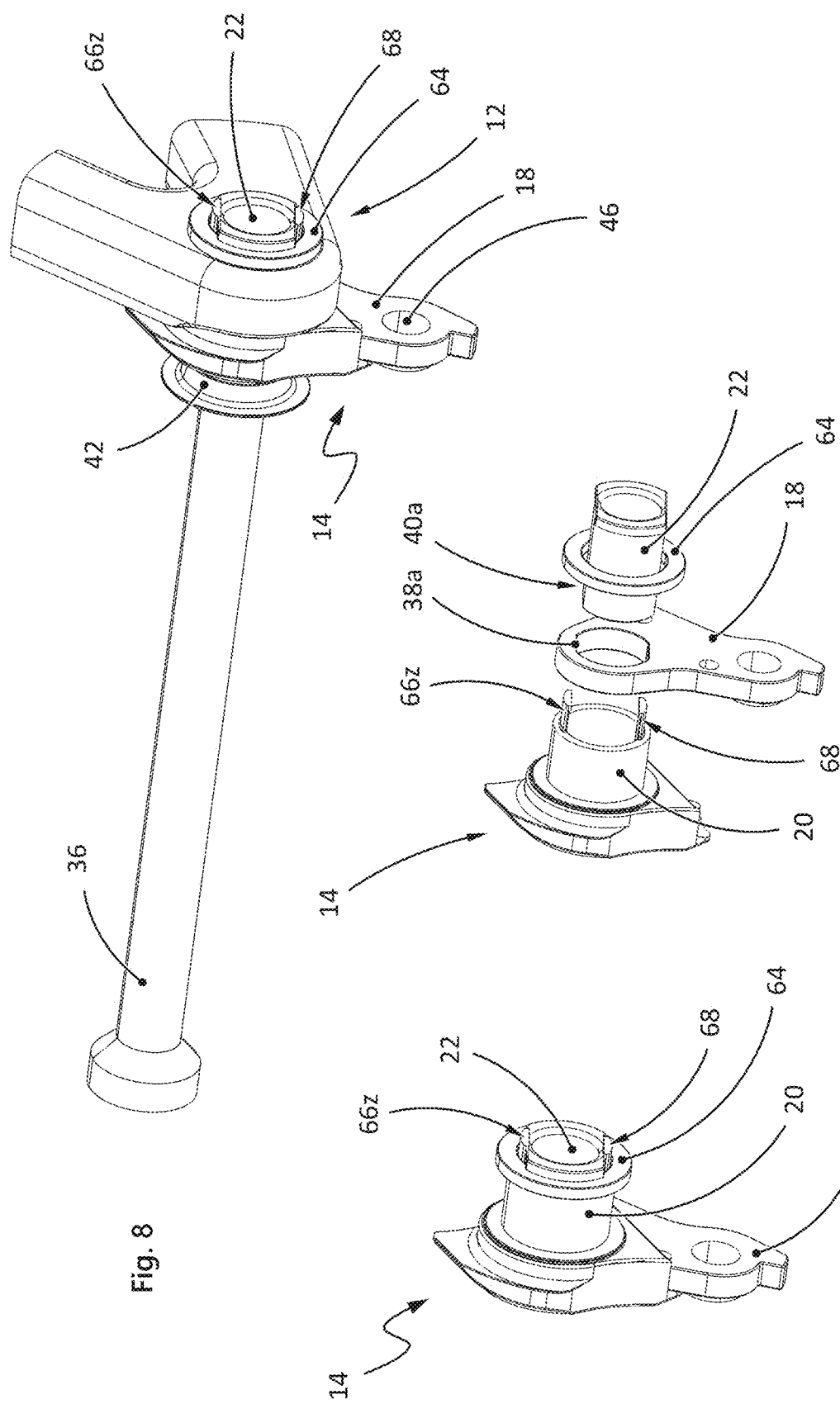

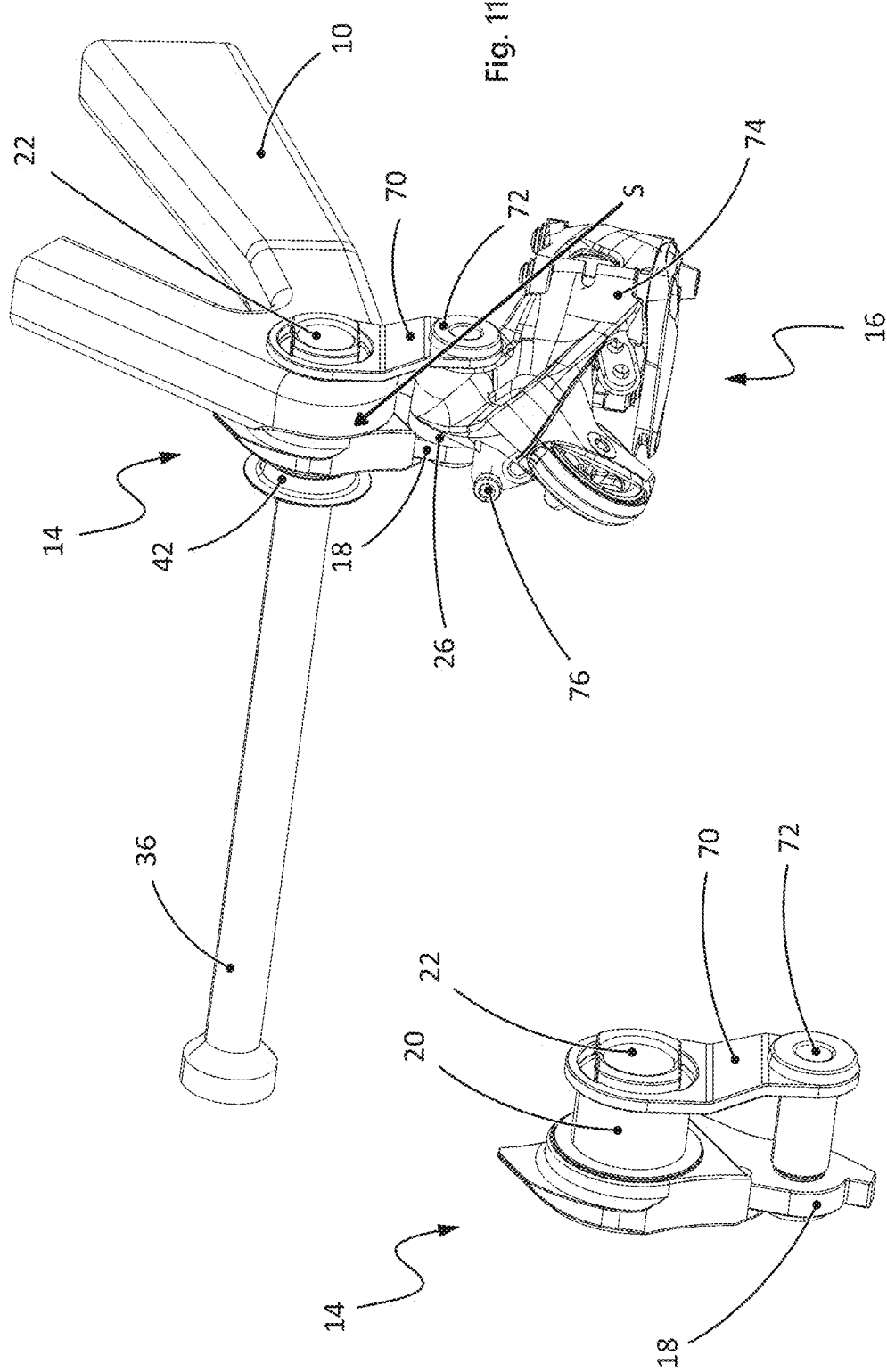

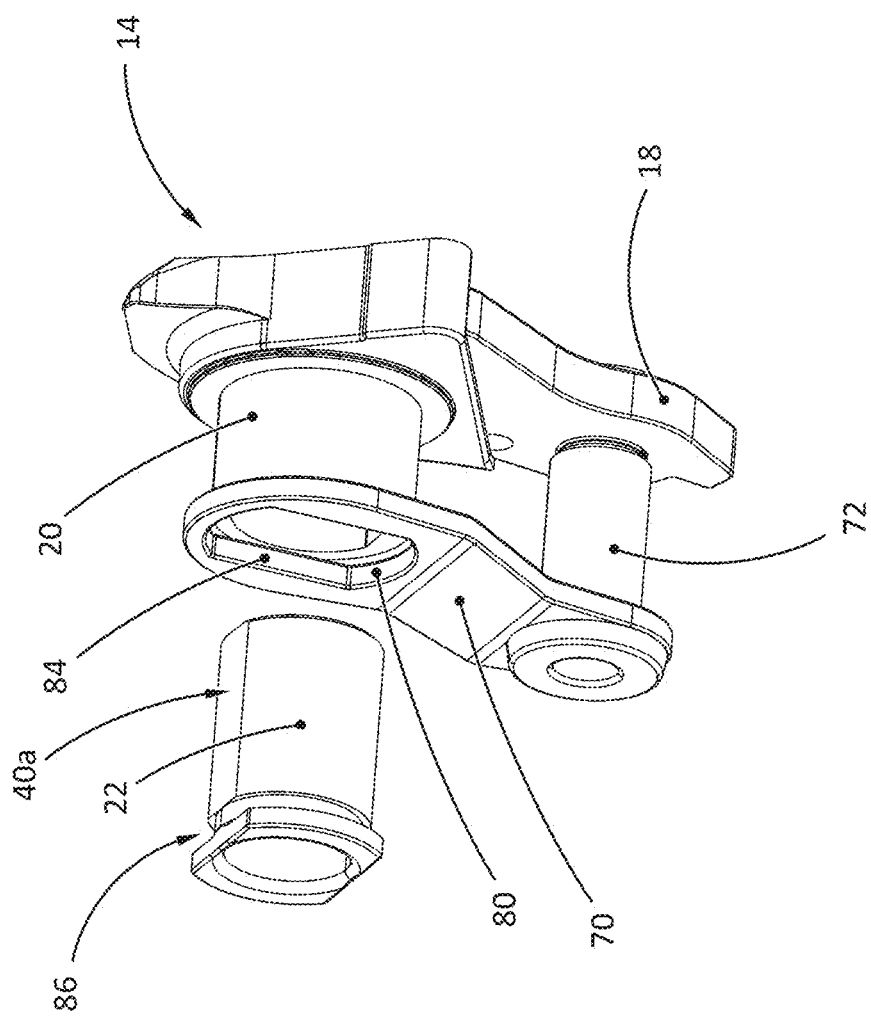

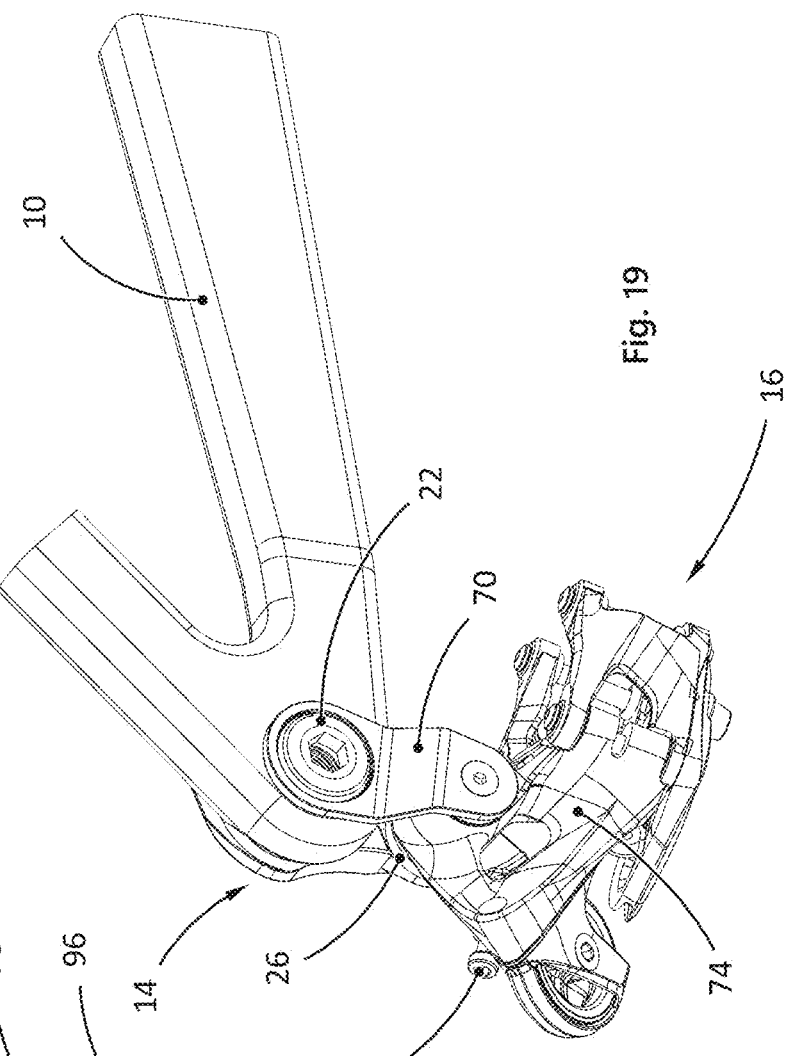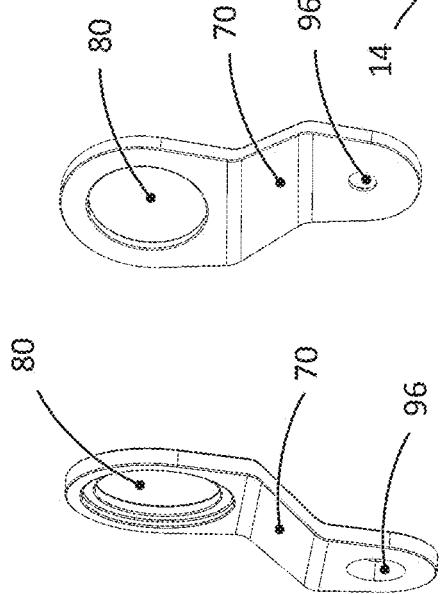

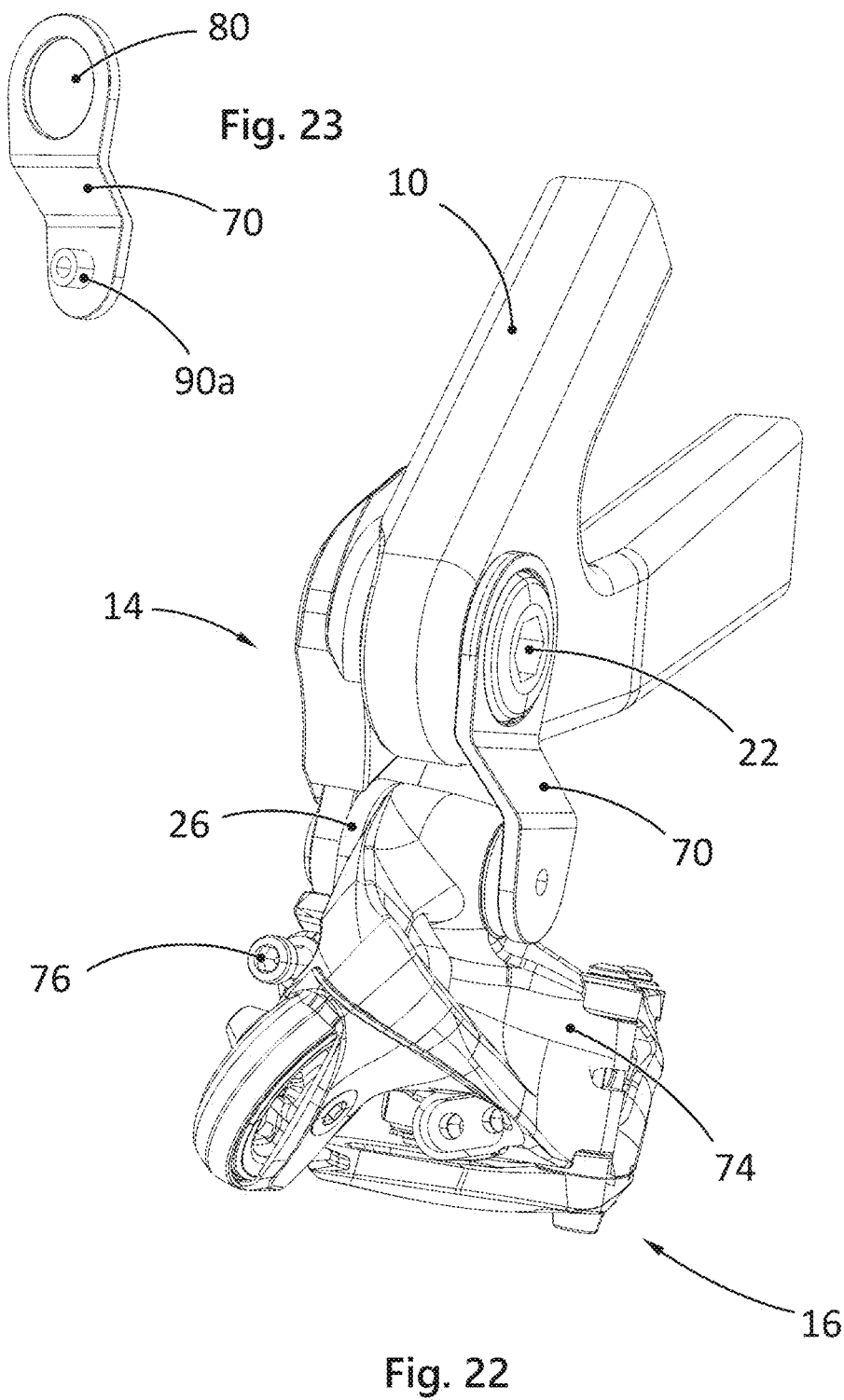

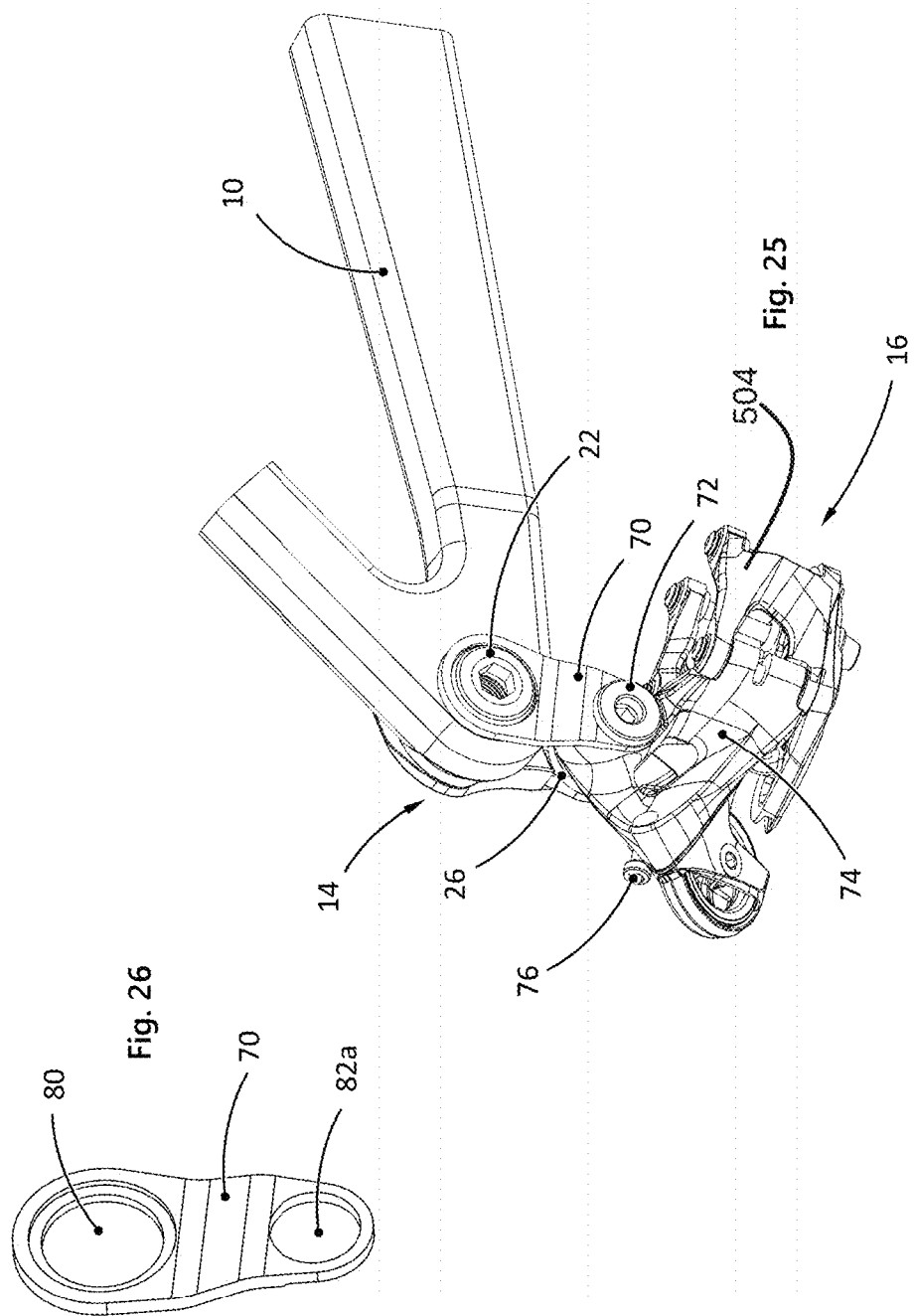

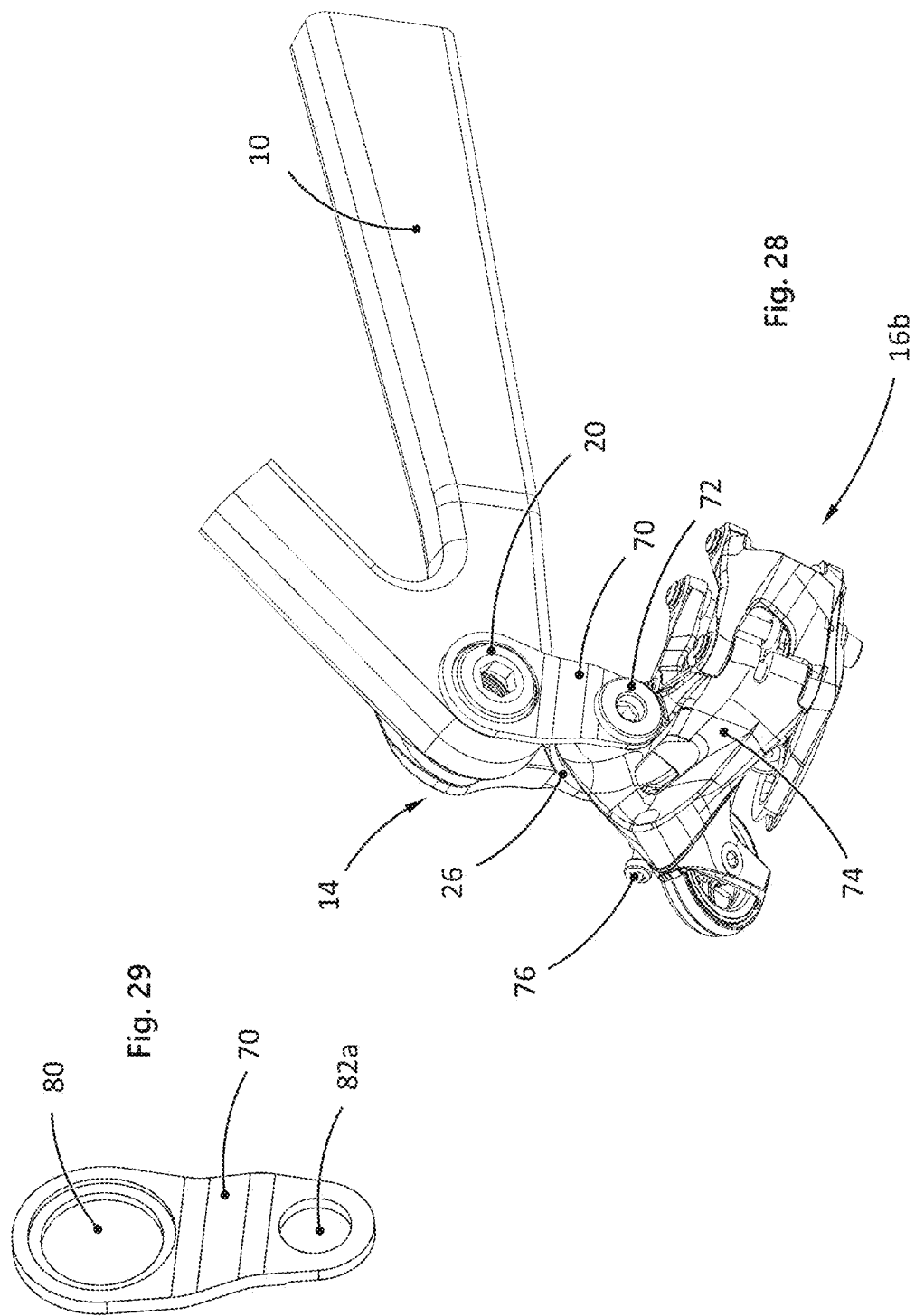

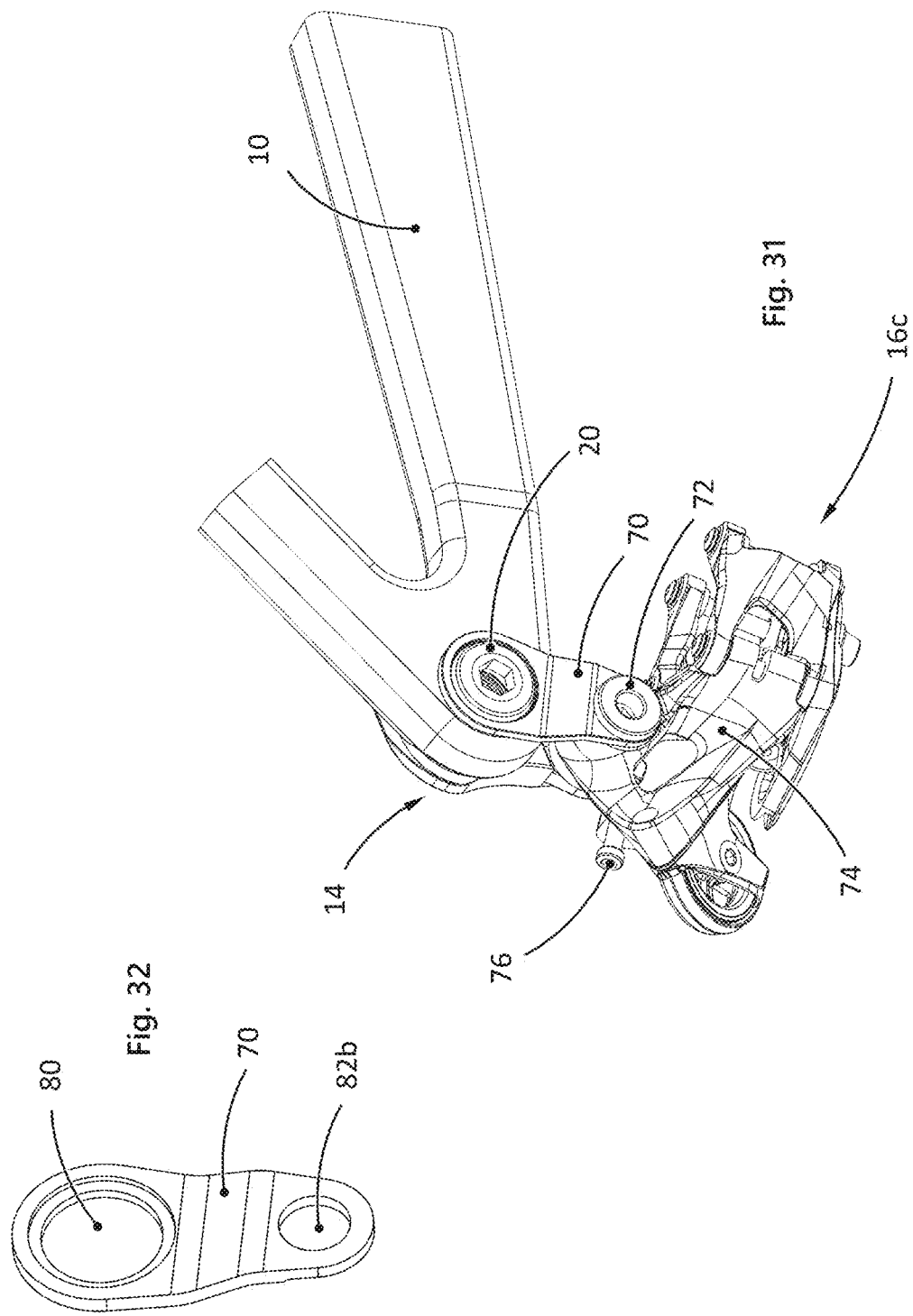

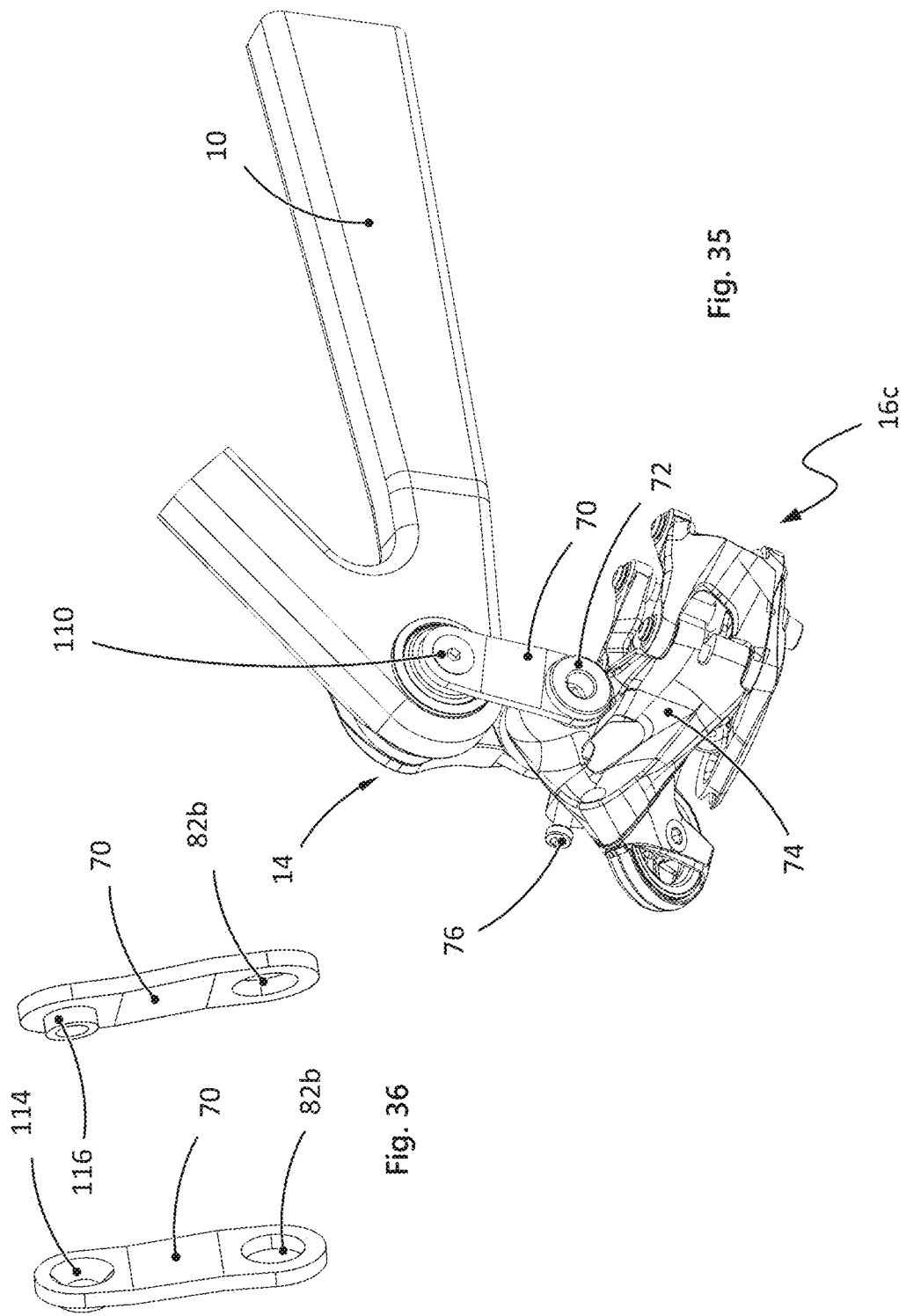

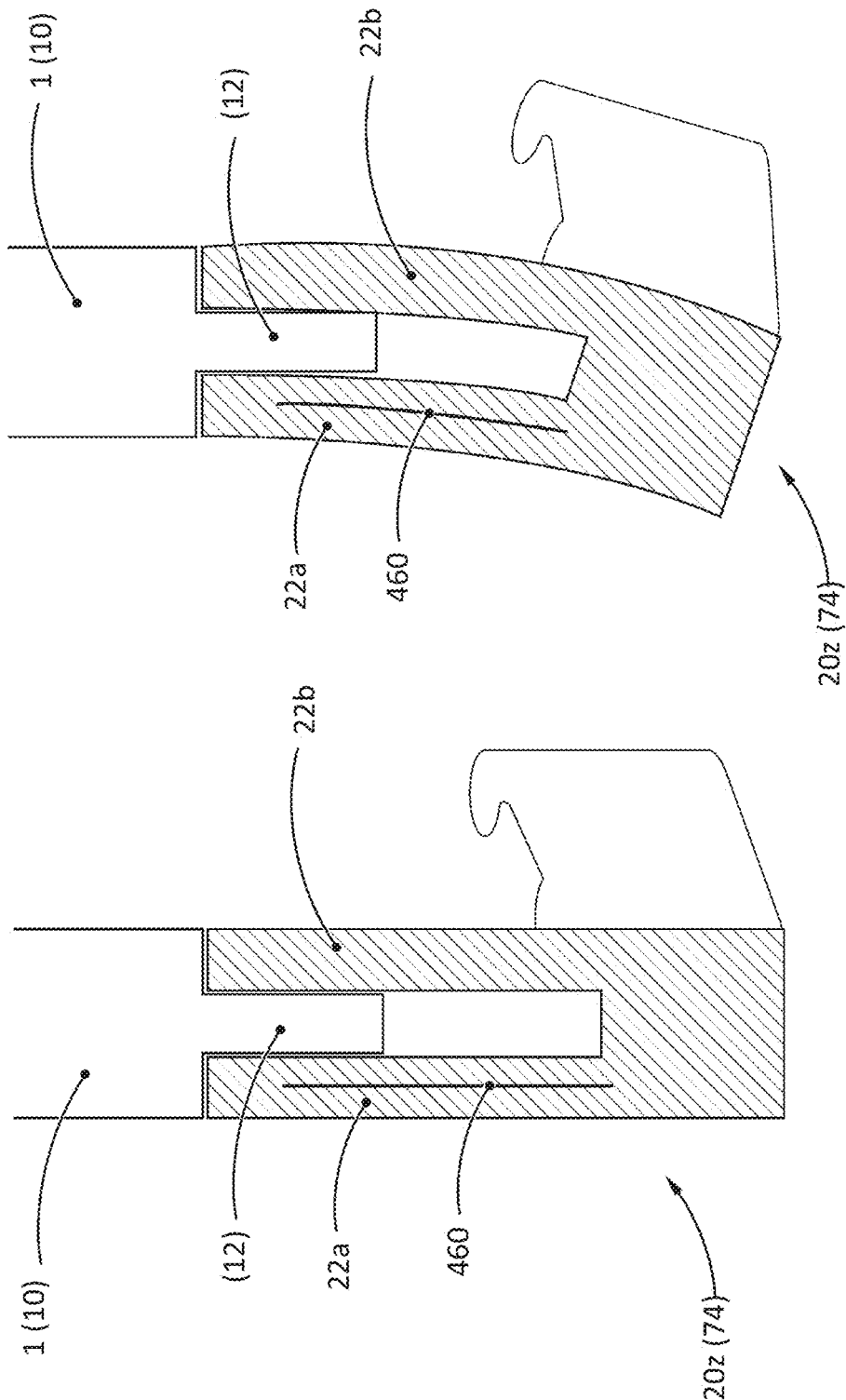

BICYCLE REAR DERAILLEUR AND FRAME CONNECTION

PRIORITY

This application is a continuation of U.S. patent application Ser. No. 17/125,027, filed on Dec. 17, 2020, which claims priority to, and/or the benefit of, German patent application DE 10 2019 008 796.8, filed on Dec. 18, 2019 and 10 2020 132 208.9, filed on Dec. 3, 2020, the contents of which are included by reference herein in their entirety.

BACKGROUND

A bicycle can be equipped with a drive system, such as a chain drive. Bicycle drive assemblies can be used to transmit torque from a rider to a rear wheel to drive the bicycle. For example, a drive assembly can transmit torque from a front chainring or sprocket assembly through a chain to a rear chain wheel or sprocket, such as a sprocket of a sprocket cassette or sprocket set, to drive a rear wheel. Such a drive arrangement can be called a drive train.

Chain wheel assemblies for bicycles can have one or more individual chain wheels. The front chain wheels are generally referred to as chainrings. Chainrings can be attached using a variety of mounting devices. For example, a chainring can be fastened with chainring bolts or mounted directly to the crank of a bicycle. The rear chain wheels are often called sprockets. A number of rear chain wheels or sprockets can be referred to as a cassette, sprocket cassette or sprocket set. Such a cassette is typically configured to be attached to a freewheel section of a rear sprocket. For example, a cassette can be attached to a freewheel body of a rear wheel using a spline and/or thread connection.

The alignment of a front chainring assembly with a rear sprocket cassette affects the performance of the chain. For example, a front chainring assembly may have a single chainring aligned with a specific sprocket of the rear sprocket cassette. When the chain connects the single chainring to this substantially aligned single rear sprocket, the chain is under little or no lateral load. However, when the chain is moved laterally to another sprocket of the cassette, e.g. by a rear derailleur of a chain drivetrain assembly, the chain will experience some lateral load. Corresponding lateral loads on the chain occur when the front chainring assembly has multiple chainrings between which the chain is moved by a front derailleur of the chain drivetrain.

For a good performance of such a chain drivetrain, the functionality and performance of the rear derailleur is of particular importance. The rear derailleur is not only used to perform shifting operations by moving the chain between several adjacent sprockets of the bicycle's sprocket set. Another very important function of the rear derailleur is to ensure sufficient chain tension.

Traditionally, rear derailleurs were mounted on the right drop-out of the frame by means of a derailleur hanger that was separate from or associated with the frame, specifically radially offset from the rear axle and therefore non-coaxial with respect to the rear axle.

The derailleur hanger is fixed to the frame coaxially with the rear wheel axle at one end and connected to the base element (B-Knuckle) of the rear derailleur at its other end. The base element is typically rotatable around the B-axis relative to the derailleur hanger. Rear derailleur hangers vary greatly depending on the frame manufacturer and the type of mounting. They can be formed in one piece with the frame or be a separate component. Separate derailleur hangers can either be clamped to the frame by means of quick-release axles or thru axles and/or additionally be bolted to the frame. Clamping on the outside of the frame or on the inside of the frame is possible. This can cause the rear derailleur to take up a different position relative to the rear wheel axle and also to the sprocket set, depending on the derailleur hanger used. These differences in position in axial and radial direction make the rear derailleur design and its assembly complicated. The rear derailleur must be readjusted depending on the derailleur hanger bracket. Due to the additional derailleur hanger, tolerances are added which have a negative effect on the positioning accuracy of the rear derailleur.

In addition, derailleur hangers, especially as separate components, are prone to damage and often unstable. With large sprocket sets and correspondingly large rear derailleur dimensions, increased lever forces occur which cannot be adequately absorbed by an exchangeable derailleur hanger. Furthermore, the increased rear derailleur dimensions with the extended lever ratios have an additional negative effect on the positioning accuracy of the rear derailleur. This is in conflict with the fact that an increased number of closely spaced pinions requires increased positioning accuracy.

SUMMARY

In an embodiment, a mounting set includes a mounting element with an associated retaining bolt adapted to be mounted to a mounting section of a bicycle frame, said mounting element being further adapted to mount a rear derailleur of a derailleur system to said mounting section. The mounting element includes a first section having a through opening which is associated with a mounting opening of the mounting section and is coaxial therewith in the state of the mounting element being mounted on an inner side of the mounting section; a second section having a mounting hole by means of which a base element of the rear derailleur can be mounted or is mounted on an outside of the second section; an insertion sheath integral with or attached to the first section and projecting axially in front of the first section, which is insertable or inserted into the mounting opening of the mounting section from the inside of the mounting section and into which the retaining bolt is insertable or inserted from an outside of the mounting section, and which has a passage connected to the through opening. The insertion sheath with the retaining bolt inserted thereinto can be or is brought into a form-fit retaining engagement supporting axial forces between the retaining bolt and the insertion sheath to retain the mounting element and the retaining bolt on the mounting section, and the retaining bolt is formed with an internal thread into which an external thread at a free end of a thru axle of a rear wheel axle assembly of the bicycle passing through the through opening of the first section is screwable or screwed to fix the mounting element with the retaining bolt to the mounting section.

BRIEF DESCRIPTION OF DRAWINGS

FIG. 8 shows a perspective exploded view of the derailleur hanger, the UDH sleeve and the UDH pin of a third embodiment as shown in FIG. 2.

FIG. 9 shows the components of FIG. 10 in a view corresponding to FIG. 2 in a view as shown in FIG. 2 without the dropout of the bicycle frame.

FIG. 10 shows the UDH sleeve and the UDH bolt of the third type together with a mounting element in a kind of perspective exploded view.

FIG. 11 shows the derailleur hanger, the UDH sleeve and the UDH bolt of a fourth embodiment together with an associated locking element which also serves as a reinforcing element.

FIG. 12 shows the derailleur hanger, the UDH sleeve and the UDH bolt together with the reinforcing element in a condition mounted to each other without further FIG. 11 recognizable elements of the overall arrangement.

FIG. 13 shows the components of FIG. 12 in a perspective view and in an exploded view of the UDH pin.

FIG. 19 shows the derailleur hanger, the UDH sleeve and the UDH bolt together with a reinforcing element according to a sixth embodiment in a state mounted to the bicycle frame.

FIG. 20 shows the reinforcing element of the sixth embodiment in two alternative views.

FIG. 22 shows the derailleur hanger, the UDH-sleeve and the UDH-bolt together with a reinforcing element according to a seventh embodiment in a state mounted on the bicycle frame.

FIG. 23 shows the reinforcing element of the seventh type in a single view.

FIG. 25 shows the derailleur hanger, the UDH-sleeve and the UDH-bolt together with a reinforcing element according to an eighth embodiment in a state mounted on the bicycle frame.

FIG. 26 shows the reinforcing element of the eighth type in a single view.

FIG. 28 shows the derailleur hanger, the UDH-sleeve and the UDH-bolt together with a reinforcing element according to a ninth embodiment in a state mounted on the bicycle frame.

FIG. 29 shows the reinforcing element of the ninth embodiment in a single view.

FIG. 31 shows the derailleur hanger, the UDH-sleeve and the UDH-bolt together with a reinforcing element according to a tenth embodiment in a state mounted on the bicycle frame.

FIG. 32 shows the reinforcing element of the tenth type in a single view.

FIG. 35 shows the derailleur hanger, the UDH-sleeve and the UDH-bolt together with a reinforcing element according to an eleventh embodiment in a state mounted to the bicycle frame.

FIG. 36 shows the reinforcing element of the eleventh type in two alternative views.

FIG. 59 schematically shows a design of the two-armed base element, which can be advantageously provided in the embodiments of FIGS. 26, 27 and 28.

FIG. 60 explains the function of this design according to FIG. 59.

Other aspects and advantages of the embodiments disclosed herein will become apparent upon consideration of the following detailed description, wherein similar or identical structures have similar reference numerals.

DETAILED DESCRIPTION

Figure 1:
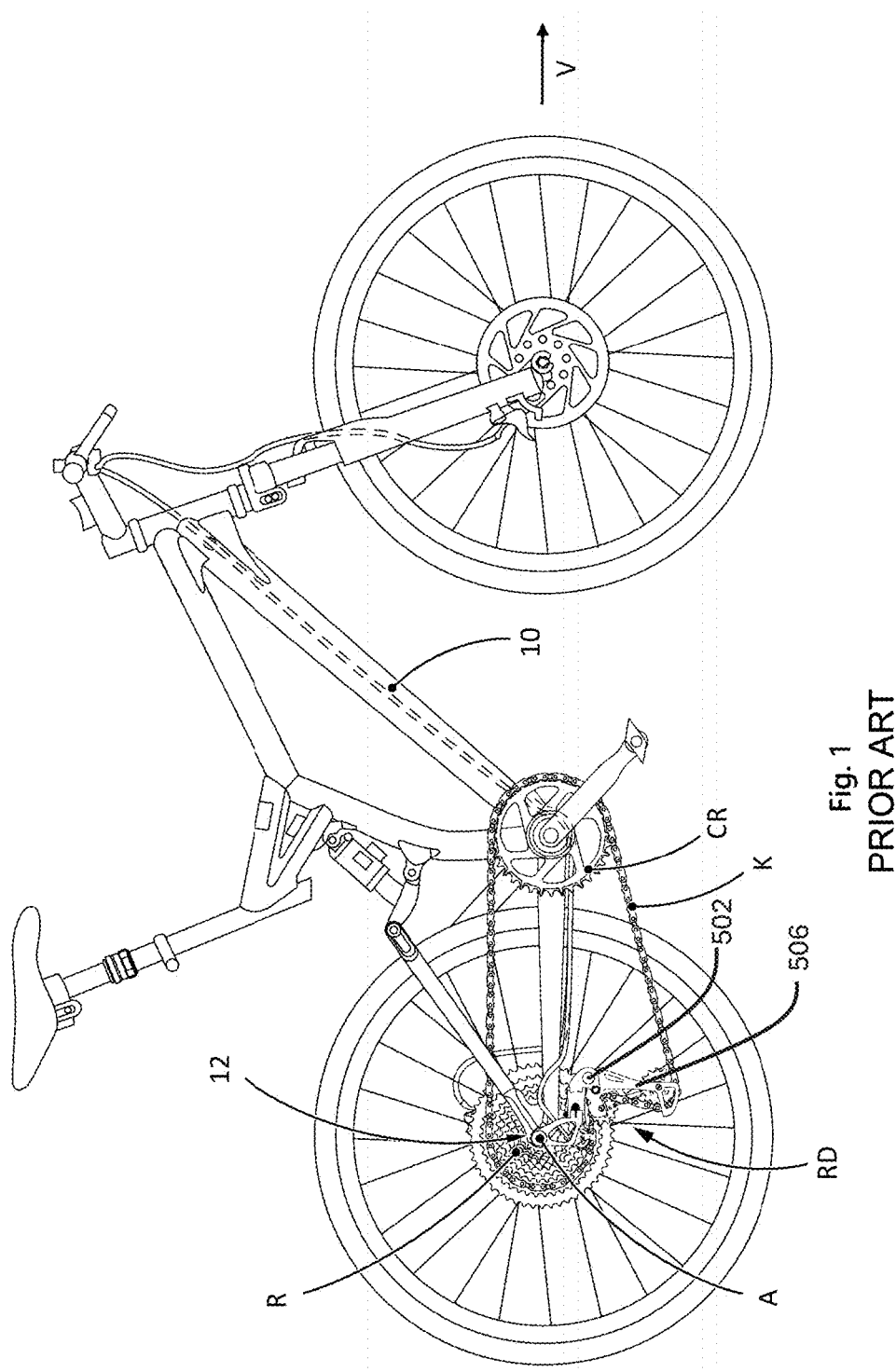
FIG. 1 shows an exemplary bicycle with an embodiment of a rear derailleur of a type A) derailleur system of the bicycle.

A rear derailleur regularly has the following structure. There is a base element, also known as the B-Knuckle, which is used to mount the front derailleur on the bicycle. Furthermore, there is a movable element, also known as the P-Knuckle, which is movably coupled to the base element, and a chain guide, regularly configured as a chain cage, which is movably coupled to the movable element for rotation relative to an axis of rotation. The movable element is movable in a lateral (axial) direction to move the chain guide along the sprockets of the sprocket set so that the chain can be transferred from an initial sprocket to a target sprocket. The chain guide is elastically pretensioned by a tension spring or the like in one direction of rotation, namely in the direction of tension of the bicycle chain guided by the chain guide, in order to keep the chain in the tensioned state, or to restore the tensioned state after a previous state of insufficient chain tension. This rotation or pivoting direction is also referred to herein as "chain tensioning direction". A rotation of the chain guide in this direction increases the chain tension and simultaneously reduces the tension of the tension spring acting on the chain guide.

Depending on the current sprocket of the sprocket set with which the chain engages at a given time, the chain guide will assume different swivel positions relative to the moving element with respect to the axis of rotation.

Effects on the chain and the guidance of the chain result not only from the shifting of derailleur system by moving the chain between different sprockets of the sprocket set, but also from the driving operation itself. For example, when riding on uneven terrain, the rear derailleur and chain are exposed to shocks and vibrations which can affect the chain guide in a pivoting direction opposite to the "chain tensioning direction". A rotation of the chain guide in this direction opposite to the "chain tensioning direction" will increase the tension of the tensioning spring acting on the chain guide and will directly lead to a reduction of the chain tension (e.g. if a direct action on the chain guide will twist it in this direction) or at least to a considerable risk of a subsequent reduction of the chain tension below the necessary level. Negative consequences may be a drop in chain tension with undesired play or "slackening" of the chain, in extreme cases even up to a chain jumping off the sprocket set.

For a good performance of such a derailleur system, the correct positioning and alignment of the rear derailleur on the bicycle frame is also very important. It has been recognized that coaxial alignment features can be applied to the drive arrangement. For example, a single component can be used as a reference for the alignment of various other components of the drive assembly. For example, both a rear derailleur and a cassette can be aligned or mounted coaxially to an axle. Aligning a powertrain component, such as the rear derailleur, with the axle can reduce inaccuracies in various configurations due to tolerance variations in the wheels or frame. Coaxial alignment of the rear derailleur with the wheel axle or sprocket cassette can also facilitate uniform radial spacing between parts of the rear derailleur and cassette across different angles of rotation of the rear derailleur.

The drive arrangement can also be configured for stiffness in order to increase precision or/and improve the relative alignment of components. For example, relevant components and elements of the rear derailleur, the rear wheel axle assembly with the rear wheel hub and the rear wheel sprocket cassette and the associated frame interfaces of the rear of the bicycle frame can be configured in relation to one another in such a way that, on the one hand, the rear derailleur is positioned and mounted correctly relative to the sprocket cassette and the chain running over it on the frame reliably and to a maximally acceptable extent depending on tolerances, and, on the other hand, good rigidity is achieved, so that this correct positioning is also achieved in riding operation despite any possible misalignment between the rear wheel hub and the sprocket cassette. This ensures that this correct positioning is maintained even when the bike is in operation, despite larger and changing loads depending on the surface on which the bike is being ridden.

In this way, an appropriately matched configuration of the so-called B-Knuckle (or base element) of a rear derailleur, i.e. that sub-component of a rear derailleur which is mounted on an associated frame interface, the rear frame of the bicycle and especially its frame interfaces, on which the rear wheel axle assembly of the rear wheel and the rear derailleur are mounted, and the rear axle assembly is possible, in order to meet requirements under the aforementioned objectives of correct positioning and alignment, precision and rigidity.

Important other requirements and characteristics of a rear derailleur, whether or not it is configured with a damping device, concern its dimensions, tolerance chains, a pivot bearing of the chain cage achieving a defined movability of the chain cage relative to the moving element (P-Knuckle), impermeability, robustness, operational safety, and installation and maintenance.

In view of this technical background, the present invention generally relates to a rear derailleur of a bicycle derailleur system and the manner of mounting the rear derailleur in relation to a rear wheel axle on a bicycle frame, and thus also a bicycle frame having a suitable frame interface for the rear derailleur.

A new type of rear derailleur for coaxial assembly in relation to the rear wheel axle on a correspondingly designed bicycle frame is presented, to which pending patent applications are directed.

For this purpose, the bicycle frame has a special interface for the so-called coaxial mounting of a special rear derailleur, which also serves as a frame interface for the rear axle arrangement on one axial side of the frame with the help of a frame adapter of the rear derailleur. Furthermore, this frame interface, including the base element (B-Knuckle) and frame adapter, and the frame interface on the other axial frame side for the rear axle arrangement on the one hand, and the rear axle arrangement on the other hand, are configured for the first time in this new type of rear derailleur in a particularly suitable way in relation to each other. This not only overcomes the disadvantages mentioned above, but also provides sufficient or even very good rigidity of the rear derailleur at its frame interface. Thus, the objectives of correct positioning, alignment and precision mentioned above can be reliably met.

Reference can be made to the following Prior Art: From EP 3 388 324 A2 (hereinafter abbreviated as EP'324) and DE 10 2018 001 253 A1 (hereinafter abbreviated as DE'253) a bicycle rear derailleur for coaxial mounting relative to a bicycle rear axle is known. Further solutions for a coaxial rear derailleur connection are known from EP 3 712 052 A1 (hereinafter abbreviated as EP'052) and DE 10 2020 201 229 A1 (hereinafter abbreviated as DE'229).

In order to be able to alternatively mount also conventional rear derailleurs on a bicycle frame with this special frame interface in view of these advantages, the applicant SRAM Deutschland GmbH has developed suitable adapters in the form of special derailleur hangers, which are referred to as "hangers" in the English technical language, and which are also referred to herein as mounting elements according to their function.

In this regard, reference can be made to the following Prior Art: From EP 3 556 643 A1 (hereinafter abbreviated as EP'643) and DE 10 2018 206 104 A1 (hereinafter abbreviated as DE'104) as well as from EP 3 670 315 A2 (hereinafter abbreviated as EP'315) and DE 10 2018 222 834.5 (hereinafter abbreviated as DE'834) such special derailleur hangers are known for mounting rear derailleurs to the above-mentioned special bicycle frames in different variants.

In EP'324, as shown in detail in FIGS. 5 to 8, an adapter or axle bolt 60z is screwed to a right drop-out or frame eye of the rear of a bicycle frame in such a way that the adapter nut 66 belonging to axle bolt 60 (also referred to there as a knurled washer or stop washer) obtains a defined rotational angular position relative to the frame eye by means of its knurling on its face by positive or frictional contact with the inside of the right frame eye.

By means of this defined rotatory angular position of the adapter nut 66, a corresponding rotatory swivel position of the rear derailleur relative to the bicycle rear axle or relative to the drop-out, respectively, can be set and fixed by stopping the base element (so-called B-Knuckle) of the rear derailleur at rotatory stop projections 68a/b of the adapter nut 66 (see FIG. 8 of EP'324). This provides the bicycle chain with the desired or, respectively, required chain tension for optimum shifting function by means of the torsion spring usually arranged between P-Knuckle and chain cage (see e.g. FIG. 3 of EP'324).

A sequence of this setting procedure for establishing the desired chain tension or the so-called chain gap (distance between upper chain guide roller and reference sprocket) required for this purpose is described in EP'324, in particular in paragraphs [0088] to [0095], with reference to FIGS. 10 to 12.

DE'834 describes universal derailleur hangers (so called Universal Derailleur Hanger, hereinafter abbreviated as UDH) for mounting conventional derailleurs on bicycle rear derailleurs.

Based on the aforementioned Prior Art, the present disclosure provides, inter alia, alternative solutions for connecting bicycle derailleurs to the frame eye or dropouts of a bicycle frame rear triangle. Preferred embodiments of these alternative solutions are shown in the attached figures and described below.

According to an independent first aspect, a mounting set comprising a mounting element with an associated retaining bolt adapted to be mounted to a mounting section of a bicycle frame, the mounting element further adapted to mount a rear derailleur system rear derailleur to the mounting section, wherein the mounting element comprises a first section having a through opening which is associated with a mounting opening of the mounting section and is coaxial with a mounting opening of the mounting section when the mounting element is mounted on an inner side of the mounting section;

a second section having a mounting hole through which a base element of the rear derailleur can be mounted or is mounted on an outside of the second section;

an insertion sheath integral with or attached to the first section and projecting axially in front of the first section, which can be inserted or is inserted into the mounting opening of the mounting section from the inside of the mounting section and into which the retaining bolt can be inserted or is inserted from an outside of the mounting section and has a passage opening adjoining the passage opening;

wherein the insertion sheath with the retaining bolt inserted thereinto is or can be brought into an axial force-supporting positive retaining engagement between the retaining bolt and the insertion sheath in order to retain the retaining member and the retaining bolt on the mounting section;

and wherein said retaining bolt is formed with an internal thread into which an external thread at a free end of a through hole of the first section of a thru axle of a rear wheel axle assembly of the bicycle is screwable or screwed to fix the mounting element with the retaining bolt to the mounting section.

According to an embodiment, the mounting set is characterized in that at least one element of the insertion sheath and the retaining bolt is provided with at least one engagement formation which is adapted to produce, together with at least one counter-engaging element separate from the insertion sheath and the retaining bolt or a counter-engaging formation of the respective other element of the insertion sheath and the retaining bolt, an elastic snap-in retaining connection or a bayonet-type retaining lock which realizes the positive retaining engagement. It may be provided that the at least one engagement formation and the at least one counter-engagement formation produce the elastic snap-in retaining connection or the bayonet-type retaining lock with the interaction of the at least one counter-engagement element (if such an element is provided). However, a direct engagement between the at least one engagement formation and the at least one counter-engagement formation is also possible without participation of a separate counter-engagement element.

This makes it much easier to pre-assemble the insertion sheath with the retaining bolt on the frame.

It is further proposed that the retaining bolt is configured with a non-rotationally symmetrical insertion section or with at least one driving formation on the insertion section, which engages in a rotationally fixed manner either with the complementary-designed or designed with at least one counter-driving formation passage opening, or in the complementary-designed or designed with at least one counter-driving formation passage of the mounting element.

It is preferable that the through opening and the mounting opening are made in a metal tab-shaped area of the mounting element and that a plastic area of the mounting element has the insertion sheath.

It can be advantageously provided that at least one elastic ring member, preferably at least one O-ring, is provided as a mating engagement member, which is receivable or receivable between an inner circumferential portion of one of the insertion sheath and the retaining bolt and an outer circumferential portion of the other of the insertion sheath and the retaining bolt, respectively, at least one of the insertion sheath and the retaining bolt being attached to the inner circumferential portion and the outer circumferential portion of the other of the insertion sheath and the retaining bolt, respectively. Wherein at least one of said introducer sheath and said retaining bolt is configured at said inner peripheral portion and outer peripheral portion, respectively, with an engagement formation into which said ring member can be snapped or is snapped to establish said positive retaining engagement.

It is further proposed that the insertion sheath has the engagement formation on an outer peripheral portion on an end portion protruding outwardly from the mounting opening of the mounting section, that the retaining bolt is configured on a free end portion protruding outwardly from the mounting opening of the mounting section with a flange portion protruding in the direction of the mounting section, which has a further engagement formation on an inner circumferential region, and that the ring element can snap or is snapped into the two engagement formations to produce the positive retaining engagement.

A particularly advantageous embodiment is characterized in that the insertion sheath has the counter-engaging formation on an inner circumferential region, which can snap or is snapped into the engaging formation on an outer circumferential region of the retaining bolt to produce the positive retaining engagement, or in that the retaining bolt has the counter-engaging formation on an outer circumferential region, which can snap or is snapped into the engaging formation on an inner circumferential region of the insertion sheath to produce the positive retaining engagement.

It may be convenient to provide that the engagement formation and the counter-engaging formation are provided at an end portion of the insertion sheath or the retaining bolt, respectively, that protrudes outwardly from the mounting opening of the mounting section.

Another advantageous embodiment is characterized by the fact that the insertion sheath has at least one axially projecting snap-in element at an end region projecting outwardly from the mounting opening of the retaining section, which is designed to snap in and embrace the outside of an outside end region of the retaining bolt to establish the positive retaining engagement with a radially inwardly projecting embracing section.

According to another advantageous embodiment, it is provided that the retaining bolt is configured at an end region projecting outwardly from the mounting opening of the mounting section with at least one engagement formation which can be positively locked or interlocked with at least one counter-engaging formation of the counter-engaging element separate from the insertion sheath and the retaining bolt by a relative rotation in order to produce the bayonet-type retaining interlock which realizes the positive retaining engagement.

Further, it is proposed that the retaining bolt has at least one flange-like radially projecting locking portion as at least one first engagement formation and at least one recess or groove on an outer peripheral portion of the retaining bolt as at least one second engagement formation, and the mating engagement element has a locking opening complementary to the at least one locking portion as a common mating engagement element for the first and second engagement formations.

It can be provided that in a first relative rotational position the counter-engaging element can be pushed or slid with the locking opening onto or off the outwardly projecting end region of the retaining bolt and can be locked or interlocked with the counter-engaging element by rotation from the first relative rotational position into at least one second relative rotational position serving as a locking rotational position, wherein, in the locking rotary position, the at least one locking portion engages around a portion of the counter-engaging element delimiting the locking opening and an edge portion of the counter-engaging element delimiting the locking opening engages positively with the recess or groove of the retaining bolt.

It is further proposed that the counter-engaging element is configured as an additional auxiliary mounting element which has a first portion having the counter-engaging formation and a second portion having a coupling formation, the coupling formation being radially offset from the counter-engaging formation and being couplable or coupled to a counter-coupling formation of the base element of the rear derailleur or to a mounting bolt mounting the base element on the mounting element by means of the mounting opening.

According to an independent second aspect, a mounting set comprising a mounting element with an associated retaining bolt adapted to be mounted to a mounting section of a bicycle frame, said mounting element further adapted to mount a rear derailleur system rear derailleur to said mounting section, wherein the mounting element comprises:
a first portion having a through opening associated with a mounting opening of the mounting portion and coaxial with an inner side of the mounting section when the mounting element is mounted on an inner side of the mounting section;
a second portion having a mounting opening through which a base element of the rear derailleur is mountable or mounted on an outside of the second portion;
an insertion sheath integral with or attached to the first section and projecting axially from the first section, which is insertable or inserted into the mounting opening of the mounting section from the inner side of the mounting section, and into which the retaining bolt is insertable or inserted from an outer side of the mounting section, and which has a passage connected to the passage opening;
wherein the insertion sheath with the retaining bolt inserted thereinto is or is brought into a positive retaining engagement supporting axial forces between the retaining bolt and the insertion sheath to hold the mounting element and the retaining bolt to the mounting section;
and wherein the retaining bolt is configured with an internal thread into which an external thread at a free end of a thru-hole of a rear wheel axle assembly of the bicycle is screwable or engaged to fix the mounting element with the retaining bolt to the mounting section.

In accordance with an embodiment, the mounting set is provided with an additional auxiliary mounting element comprising a first section having a first coupling formation and a second section having a second coupling formation, wherein the first coupling formation is couplable or coupled to an end portion of the retaining bolt protruding outwardly from the mounting opening of the mounting section, and wherein the second coupling formation is radially offset from the first coupling formation and is coupled or is couplable to a counter-coupling formation of the base element of the rear derailleur or to a mounting bolt mounting the base element on the mounting element by means of the mounting opening.

A significant stiffening of the rear derailleur base element and thus of the rear derailleur itself at the dropout is achieved by means of the mounting element and by means of the auxiliary mounting element. According to this proposed solution, the stiffness achieved approaches known solutions with a two-arm coaxial connection of the base element, as discussed at the beginning. Thus, corresponding advantages are achieved respectively can be achieved also for conventional rear derailleurs of the mentioned type.

The embodiment according to the second aspect can be combined with the embodiment and training proposals according to the first aspect of the invention.

It can be expediently provided that the through-hole and the mounting opening are configured in a tab-shaped area of the mounting element made of metal and that an area of the mounting element made of plastic has the insertion sheath.

With respect to the auxiliary mounting element, it is proposed that the auxiliary mounting element comprises a tab-shaped metal element having the first portion and the second portion of the auxiliary mounting element.

It is convenient to provide that at least one of the first coupling formation and the second coupling formation is configured as an opening through which the retaining bolt and the mounting bolt are passable or passed, respectively.

It can also be provided that the retaining bolt or the mounting bolt, respectively, has at least one flange section which externally surrounds an edge of the opening.

It is further suggested that a bearing bush is or can be accommodated in a passage of the base element associated with the mounting bolt, which supports axial clamping forces of the tightened mounting bolt in order to provide for a pivoting of the base element relative to the mounting element and the auxiliary mounting element.

Alternatively, provide that the base element is axially dimensioned in the area of a passageway associated with the mounting bolt so that axial clamping forces of the tightened mounting bolt act on the base element.

In another advantageous embodiment, inter alia, it is provided that at least one of the first coupling formation and the second coupling formation is configured as an axially protruding coupling projection which can be or is inserted axially into an associated coupling opening of the retaining bolt, respectively, the mounting bolt or the base element serving as counter-coupling formation.

It is further suggested that the coupling projection inserted into the coupling opening of the mounting bolt has a screw opening into which a fastening screw is screwable or screwed from the side of the second section of the mounting element through the mounting opening there.

A generally advantageous solution is characterized by the fact that at least one of the first coupling formation and the second coupling formation is configured as an opening through which a fastening screw is passable or passed, respectively, which is screwable or screwed into a fastening screw opening of the retaining bolt or the mounting bolt or the base element or a threaded insert received in the retaining bolt or the mounting bolt or the base element.

According to an independent third aspect, a mounting set comprising a mounting element with an associated retaining bolt adapted to be mounted to a mounting section of a bicycle frame, said mounting element further adapted to mount a rear derailleur system rear derailleur to said mounting section,
wherein the mounting element comprises:
a first portion having a through opening associated with a mounting opening of the mounting section and coaxial with an inner side of the mounting section when the mounting element is mounted on an inner side of the mounting section;
a second portion having a mounting opening through which a base element of the rear derailleur is mountable or mounted on an outside of the second portion;
and wherein the retaining bolt is configured with an internal thread into which an external thread on a free end of a thru-hole of a rear wheel axle assembly of the bicycle passing through the through hole of the first section is screwable or screwed to fix the mounting element with the retaining bolt to the mounting section.

According to an embodiment, it is provided that the mounting element is configured with an adjusting device having at least one manually operable adjusting screw, with which the mounting element or at least its second section can be pivoted in a chain tensioning direction relative to the quick-release axle in a chain tensioning direction at least in a premounted state on the mounting section of the bicycle frame.

This configuration makes it easier to adjust the chain tension without the rear derailleur itself requiring a corresponding adjustment device.

The embodiment according to the third aspect can be combined with the embodiment and further training proposals according to the first aspect and/or with the embodiment and further training proposals according to the second aspect.

It can be advantageous to provide that the mounting element has a screw-through opening into which the adjusting screw is screwable or screwed in order to support itself and thus the mounting element on an associated support formation of the bicycle frame.

According to an independent fourth aspect, a combination of a base element of a rear derailleur system and a mounting set. The mounting set comprises a mounting element with an associated retaining bolt adapted to be mounted to a mounting section of a bicycle frame. The mounting element is further adapted to mount the base element to the mounting section, wherein the mounting element comprises
a first section having a through opening associated with a mounting opening of the mounting section and coaxial with an inner side of the mounting section when the mounting element is mounted on an inner side of the mounting section;
a second portion having a mounting opening through which a base element of the rear derailleur is mountable or mounted on an outside of the second portion.

The retaining bolt is configured with an internal thread into which an external thread on a free end of a thru-hole of a rear wheel axle assembly of the bicycle is screwable or screwed to fix the mounting element with the retaining bolt to the mounting section.

In accordance with an embodiment, the base element is provided with a first section having a first coupling formation and a second section having a second coupling formation, wherein the first coupling formation is couplable or coupled to an end portion of the retaining bolt protruding outwardly from the mounting opening of the mounting section, and wherein the second coupling formation is radially offset from the first coupling formation and is couplable or coupled directly or indirectly to the second section of the mounting element using the mounting opening thereof.

In a similar manner to the auxiliary mounting element according to the second aspect, a stiffer connection of the base element and thus of the entire derailleur to the bicycle frame is achieved, which approximates the known coaxial connection by means of a two-armed base element.

The embodiment according to the fourth aspect can be combined with the embodiment and further training proposals according to the first aspect or/and with the embodiment and further training proposals according to the second aspect or/and with the embodiment and further training proposals according to the third aspect.

Thus, it can be provided that the mounting element is configured with an adjusting device having at least one manually operable adjusting screw with which the mounting element or at least its second section can be pivoted in a chain tensioning direction relative to the quick-release axle at least in a premounted state on the mounting section of the bicycle frame.

Alternatively, the base element itself can be designed in such a way that the chain of the derailleur system can be easily tensioned, for which solution proposals are given below.

It should be noted that a mounting bolt can be used to mount the base element by means of the mounting opening on the mounting element.

It can be advantageous to configure at least one of the first coupling formation and the second coupling formation as a through-hole, through which the retaining bolt or a mounting bolt, respectively, is passable or passed.

It can be provided that a bearing bushing is received or can be received in the through opening of the base element associated with the mounting bolt, which supports axial clamping forces of the tightened mounting bolt in order to provide a pivotability of the base element relative to the mounting element. Alternatively, the base element can be clamped relative to the mounting element.

In general, the retaining bolt or mounting bolt, respectively, may be provided with at least one flange section externally surrounding an edge of the through-hole.

In view of the aforementioned adjustability of the chain tension, it is further proposed that at least one of the first coupling formation and the second coupling formation be configured as a through opening in the form of an elongated hole, through which the retaining bolt or a mounting bolt, respectively, is passable or passed and which, at least in a pre-assembled state, allows the base element to be pivoted relative to the mounting element.

It is generally suggested that the first coupling formation or the second coupling formation is configured as an axially protruding coupling protrusion which can be or is inserted axially into an associated coupling opening of the retaining bolt or a mounting bolt(s), respectively, serving as counter-coupling formation.

It is generally suggested that at least one of the first coupling formation and the second coupling formation is configured as a through opening through which a fastening screw is passable or passed, respectively, which is screwable or screwed into a fastening screw opening of the retaining bolt or a mounting bolt or a threaded insert received in the retaining bolt or mounting bolt, respectively.

It can be further provided that at least one of the first coupling formation and the second coupling formation is configured as a through-opening in the form of an elongated hole, through which the fastening screw can be passed or is passed, respectively, and which, at least in a pre-assembled state, allows the base element to be pivoted relative to the mounting element.

There are various possibilities for the concrete realization of the base element and the combination of the mounting element and the base element. For example, it is considered that between the mounting element and the base element a spacer is provided which is separate from the latter or that the base element is configured with a spacer section projecting axially to the mounting element, whereby the spacer or spacer section is configured with a passage through which the mounting bolt extends.

The combination may further comprise a rear derailleur which, in addition to the base element, also includes a pivot mechanism, a movable element and a chain guide assembly. In the usual manner, the pivot mechanism can connect the base element to the moving element, and the chain guide assembly can be connected to the moving element for rotation about an axis of rotation.

After an independent fifth aspect, an embodiment also generally provides a rear derailleur for mounting on a bicycle frame of a bicycle. This rear derailleur features:
a base element,
a swivel mechanism,
a movable element, and
a chain guide arrangement;
said pivot mechanism connecting said base element to said movable element, and said chain guide assembly being rotatably connected to said movable element about a rotational axis.

In accordance with an embodiment, the base element is provided with a first portion having a first coupling formation and a second portion having a second coupling formation, of which the first coupling formation is couplable or coupled to a counter-coupling formation coaxial with an axis of rotation of a rear wheel on the bicycle frame or to a coupling element held on the bicycle frame and forms a first support point for direct or indirect support on the outside of the bicycle frame, and of which the second coupling formation is radially offset relative to the axis of rotation and forms a second support point for direct or indirect support on the bicycle frame.

In this respect, it is important to remember that the second coupling formation is used for direct or indirect support on the inside of the bicycle frame.

Particular consideration is given to the fact that the rear derailleur has a base element after the fifth aspect, as contained in the combination according to the fourth aspect. The rear derailleur after the fifth aspect is thus closely related in content to the combination after the fourth aspect. The embodiment and further training proposals according to the fourth aspect can thus be combined with the embodiment and further training proposals according to the fourth aspect.

The embodiment and further education proposals according to the fourth and fifth aspect can be combined with the embodiment and further education proposals according to the first aspect and/or with the embodiment and further education proposals according to the second aspect and/or with the embodiment and further education proposals according to the third aspect. In this respect, it is considered that the second coupling formation can be supported or is supported by means of a mounting element on the inside of the bicycle frame, which has the characteristics of the mounting element or the combination, respectively, according to the previously treated aspects.

According to an independent sixth aspect, a rear derailleur for coaxial mounting with respect to a rear wheel axle on a bicycle having a bicycle frame:
- a base element,
- a swivel mechanism,
- a movable element, and
- a chain guide arrangement;
- said pivot mechanism connecting said base element to said movable element, and said chain guide assembly being rotatably connected to said movable element about a rotational axis;
- said base element comprising a first connection end for coaxial mounting to the bicycle frame with respect to the rear wheel axle and a second connection end for coupling to the pivot mechanism;
- said first connection end comprising a first arm and a second arm axially spaced apart and adapted for mounting said derailleur to an associated mounting section of a rear end of said bicycle frame having a through mounting opening by means of an associated adapter, said adapter having a thread for making a threaded connection;
- and wherein, in a defined premounted state and in a fully assembled state, the first arm is on an axially inner side of the mounting section and the second arm is on an axially outer side of the mounting section.

In accordance with an embodiment, it is provided that the second arm has a coupling formation which is or is directly or indirectly engageable with a counter-coupling formation of the adapter premounted to the mounting section or, after positioning of the two arms, to be inserted or pushed into the through mounting opening on both sides of the mounting section from the axial inner side of the mounting section.

After this solution, a particularly simple assembly or pre-assembly of the two-armed base element on the frame is made possible, respectively.

In addition, it is suggested that the coupling formation is configured as an axially protruding coupling projection which can be engaged or stands in a coupling opening configured as a retaining bolt in the adapter configured as a counter-coupling formation.

According to an alternative embodiment, it is intended that the coupling formation is designed as an opening into which a section of the adapter configured as a retaining bolt, which in the mounted state protrudes from the mounting section and serves as a counter-coupling formation, can be or stands in engagement.

Another possibility is, inter alia, that the coupling formation is configured as an opening through which a fastening screw can be passed or is passed, respectively, which is screwable or screwed into a fastening screw opening of the adapter configured as a retaining bolt.

It is generally suggested that the adapter configured as a retaining bolt is inserted or pushed into the through mounting opening from the axial inside of the mounting section and is axially fixable or fixed on the axial outside of the mounting section by an associated securing element.

It is useful to provide that the base element is configured with an adjusting device having at least one manually operable adjusting screw with which the base element can be pivoted in a chain tensioning direction in at least one of the premounted state and the completely mounted state relative to at least one of the adapter and the mounting section coaxially to the rear wheel axle.

In this respect, it is further proposed that the adjusting screw be supported or braced against a support formation of the bicycle frame by means of a ring part, which is to be positioned or positioned coaxially to the through mounting opening and in the completely mounted state encloses a thru axle screwed into the thread of the adapter.

In accordance with an independent seventh aspect, a rear derailleur for coaxial mounting with respect to a rear axle on a bicycle frame of a bicycle which has
- a base element,
- a swivel mechanism,
- a movable element, and
- a chain guide arrangement;
- said pivot mechanism connecting said base element to said movable element, and said chain guide assembly being rotatably connected to said movable element about a rotational axis;
- said base element comprising a first connection end for coaxial mounting to the bicycle frame with respect to the rear wheel axle and a second connection end for coupling to the pivot mechanism;
- said first connection end comprising a first arm and a second arm axially spaced apart and adapted for mounting said derailleur to an associated mounting section of a rear end of said bicycle frame having a through mounting opening by means of an associated adapter, said adapter having a thread for making a threaded connection;
- and wherein in a mounted state the first arm is on an axially inner side of the mounting section and the second arm is on an axially outer side of the mounting section.

In accordance with an embodiment, it is provided that the base member has a shock overload protection in at least one of the arms or in a portion of the base member having the arms or an intermediate portion of the base member between a portion of the base member having the arms and a portion of the base member equipped with the pivoting mechanism, which is adapted to respond to a load force exceeding a triggering threshold as a result of a direct or indirect impact on the base element, in order to release an avoidance movement of a portion of the base element equipped with the pivoting mechanism.

This reliably prevents initial damage to the base element or to other parts of the rear derailleur.

The embodiment proposal according to the seventh aspect can be combined with the embodiment proposals according to the sixth aspect of the embodiment and can be applied to the embodiment and embodiment proposals and the embodiments of DE 10 2018 001 253 A1 and DE 10 2020 201 229 A1.

With regard to the concrete realization of the shock-overload protection there are basically many possibilities. It is specifically proposed that the shock overload protection is characterized by at least one of the following features:
- the shock-overload protection comprises at least one element made of reversibly bendable material;
- the shock-overload protection comprises at least one renewable predetermined breaking element;
- the shock-overload protection comprises at least one joint;
- the shock-overload protection comprises at least one snap or latch connection;
- the shock overload protection comprises at least one coupling;
- the shock overload protection comprises at least one marking which facilitates the recognition of a desired positioning or orientation or a desired straightness property;
- the shock overload safety device acts between a first base element part which comprises the two arms and a second base element part which is separate from the first base element part and which in the normal state is held positively on the first base element part under participation of the shock overload safety device and can be released by the shock overload safety device in the case of the load force exceeding the tripping threshold to detach from the first base element part.

The invention is explained in more detail in the following on the basis of exemplary embodiments shown in the figures, which only serve as non-restrictive examples.

In the following description of the invention as well as in some cases in relation to the associated figures, respectively. location and direction indications used such as "left", "right", "front", "rear", "top", "bottom" etc. correspond to the rider's perspective on a bicycle. The direction "inboard" used here is equivalent to "from the left".

FIG. 1 shows an example of a bicycle with a standard bicycle drive. The bicycle drive consists of a front chain wheel CR, a rear chainring or sprocket set R and a chain K, which can be moved from one sprocket to the next by means of the rear derailleur RD. The directions right/left and front/rear used in the following refer to a bicycle in driving direction V, i.e. they correspond to the rider's perspective on the bicycle. The bicycle frame 10 typically has a left and a right rear dropout or frame eye, between which the rear wheel is mounted. The rear wheel rotates around the rear wheel axle A together with the sprocket set R. Axial refers to the rear wheel axis A or the rotational axis A of the multiple sprocket set R or a direction parallel to it. The largest sprocket is axially further inward than the smaller sprockets. The teeth are arranged radially outward of the pinions. The rear derailleur has a so-called base element (B-Knuckle), which is mounted on the bicycle frame, more precisely on its right dropout. A so-called moving element 502 (P-Knuckle or movable member), on which a chain cage (e.g., chain guide 506) is pivoted around a rotating shaft, is connected to the base element via a pivoting mechanism. The swivel mechanism (e.g., swivel mechanism 504) of the rear derailleur can be configured as an oblique parallelogram.

The rear derailleur RD of type A) shown here is mounted to the right-hand dropout 12 of the frame without using a separate derailleur hanger. The base element (B-Knuckle) of the rear derailleur is configured for coaxial mounting to the dropout along the A axis of rotation by means of an inner and outer arm or arm section of the base element, which are fixed to the dropout on the inside and outside of the dropout, as known from the disclosure document DE 2018 001 253 A1 and the corresponding documents EP 3 388 324 A2 and US 2018/0265169 A1 and as known from the disclosure document DE 10 2020 201 229 A1 and the corresponding documents EP 3 712 052 A1 and US 2020/0298933 A1.

Such a circuit arrangement offers many advantages, as can be seen from this patent literature, which is based on the present applicant, and which is fully included in the disclosure of the present description by reference. For example, when the rear derailleur is mounted, the two arms of the base element spaced apart from each other ensure stable alignment of the rear derailleur parallel to the plane of rotation of the sprockets and thus perpendicular to the rear wheel axle. A tilting of the rear derailleur out of this plane is effectively prevented even under higher forces. The two axially spaced fastening points of the base element on the rear wheel axle can absorb the forces acting on the rear derailleur much better than conventional rear derailleurs with only one fastening end.

However, the improved solution compared to conventional rear derailleurs with the two axially spaced mounting points of the base element requires special frame interfaces on the left and right dropout of the bicycle frame. In order to be able to mount a conventional rear derailleur of type B) with only one fixing end on the right dropout of such a bicycle frame, the present applicant has proposed the use of a mounting element in different variants matched to the frame interface, also known as a derailleur hanger in the field, which is mounted on the inside of the right dropout. In this respect, reference is made to the disclosure document DE 10 2018 206 104 A1 and the corresponding documents EP 3 556 643 A1 and US 2019/0322333 A1 as well as to the disclosure document DE 10 2018 222 834 A1 and the corresponding documents EP 3 670 315 A1 and US 2020/0198728 A1, which are also fully included in the disclosure of the present description by reference. The rear derailleur type B) referred to here corresponds to the "first type" and the rear derailleur type A) referred to here corresponds to the "second type" of DE 10 2018 206 104 A1.

Figure 1A:
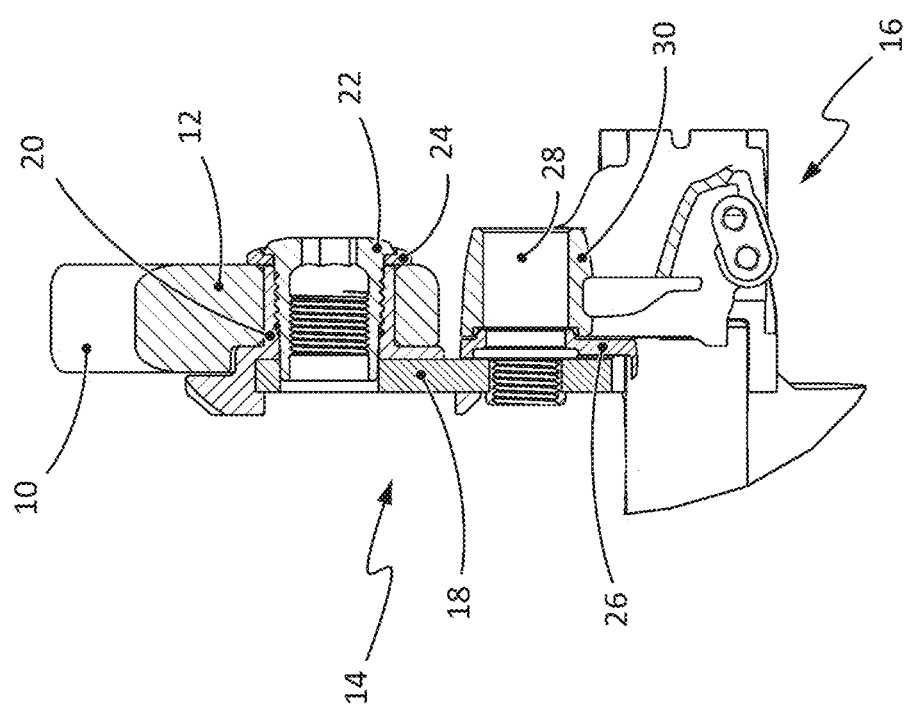
FIG. 1A shows a variation of the exemplary bicycle with a rear derailleur of type B).

FIG. 1A, which corresponds to FIG. 3b of DE 10 2018 222 834 A1, shows such a mounting element or derailleur hanger 14, which can be used to mount a conventional rear derailleur of this type B) with only one mounting end on a bicycle frame 10 such as the bicycle frame of FIG. 1.

FIG. 1A shows the Prior Art according to DE'834 regarding a coaxial connection of a conventional standard bicycle rear derailleur to a frame dropout 12. You can see in FIG. 1A shows that according to DE 10 2018 222 834 A1 (short DE'834) a Universal Derailleur Hanger (UDH) 14 is used for rear derailleur mounting, which essentially comprises a UDH base plate 18, a UDH sleeve 20 and a UDH bolt 22 (also referred to as axle bolt in the following). According to a terminology used in DE 10 2018 206 104 A1 (DE'104 for short), the UDH bolt can also be referred to as an adapter.

This UDH is mounted in the frame dropout 12 by screwing the UDH bolt 22 into the UDH sleeve 20 by means of a left-hand thread after the latter has been inserted into the dropout. The left-hand thread is used to prevent the UDH bolt 22 from coming loose from the UDH sleeve 20 when the thru axle is screwed in later.

FIG. 1A also shows a UDH washer 24 and a so-called B-washer 26. The B-washer is used to adjust the chain gap and to stop a B-bolt when bouncing the rear derailleur. The B-bolt is used to set a front stop for the rear derailleur, for which the hanger or the derailleur hanger 14, respectively, has a front stop section. With a conventional frame, the dropout in the area of the derailleur hanger, if used, could also have a suitable pre-stop section.

However, such a front stop is typically located on a small radius, so that the B-bolt could be overloaded if the rear derailleur shocks occurring during operation, i.e. rear derailleur deflections to the rear and back to the stop in the event of uneven ground, jumps or the like, were to be transferred directly from a (then radially more inward) B-bolt to the front stop section. For this reason, the B-disk 26 has been introduced in order to be able to transmit the impacts from the B-screw over a large radius and thus with smaller forces first to the B-disk, and from this in turn to the hanger stop or front stop section of the UDH.

The rear derailleur 16 is mounted to the UDH by means of a mounting bolt not shown in FIG. 1A, which extends through the passage 28 of the base element 30 (B-Knuckle) of the rear derailleur and is screwed into a mounting opening of the UDH designed as a screw opening.

In the following section, solutions for the assembly of a conventional type B) rear derailleur and for the assembly of type B) rear derailleurs will be discussed first, without any general limitation, particularly (but not exclusively) with regard to a frame designed for the assembly of a type A) rear derailleur.

FIGS. 2 to 14 show alternative embodiments for a UDH which explain various aspects of the present invention and in which the connection between UDH pin and UDH sleeve is no longer made by means of threads but by plug-in or snap-on connections, respectively.

A particular challenge solved by these embodiments is to securely connect the UDH arrangement, which essentially consists of base plate, sleeve and bolt, to the end of the frame even when the thru axle is not mounted. Especially when transporting without rear wheel, the UDH arrangement must not come loose from the frame even with the rear derailleur mounted.

In the following description, the same reference symbols as in FIGS. 1 and 1A are used for corresponding or analogous elements and only the differences compared to the embodiment(s) already discussed above are explained.

Figure 2:
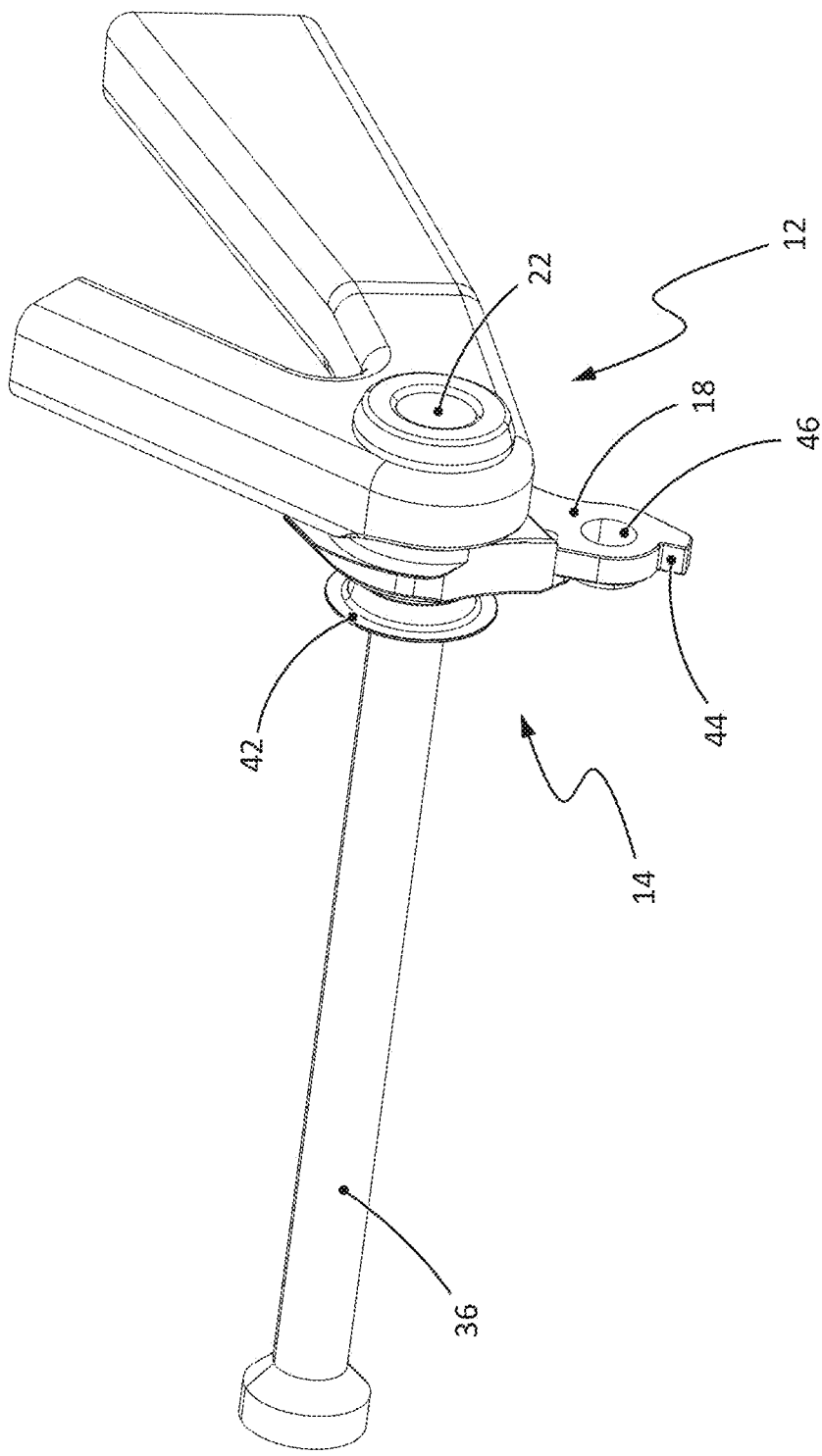
FIG. 2 shows a first embodiment of a derailleur hanger with an advantageous UDH-sleeve and a corresponding UDH-bolt in the state of assembly or pre-assembly on a right dropout of a bicycle frame.
Figure 3:
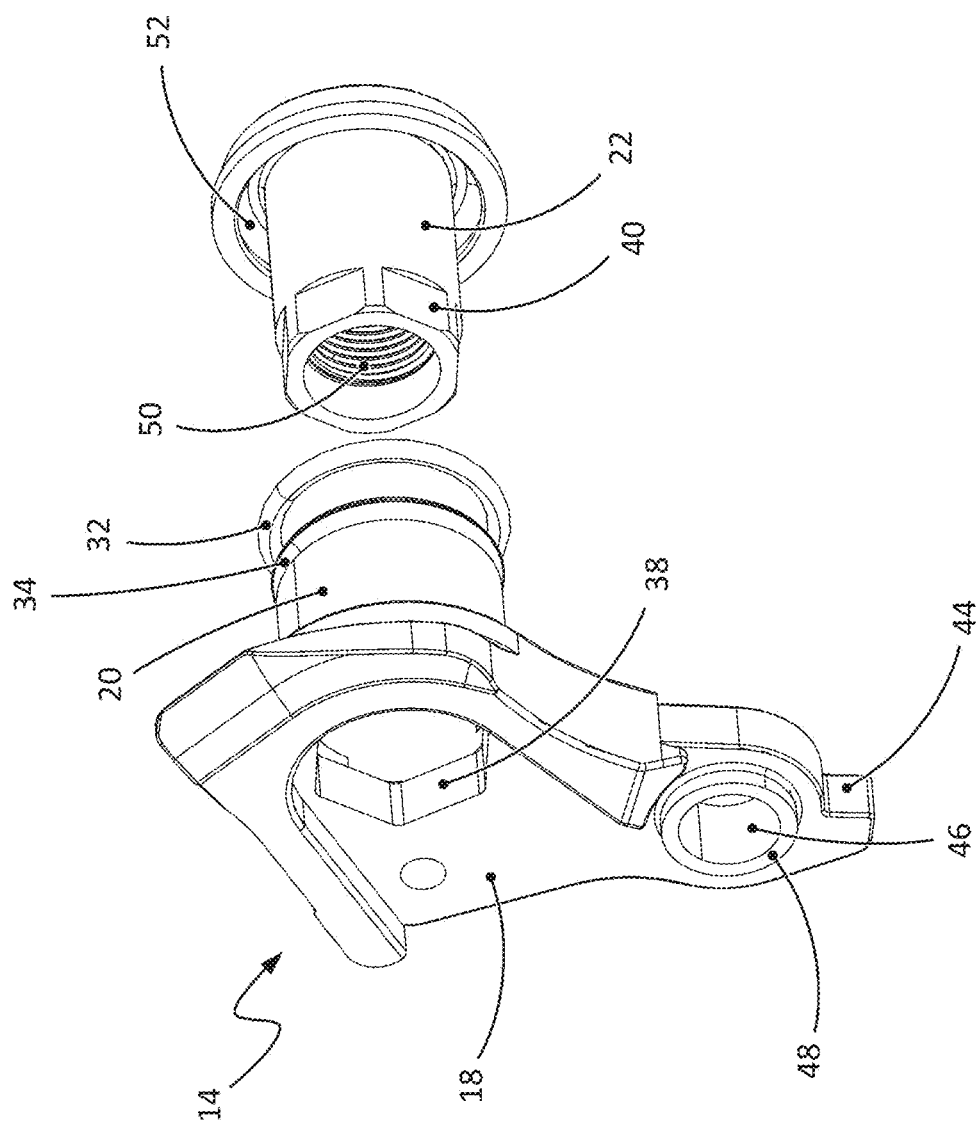
FIG. 3 shows the derailleur hanger with the integrally formed UDH sleeve and the UDH bolt of the first embodiment in a kind of perspective exploded view.
Figure 4:
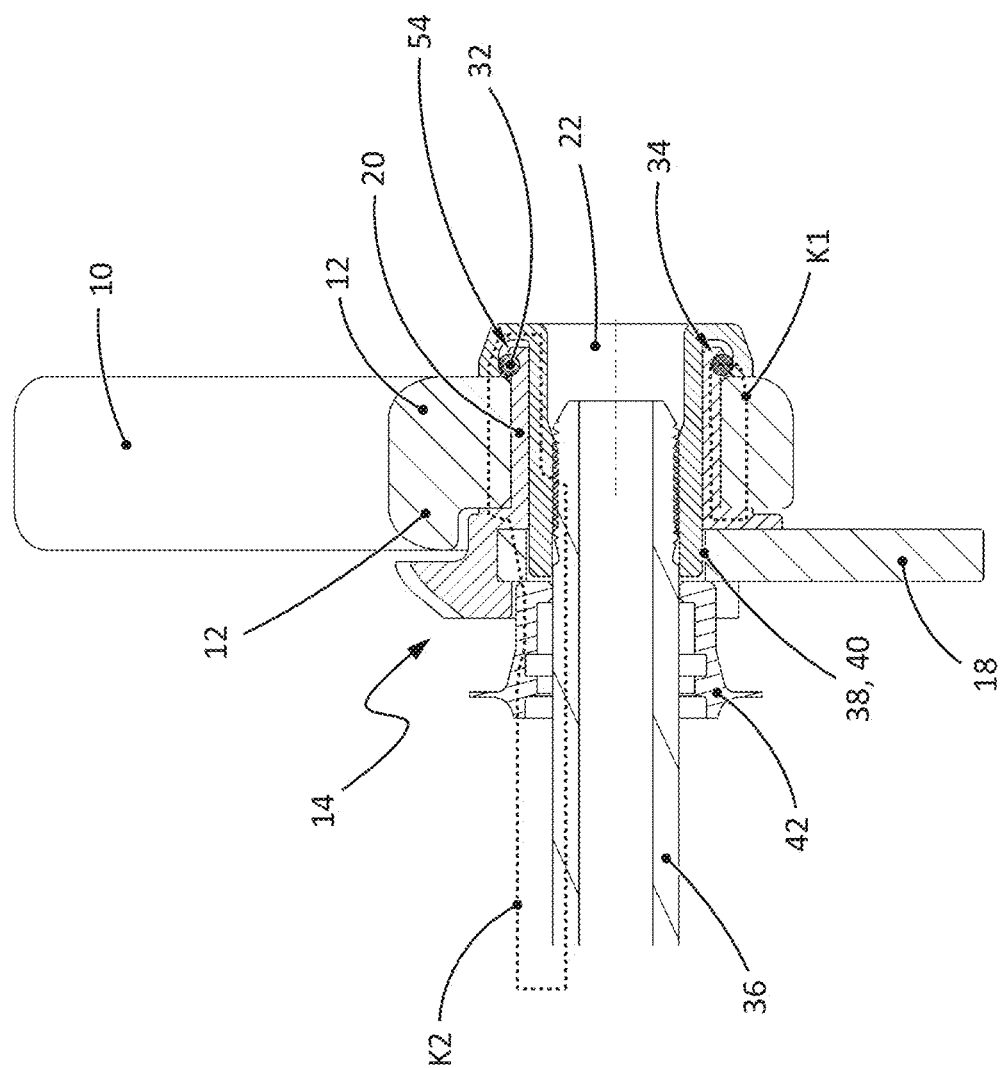
FIG. 4 shows a sectional view of the derailleur hanger, the UDH sleeve and the UDH bolt of the first embodiment in the assembled state as shown in FIG. 2.

In the embodiment shown in FIGS. 2 to 4, the UDH sleeve and UDH bolt are connected by means of an elastic, positive snap connection using an O-ring 32. For assembly, first insert the UDH 14 consisting of base plate 18 and UDH sleeve 20 into the frame dropout 12 as shown in FIGS. 3 and 4. Then, an O-ring 32 is inserted into the corresponding groove (recess) 34 on the UDH sleeve 20, thus securing the UDH 14 against extraction.

Subsequently, the UDH bolt 22 is inserted into the UDH sleeve 20 from the right, pressing the head of the UDH bolt over the O-ring 32. The O-ring 32 is compressed by the chamfer on the outside diameter of the recess on UDH stud 22. This results in an axial force on UDH stud 22 which prevents the stud 22 from loosening by itself. Furthermore, the O-ring 32 is held securely in the groove 34 when the bolt is mounted, since it is not possible to lift off the O-ring 32 in the radial direction due to the overlap of the bolt head, so that the UDH assembly cannot detach from frame 10.

In this embodiment, the force flow fixing the UDH 14 in the dropout is thus completely independent of the force flow generated when the thru axle is screwed in (see FIG. 4). In addition, neither the screwing in nor the unscrewing of the quick-release axle 36 has any influence on the retention of the UDH 14 in the dropout 12. The transmission of the thread torque occurring when screwing in or unscrewing the quick-release axle 36 takes place via the hexagonal profile 38 or 40 of the UDH base plate 18 and UDH pin 22, respectively, which is particularly visible in FIG. 3. This prevents undesired rotation of the UDH pin 22 when tightening the quick-release axle 36.

FIG. 2 shows the screwable quick-release axle together with a hub end cap 42. The stop face of the hanger 14 for the B-bolt or the B-washer, respectively, is marked 44. The mounting opening 46 of the UDH base plate 18 for the B-bolt is shown in this figure and the following figures without internal thread. This internal thread can be realized by means of a threaded insert 48 pressed into a corresponding opening of the hanger, as shown in FIG. 3, which also shows the internal hexagon profile 38 in the UDH base plate 18 and the external hexagon profile 40 of the UDH bolt 22. A locating thread 50 for the thru axle 36 is also visible.

In contrast to previously known solutions, the UDH bolt is therefore inserted instead of screwed, so that there is no influence of the thread torque when screwing or unscrewing the thru axle on the fixing of the UDH in the dropout.

The O-ring 32, the locating groove (recess) 34 of the UDH sleeve 20 for the O-ring and an associated further locating groove (recess) 52 on an inner circumferential area of a flange section of the bolt head are also clearly visible.

FIG. 4 clearly shows how the UDH sleeve 20 is fixed to the right frame dropout 12 of the frame rear of frame 10 by means of the O-ring 32, which creates an elastic, fluid snap connection between the UDH bolt 22 and the UDH sleeve 20. The UDH sleeve can thus only be removed from the dropout after the UDH bolt has been pulled out to the right due to the elastic, liquid locking effect of the O-ring. 54 refers to a chamfer on the outside diameter of the recess on the UDH stud and 34 refers to the already mentioned locating groove in the UDH sleeve for the O-ring. K1 indicates the force flow through the UDH and the UDH pin fixing the UDH in the dropout when the thru axle is released (this applies accordingly to all embodiments shown in FIGS. 2 to 14). K2 is the force flow through the base plate 18 and the UDH pin 22 fixing the UDH in the dropout when the thru axle 36 is screwed in (this applies accordingly to all embodiments in FIGS. 2 to 14; see also EP'324, paragraph [0082], FIGS. 14, 16, 24A).

Figure 5:
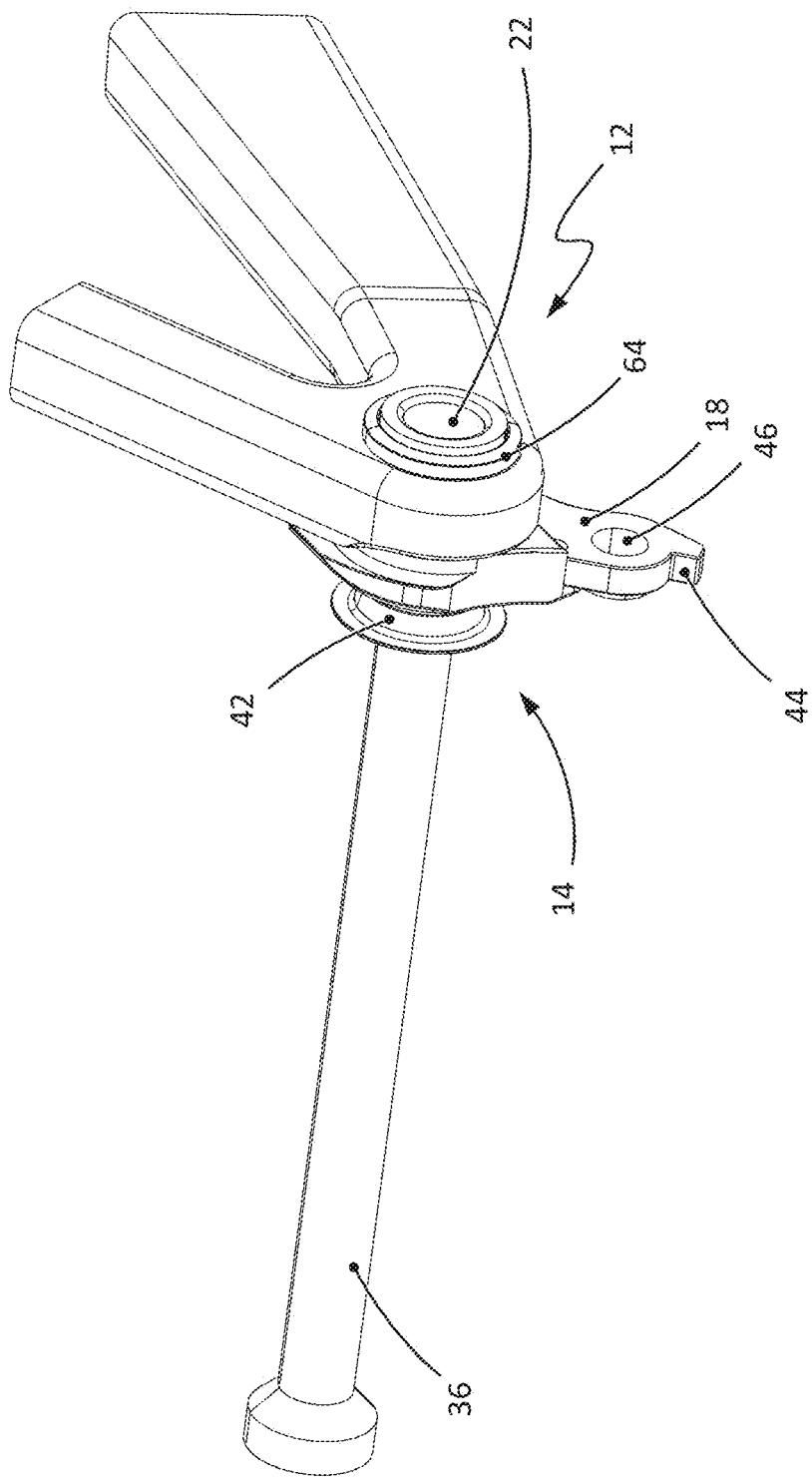
FIG. 5 corresponds to FIG. 2, but shows the derailleur hanger, UDH sleeve and UDH pin of a second type.
Figure 7:
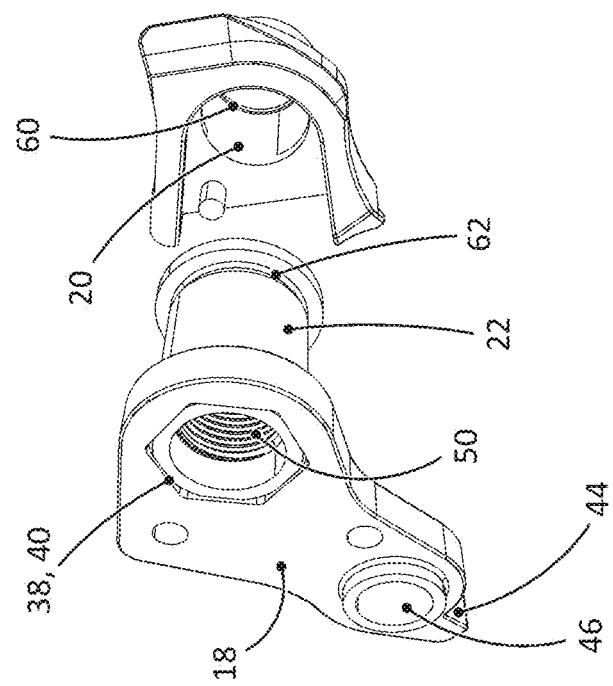
FIG. 7 shows a kind of perspective exploded view of the derailleur hanger with the molded-on UDH sleeve and UDH bolt of the second type.
Figure 6:
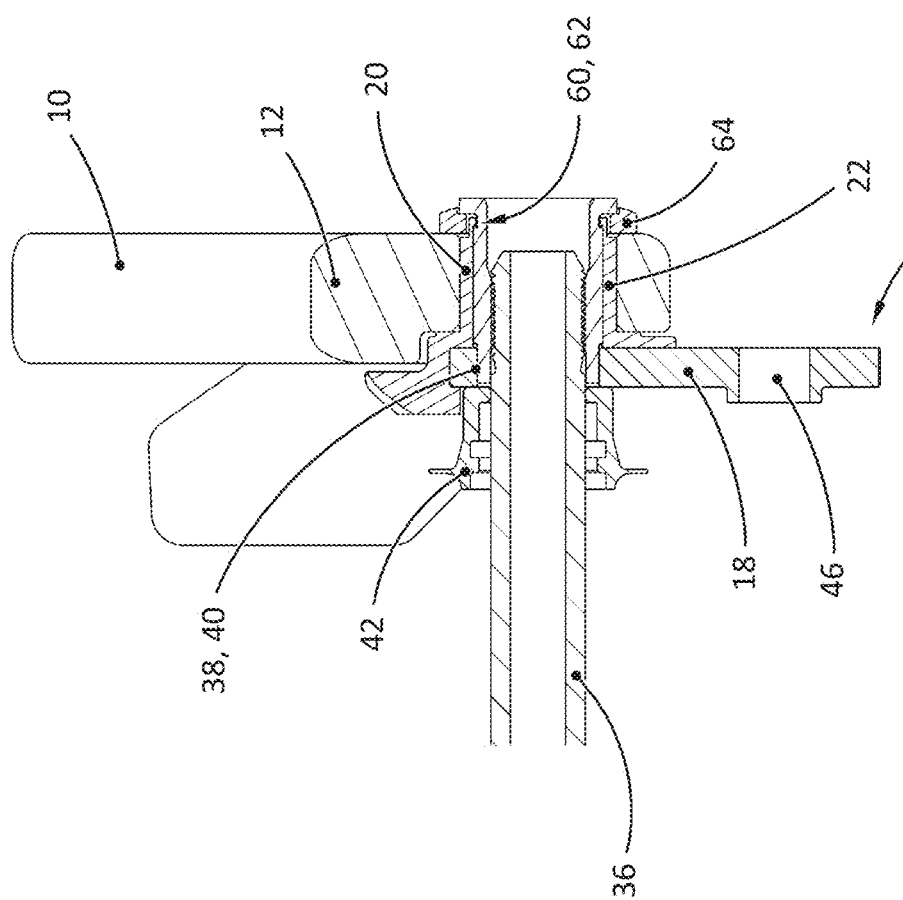
FIG. 6 shows a sectional view of the derailleur hanger, the UDH sleeve and the UDH pin according to FIG. 5.
Figure 14:
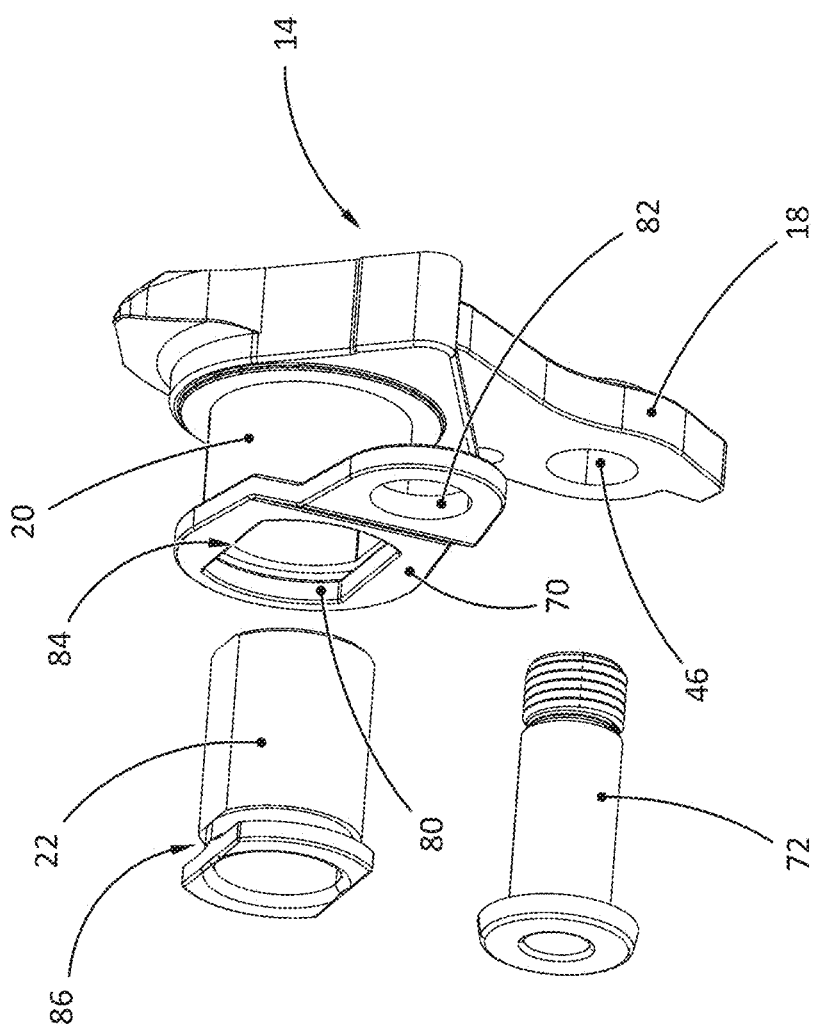
FIG. 14 shows the components of FIG. 13 in a detached state.
Figure 15:
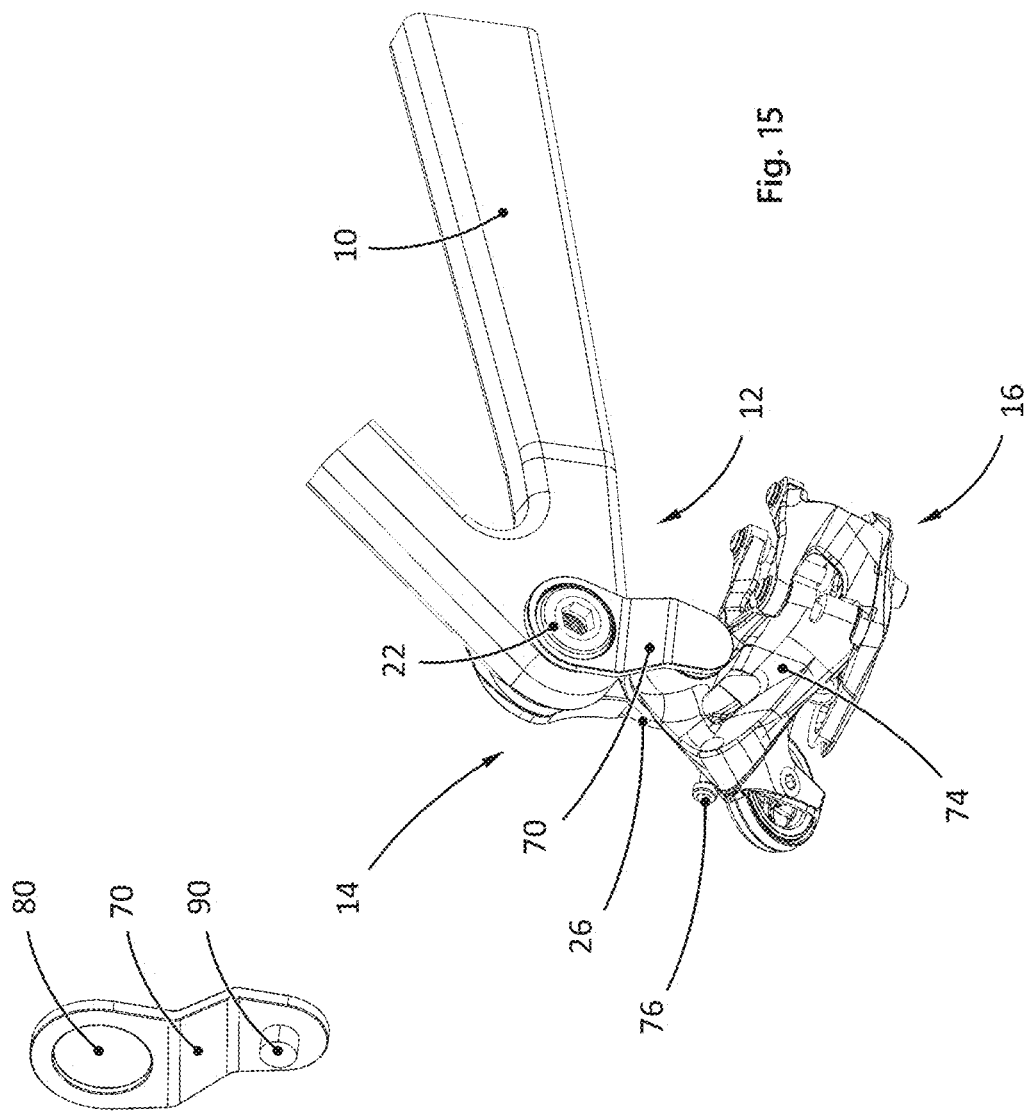
FIG. 15 shows the derailleur hanger, the UDH sleeve and the UDH bolt together with a reinforcing element according to a fifth embodiment in a state mounted on the bicycle frame.

FIGS. 5 to 7 show an embodiment in which the UDH sleeve 20 and the UDH pin 22 can be connected by a ring-shaped snap connection. For this purpose, the UDH sleeve 20 has a circumferential locking or snap projection 60 on its inner circumference and the UDH pin 22 has a correspondingly shaped circumferential locking groove 62. The assembly is carried out by first inserting the UDH base plate 18 with the overmolded UDH sleeve 20 from the left into the opening of the frame dropout 12 and then pressing the UDH bolt 22 from the right into the opening of the UDH sleeve 20 until the circumferential snap projection 60 of the UDH sleeve engages in the circumferential locking groove 62 on the UDH bolt (see exploded view in FIG. 7, which, however, does not show the actual assembly sequence for reasons of perspective).

FIG. 7 shows the UDH sleeve 20 separately from the derailleur hanger base plate 18 for clarification. In reality, the UDH sleeve is preferably designed as a fixed overmolding around the derailleur hanger base plate to realize the UDH forming a unit. The assembly sequence is as follows: first the UDH base plate 18 with the overmolded sleeve is inserted into the dropout 12 from the left, then the UDH bolt 22 is inserted into the sleeve around the base plate from the right and locked with the sleeve. This is to be regarded as a pre-assembly on the frame. The final assembly is then carried out by screwing the thru axle 36 into the locating thread 50 of the UDH bolt. FIGS. 5 and 6 still show a UDH washer 64 which surrounds the snap-in projection 60 snapped into the locking groove 62 and supports a flange section of the UDH bolt on the outside of the dropout 12 when the thru axle 36 is screwed in and tightened.

With regard to the flow of forces and the associated advantages, the same applies to this embodiment as described above with regard to the embodiment as per FIGS. 2 to 4.

A further embodiment for the connection between UDH sleeve and UDH pin is shown in FIGS. 8 to 10. This is also a snap connection. This snap connection has snap elements on the UDH sleeve which engage the right end of the UDH stud with a positive snap fit. In the embodiment shown here, two snap elements 66z and 68 are provided.

For assembly, the UDH base plate 18 with the overmolded UDH sleeve 20 is first inserted from the left into the opening of the frame dropout 12. Then, the UDH bolt 22 is inserted from the right into the opening of the UDH sleeve 20 until the snap elements 66z, 68, which are molded onto the plastic sleeve of the UDH, engage at the corresponding edges of the UDH bolt 22 and thus secure the bolt axially.

In this case, the UDH bolt 22 and the UDH base plate 18 show inter alia slightly different rotational support formations than the hexagonal profiles 38 and 40 according to FIG. 3, i.e. two flattenings 40a on the outer circumference of the bolt, with which flattenings 38a on the inner circumference of the passage opening of the base plate 18 correspond. Ultimately, there are many ways in which a torque transmission can be realized when screwing in the thru axle 36.

Here again, the same applies with regard to the power flows and the associated advantages as described above with regard to the embodiment as per FIGS. 2 to 4.

The embodiments according to FIGS. 2 to 10 can be used for conventional rear derailleur arrangements (see FIG. 1A), i.e. rear derailleur arrangements without an externally mounted reinforcing element in the sense explained below. For the use with reinforcing element described below, the UDH washer 64 can simply be replaced by the reinforcing element 70 for these embodiments (see e.g. FIG. 18). Optionally, an alternative connection between the reinforcing element and the UDH bolt 22 can be selected, e.g. screwing the reinforcing element to the UDH bolt by means of a threaded insert (see FIG. 37) or by means of an additional thread.

If only a body with a reinforcing element is used, means for axial securing of the UDH assembly, e.g. according to FIGS. 2 to 10, can sometimes be dispensed with if the reinforcing element itself can prevent loosening from the frame during transport. The latter is the case, for example, with the embodiment described below according to FIGS. 11 to 14. In this case the reinforcing element 70 also forms a locking element.

FIGS. 11 to 14 thus represent a further embodiment for the connection between UDH pin and UDH sleeve or for the installation of a UDH in the dropout, respectively. In this embodiment, the UDH Bolt is positively locked by means of a bayonet-type locking mechanism, the design and effect of which can be seen in particular in FIGS. 13 and 14.

FIG. 11 shows a complete conventional rear derailleur 16, which is mounted to the rear right dropout of the frame by means of a B-bolt 72 and the universal derailleur hanger 14 as well as the reinforcing element 70. The B-pin 72 extends through a passage of the base element (B-Knuckle) 74 and the already mentioned B-disk 26 and is screwed into the corresponding screw hole of the derailleur hanger base plate 18. In the figure you can also see the already mentioned B-bolt 76, which is used in a conventional way to adjust the chain-gap as well as to absorb rear derailleur impacts during bouncing. The rear derailleur can be freely swivelled backwards around the B-bolt against the chain tension. An arrow S represents an example of a direction of impact on the rear derailleur, which runs through the B-pin.

To mount the rear derailleur, first insert the UDH base plate 18 with the overmolded UDH sleeve 20 from the left into the opening of the frame dropout. Then insert the UDH bolt 22 from the right into the opening of the UDH sleeve 20. Due to the corresponding shape of the bolt and UDH sleeve, only a directional assembly is possible (two positions offset by 180° are possible, see FIG. 14).

Subsequently, the upper eye 80 of locking element 70 is guided over the interrupted flange on the UDH bolt. Then the locking element 70 is rotated until its lower eye 82 overlaps with the threaded hole 46 on the UDH base plate 18, see FIG. 13. Due to the rotation of the locking element, flattenings 84 in its upper eye 80 enter a groove 86 on the UDH bolt 22 and secure it in axial direction. The flats 84 engage in the groove 86, thus ensuring mutual positive locking.

A special feature of this embodiment is that the locking element simultaneously forms a reinforcing element which ensures a considerable increase in the rigidity and load capacity of the connection between the frame dropout and the rear derailleur.

In contrast to the Prior Art, for example according to the DE'834 doctrine (see FIG. 1A), in which the connection between rear derailleur and dropout is only made by means of a bending moment via the UDH base plate, the UDH base plate 18 and the locking element 70 form a sandwich-like two-arm composite in the embodiment according to FIGS. 11 to 14, via which lateral forces acting on the rear derailleur 16 can no longer be transmitted to the dropout 12 by means of a bending moment alone, but via tensile and compressive forces. The stiffness and load capacity of such a two-arm composite can easily be increased by almost an order of magnitude compared to the aforementioned Prior Art.

The effects and advantages of a two-arm connection between rear derailleur and dropout have already been described in detail in EP'324 and are also applicable here due to the two-arm connection that is also configured in the form shown in FIGS. 11 to 14.

However, in contrast to the EP'324 teaching, the embodiment as per FIGS. 11 to 14 has the special feature that a largely or completely unchanged conventional rear derailleur can be used here.

In order to be able to mount the conventional rear derailleur 16 according to this embodiment with two arms, the locking element 70, which in this case also forms the reinforcing element 70, is arranged or clamped between the head of the B-pin 72 of the rear derailleur and the body of the so-called B-Knuckle 74, respectively, similar to the way this is also shown e.g. in FIGS. 27 to 34 and the associated description there.

With regard to the force flows and the associated advantages, the same applies to this embodiment as described above with regard to the embodiment as per FIGS. 2 to 4.

It should be noted that a reinforcing element 70 could also be provided which does not simultaneously serve as a locking element. In this case, a screw connection of the UDH bolt 22 with the UDH sleeve 20 could be provided, or a snap connection as described above with regard to the embodiment. Alternatively, a locking element 70 can be provided which does not serve as a reinforcing element at the same time, e.g. if the advantages of the two-arm connection are not required.

FIGS. 15 to 18 show an embodiment which, like the embodiment described above in FIGS. 11 to 14, allows a two-arm assembly of a largely or completely unchanged conventional rear derailleur. In contrast to the embodiments described above, this embodiment also uses a largely unchanged universal derailleur hanger (UDH) with screwed attachment in the dropout, as known from DE'834 and shown in FIG. 1A, for example. The reinforcing element 70 therefore does not serve as a locking element in the explained sense.

An overview of FIGS. 15 to 18 with FIG. 1A shows that only the UDH washer 24 of the UDH known from the DE'834 is replaced by the reinforcing element 70 according to FIGS. 15 to 18, which for this purpose has a hole geometry in its upper eye 80 that corresponds to the UDH washer.

Figure 18:
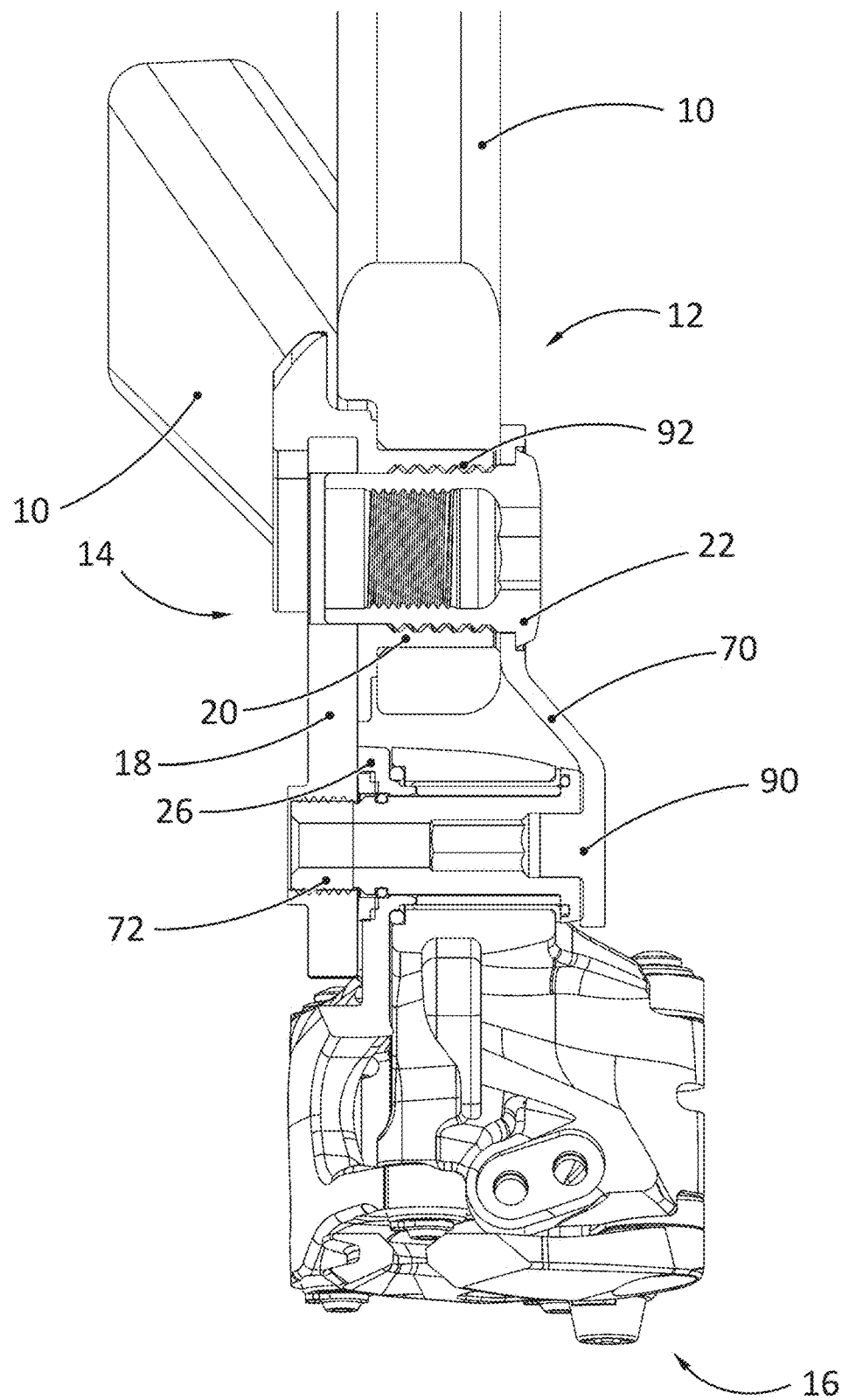
FIG. 18 shows the components of FIG. 15 in a partially cut view.

For this purpose, the reinforcing element 70 is clamped with its upper eye 80 between the head of the UDH bolt 22 and the right outer surface of the dropout 12 (see in particular FIG. 18). At the same time, a pin 90 at the lower end of the reinforcing element engages in the hexagon socket profile of the B-bolt 72 of the conventional rear derailleur 16 used here.

The clamping of the reinforcing element 70 in the area of its upper eye 80 below the UDH pin 22 also results in a frictional torque for anti-rotation. This embodiment is therefore particularly suitable in combination with a fixation of the reinforcing element 70 on the B-bolt 72, which guarantees the free pivoting of the rear derailleur 16 in a conventional way. The latter applies not only to the embodiments described in FIGS. 15 to 18 but also to the embodiments described below in FIGS. 19 to 27.

However, it is not necessarily necessary to use the UDH and its base plate familiar from DE'834, as the principle of two-arm mounting of a conventional rear derailleur, especially as shown in FIGS. 15 to 18, can also be applied to inter alia differently designed derailleur hangers. For this purpose, the geometry of the reinforcing element 70, especially its length, must be adapted to the derailleur hanger 14 used in each case.

In the case of the embodiment shown in FIGS. 15 to 18, it should be noted that a conventional bolted connection 92 is realized between UDH bolt 22 and UDH sleeve 20. In this respect, the embodiment corresponds to the known solution similar to FIG. 3b from DE'834, but with the reinforcing element 70 as used instead of the conventional UDH washer. The frictional connection mentioned above is achieved between the UDH bolt 22, the dropout 12 and the reinforcing element 70. Since the reinforcing element is inserted from the outside, an increased lateral stiffness is easily achieved. A conventional rear derailleur can be used without modification, which can normally be mounted with or without the reinforcing element. The pin is preferably dimensioned in such a way that it can be inserted into the normal Allen head of a conventional B-bolt.

Overall, an advantageous two-arm rear derailleur suspension similar to EP'324 is obtained, but with a conventional rear derailleur 16.

Figure 21:
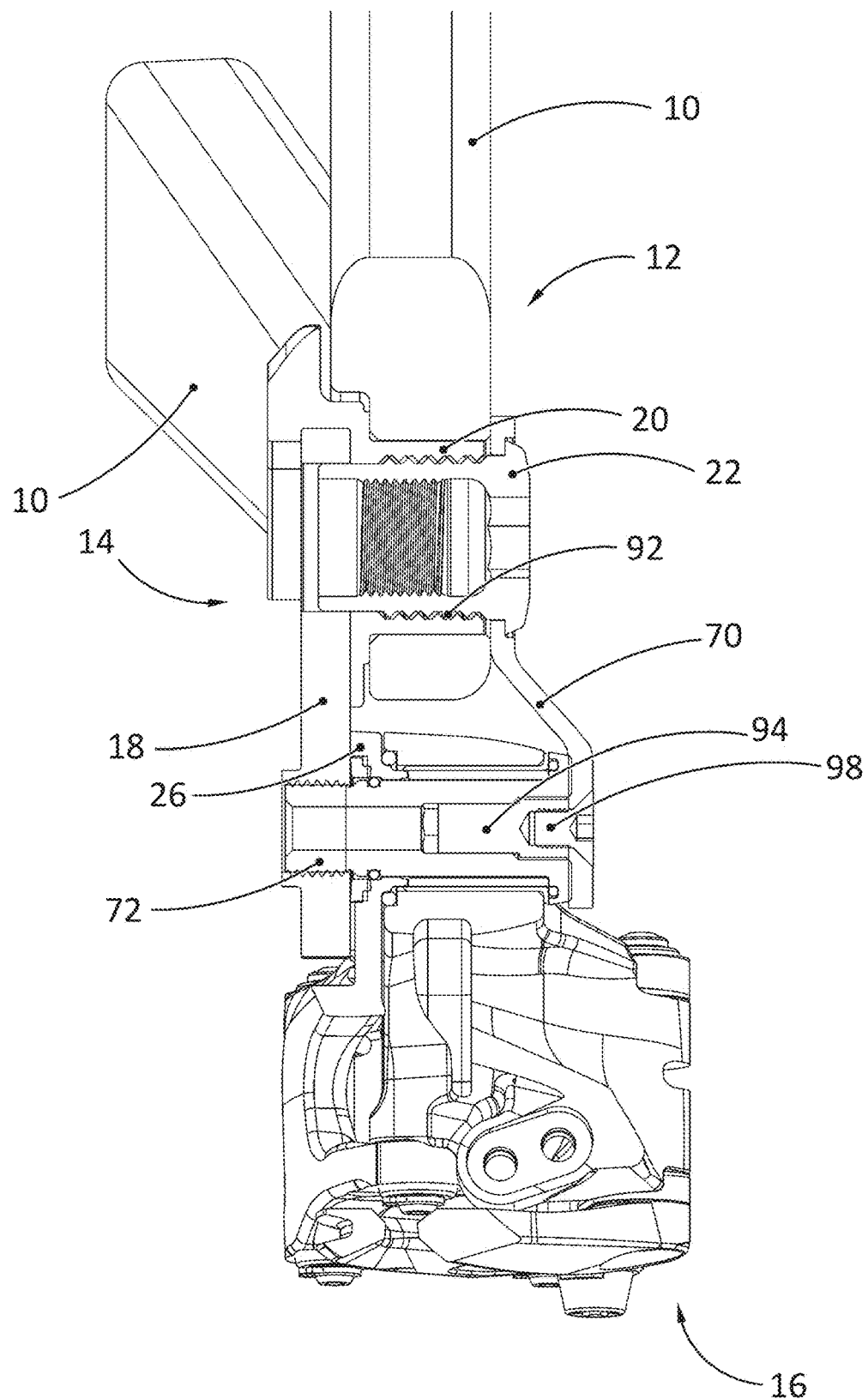
FIG. 21 shows the components of FIG. 19 in a partially cut view.

FIGS. 19 to 21 show an embodiment which largely corresponds to the embodiment described above in FIGS. 15 to 18. The only difference between this embodiment and the above embodiment is the connection of the lower end of the reinforcing element 70 with the B-bolt 72 of rear derailleur 16. This connection is made by means of an additional threaded insert which is inserted or pressed into the existing hexagon socket profile of the B-bolt 72. The lower end of the reinforcing element 70 is again screwed to this threaded insert. For this purpose, the reinforcing element 70 has an opening or bore 96 instead of the stud 90, through which a fastening screw 98 is screwed into a screw opening of the threaded insert 94. Preferably, a common B-bolt is used, in whose Allen head a suitable threaded insert is inserted or pressed in. This results in a particularly strong, backlash-free and loadable connection of the lower end of the reinforcing element with the rear derailleur.

Figure 24:
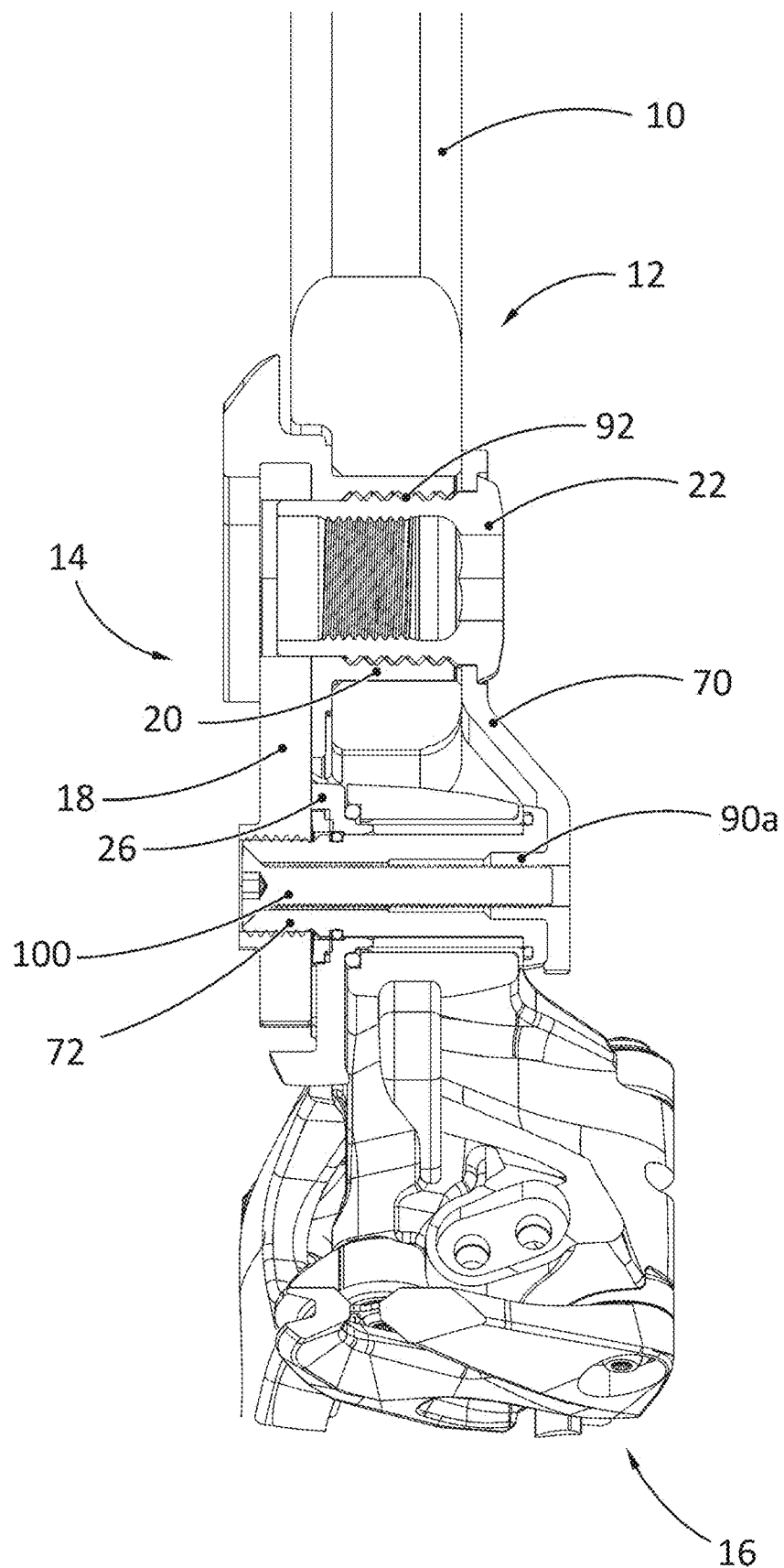
FIG. 24 shows the components of FIG. 19 in a partially cut view.

The embodiment according to FIGS. 22 to 24 only differs from the embodiment according to FIGS. 19 to 21 in that the screw connection between the lower end of the reinforcing element 70 and the B-bolt 72 of the rear derailleur is made from the left and not from the right as in the case of the above embodiment. In this way, the threaded insert used in the above embodiment can be dispensed with, and a tight screw connection between the reinforcing element can still be made at its lower end. At the same time, a conventional rear derailleur, which is almost or completely unchanged, can also be used here.

Figure 17:
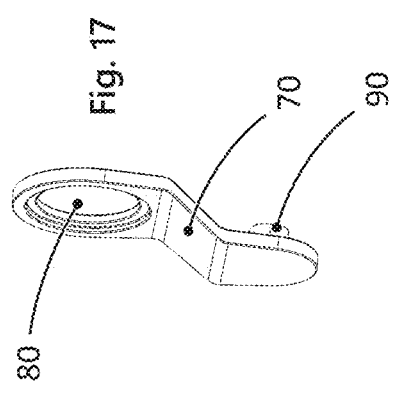
FIG. 17 shows the reinforcing element of the fifth embodiment in two alternative views.
Figure 16:
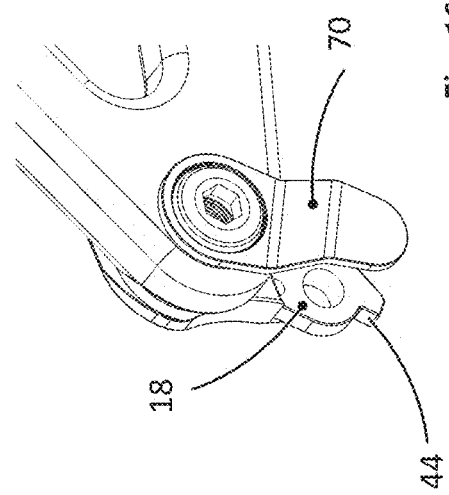
FIG. 16 shows the components of FIG. 15 without the rear derailleur as shown in FIG. 15.

The embodiment shown also has similarities with the embodiment shown in FIGS. 16 to 18. Instead of the pivot 90, a pivot 90a is configured on the inside of the reinforcing element 70, which is provided with a screw-in opening for the fastening screw 100 fed in from the other side (from the left).

Figure 27:
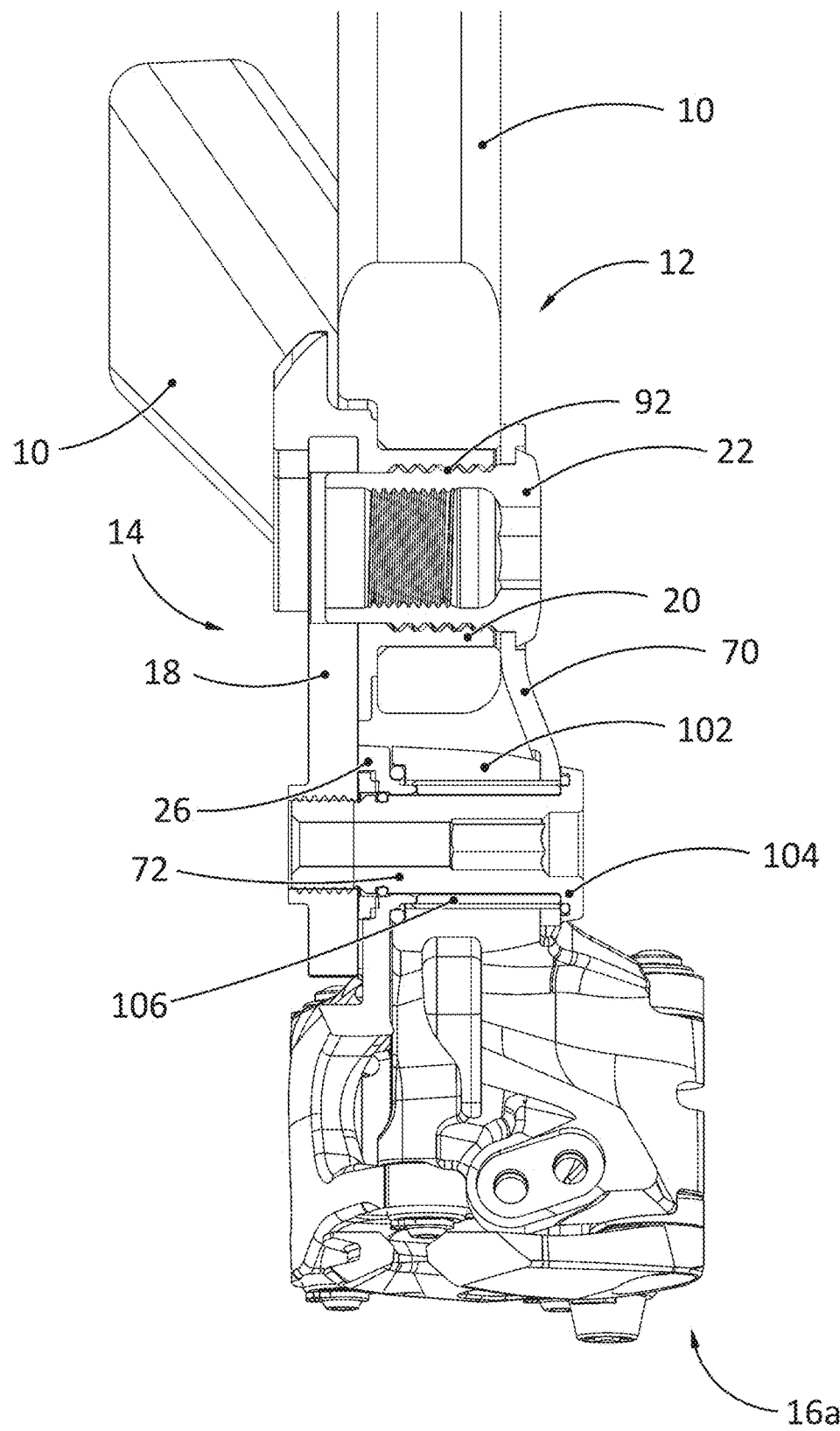
FIG. 27 shows the components of FIG. 25 in a partially cut view.

A further embodiment is shown in FIGS. 25 to 27. This embodiment differs from the embodiments described above in FIGS. 15 to 24 in particular by an increased integration of the reinforcing element into the overall arrangement, especially with the rear derailleur 16a.

This is a virtually unchanged standard rear derailleur, whose B-Knuckle bearing body is only shortened slightly axially to make room for the lower eye 82a of the reinforcing element 70, which has a larger diameter for a non-clamping version than the lower eye 82 of the embodiment described above. 102 designates the bearing head of the B-Knuckle 74 and 104 designates the head of the B-pin 72. The pin head 104 of the tightened B-pin 72 is supported by means of a bearing bush 106 inserted between the B-pin and the bearing head 102 by means of the B-disc 26 on the derailleur hanger base plate 18. The B-washer is still provided here, as in the conventional rear derailleur, as a stop for the B-bolt 76 during rear derailleur bouncing.

The rear derailleur can thus be freely swivelled backwards against the chain tension, as usual, so that the reinforcing element achieves the structural improvement explained with regard to lateral rigidity, but not yet a functional improvement with regard to energy reduction through friction when the rear derailleur is swivelled backwards, as is also possible in principle and will be explained in the following on the basis of another embodiment.

A comparison of FIG. 27 with, for example, FIG. 21 shows that in the embodiment according to FIGS. 25 to 27, the reinforcing element 70 no longer acts from the outside right on the rear derailleur pin 72 of rear derailleur 16a as in the embodiments described above according to FIGS. 15 to 24, but is instead arranged here by means of its lower eye 82a between the head 104 of the B-pin 72 and the bearing housing of the rear derailleur B-Knuckle.

As already mentioned, the lower eye of the reinforcing element is not clamped under the head 104 of the B-bolt 72 due to the P-Knuckle bearing arrangement, which is still almost unchanged here, so that the rear derailleur can still be swivelled backwards around the B-bolt in the conventional manner.

In this way, with a rear derailleur slightly modified at most in the area of its bearing housing, a particularly robust two-arm attachment of rear derailleur 16a at dropout 12, together with a UDH 14 or even with a conventional derailleur hanger, can be achieved.

Figure 30:
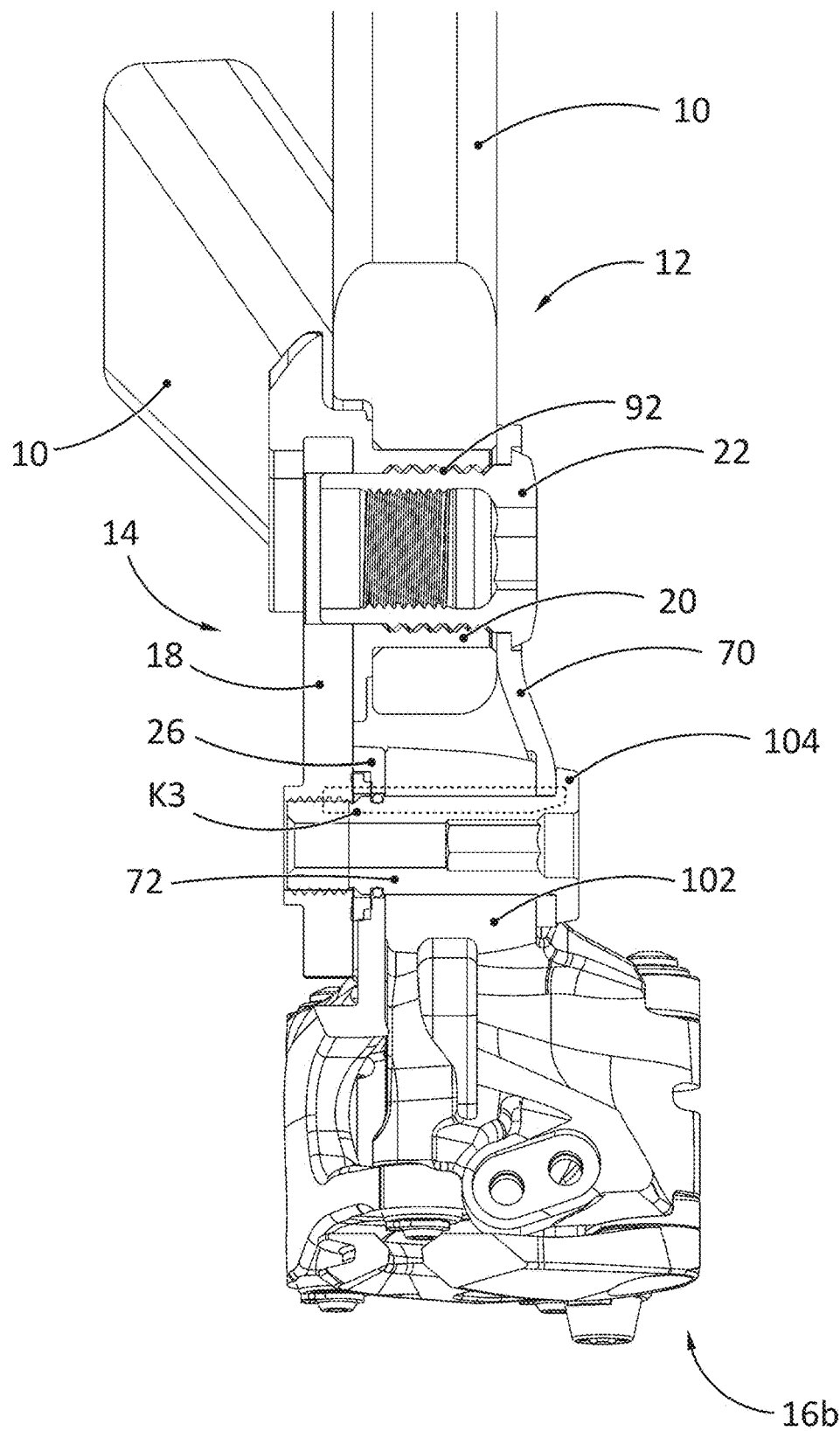
FIG. 30 shows the components of FIG. 28 in a partially cut view.

The further embodiment according to FIGS. 28 to 30 is externally almost indistinguishable from the above embodiment according to FIGS. 25 and 27, as shown in a summary of FIGS. 28 and 25. However, an overview of FIGS. 30 and 27 shows that the two embodiments differ in the area of the bearing of the B-Knuckle 74.

According to FIG. 30, the bearing bush 106 of the B-Knuckle 74 has been removed, which saves time and money. In addition, the removal of the bearing bushing causes the bearing head 104 of the B-Knuckle 74 to be clamped axially between the derailleur hanger base plate 18 and the head 104 of the B-bolt 72 by the B-bolt 72. As a result, the rear derailleur can no longer be freely swivelled backwards around the B-bolt 72 as in the previous embodiments (and as in conventionally mounted rear derailleurs, see FIG. 1A), but only after overcoming the rotational friction forces generated by the force flow of the clamping of the B-bolt when swiveling backwards.

In this way, the embodiment as shown in FIGS. 28 to 30 has comparable structural improvements with regard to lateral rigidity and comparable functional improvements compared to conventional single-sided rear derailleur assembly (see e.g. in FIG. 1A), especially with regard to the prevention of the undesired so-called "rear derailleur effect". Rear derailleur bouncing (the bouncing in the area of the B-bolt and B-washer described below), as shown by the rear derailleurs known from EP'324 with a two-armed B-Knuckle and rear axle coaxial mounting compared with conventional rear derailleur mounting.

As also configured in the EP'324 to Prior Art, rear derailleurs designed and mounted in the conventional way (see FIG. 1A) are designed to pivot freely around the pin, in particular to facilitate removal of the rear wheel. Such rear derailleurs are pressed by the chain hoist against a mostly adjustable front stop (usually via B-disc and B-bolt, see, for example, FIG. 11 or 22, respectively) and thus held in a defined rotational position around the pin. To remove the rear wheel, such rear derailleurs can be swivelled backwards around the B pin against the chain hoist.

However, this degree of freedom of conventionally mounted and designed rear derailleurs causes problems, especially in rough terrain. If the chain swings up sharply while riding on uneven terrain or if the rear derailleur hits the ground, the rear derailleur can lift off from the stop of the B-disc or B-bolt, respectively. This leads to noise and promotes further, generally undesirable swinging up of the chain, which is also known as chain slam and can lead to the chain jumping off, for example.

In addition, this lifting of the rear derailleur from the stop with subsequent reopening of the chain causes a strong impulse load at the stop surfaces between B-bolt, B-disc and dropout or derailleur hanger base plate, respectively, which results in a number of typical damage cases of conventional rear derailleurs, such as breaking B-bolts or B-disc, or an undesired adjustment of the B-bolt.

In the case of impacts from the front, a conventionally mounted rear derailleur (cf. FIG. 1A) can hardly move out of the way depending on the direction of impact (e.g. if the direction of impact on the rear derailleur is approximately through the B-bolt of the rear derailleur, cf. the exemplary illustration of the direction of impact in FIG. 11).

In addition, energy is hardly dissipated by a possible evasion of the rear derailleur due to the free rotatability of conventional rear derailleurs around the pin. This can be a problem especially in situations in which the rearward pivoting range is fully utilized, e.g. if the chain is jammed in the rear derailleur.

These disadvantages or problems in driving operation are avoided with the embodiment according to FIGS. 28 to 30, similar to the solutions described in EP'324, but here using a largely conventional rear derailleur that has been modified only slightly in the area of its bearing head.

In addition, as already configured above, the two-arm mounting of the rear derailleur also significantly increases the lateral rigidity of the rear derailleur mounting in this embodiment. The relatively slight bending of the derailleur hanger or the frame dropout caused by forces, such as lateral impacts on the rear derailleur in rough terrain, with the associated undesirable consequences in terms of shifting precision, among other things, is virtually completely eliminated in this way.

Essential aspects of the described embodiment are therefore the following: Instead of the conventional UDH washer (cf. approximately FIG. 3b from DE'834: Frictional connection between UDH bolt, dropout and washer), the reinforcing element 70 according to the embodiment is provided and held by the UDH bolt 22 and clamped against the right-hand dropout 12 after tightening the thru axle. Since the base element (B-Knuckle) of the rear derailleur 16b is clamped axially by the B-pin 72, it can be swivelled when the B-pin is released. This means that the chain gap can only be adjusted and the wheel removed if the B-pin is released. Overall, a significant structural improvement with regard to lateral stiffness and a functional improvement with regard to the avoidance of bouncing has been achieved. An almost unchanged standard rear derailleur is used. Only the B-Knuckle bearing is axially shortened for the lower eye of the reinforcing element, and the pivot bearing by means of the mentioned bearing bush is omitted. In spite of the rotational clamping of the B-Knuckle, the B-disc 18 is still present here, since a largely unchanged rear derailleur is used.

In FIG. 30, K3 designates the force flow of the clamping of the B-Knuckle 74 through the B-bolt 72. The reinforcing element 70 has a lower eye 82b of smaller diameter for the described clamping configuration.

A further embodiment is shown in FIGS. 31 to 34. This embodiment is largely identical to the embodiment described above according to FIGS. 28 to 30. However, as a summary of FIGS. 33 and 30 in particular shows, the B-disc still present in the previous embodiments is not required for the embodiment according to FIGS. 31 to 34.

A B-bolt 76 is still present, cf. an overview of FIGS. 31 and 28. In the embodiments according to FIGS. 28 to 34, however, the B-bolt is only used to adjust the chain gap.

Due to the rotationally clamping attachment of the B-Knuckle between derailleur hanger base plate and reinforcing element described above for the embodiment according to FIGS. 28 to 30, the B-bolt does not have to bear any more rotational impact of the derailleur mechanism, e.g. by chain swinging up. This means that the B-bolt can be configured structurally lighter and, in particular, the B-washer can be completely omitted, as is the case with the embodiment as shown in FIGS. 31 to 34.

As shown in FIGS. 31 and 28, the B-bolt can be positioned further up or closer to the bolt in terms of rotation. This means that the B-bolt acts directly on the stop face of the derailleur hanger without the B-washer usually arranged in between (see, for example, FIG. 2, 3, 7 or 16).

Figure 33:
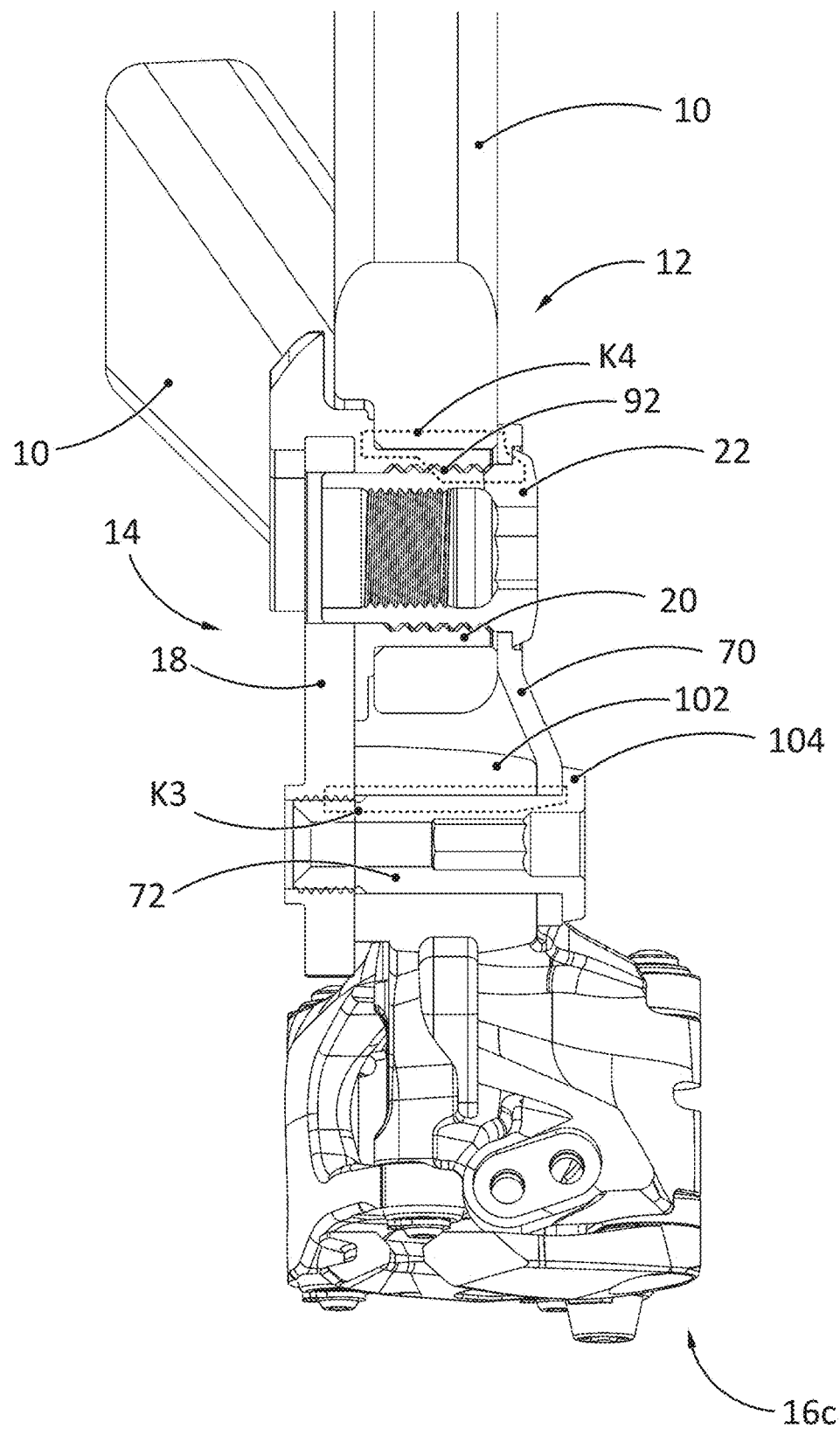
FIG. 33 shows components of FIG. 31 in a partially cut view.

FIG. 33 also shows, similar to FIG. 30, the clamping force flow K3, which is generated by the B-bolt 72 in this and the previous embodiment, and which fixes the B-Knuckle 74 of the derailleur hanger 16c in rotation relative to derailleur hanger 14, as described above. FIG. 33 also shows the force flow K4, which fixes the Universal derailleur hanger (UDH) in the frame dropout when the thru axle is released, representing all embodiments according to FIGS. 15 to 37.

Figure 34:
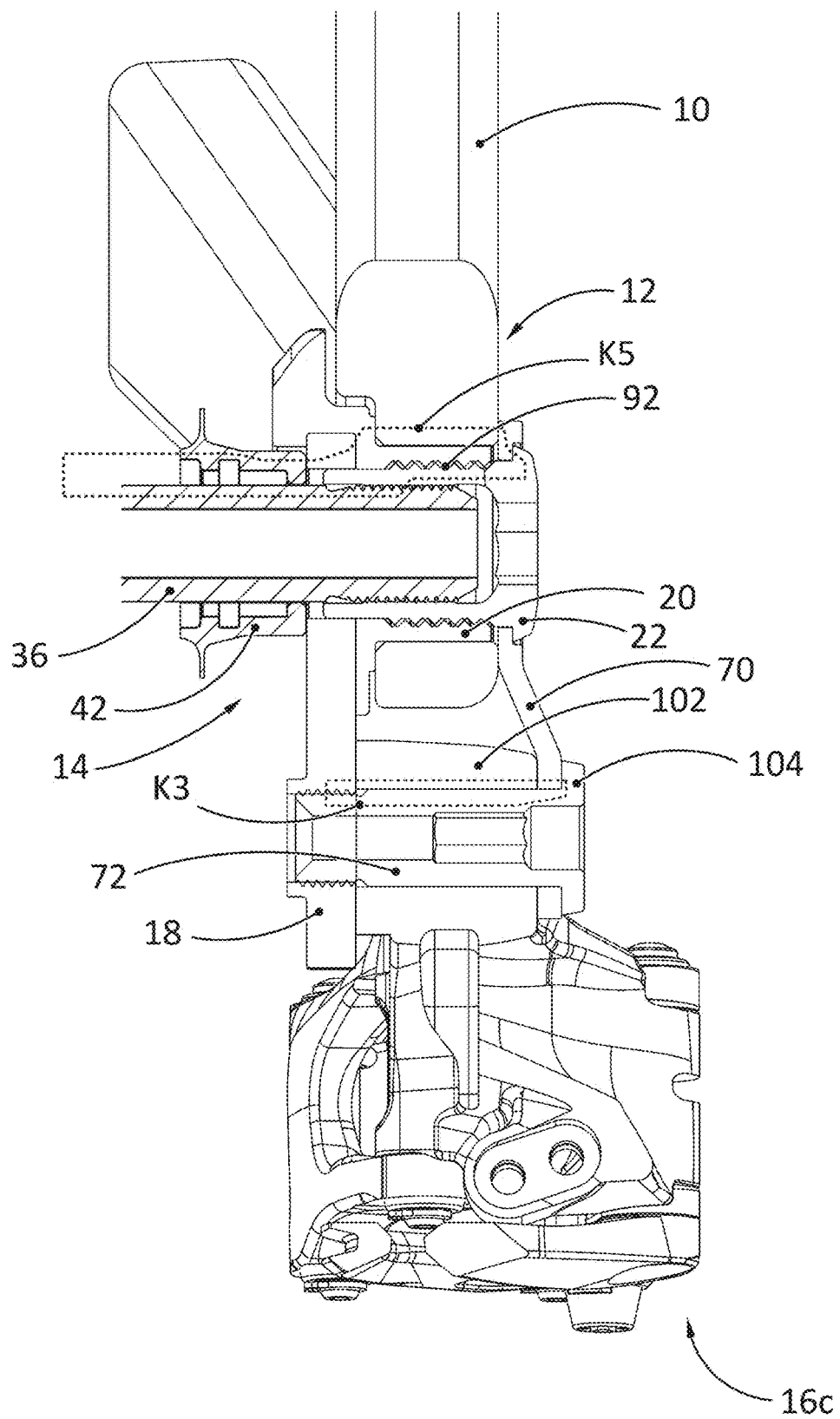
FIG. 34 shows the components of FIG. 31 in another partly cut view.

FIG. 34 corresponds exactly to FIG. 33 with the only difference that in FIG. 34 the thru axle of the rear wheel is mounted, resulting in the changed force flow K5 in the area of the UDH pin 22 and the dropout 12 compared to FIG. 33. The power flow through the thru axle shown in FIG. 34 is closed via the hub (not shown here) and via the left dropout (also not shown here), similar to FIG. 52. This power flow represents the power flow for all embodiments according to FIGS. 15 to 37, see also FIG. 52 and EP'324, paragraph [0082], FIGS. 14, 16 and 24a in the case of a mounted and tightened thru axle 36.

Special features of the described embodiment are summarized as follows: A simplified rear derailleur without swivel bearing in the B-Knuckle and without B-disc is used which can only be swivelled backwards against friction when the bolt is tightened. For this purpose, the B-Knuckle is clamped as in the embodiment shown in FIGS. 28 to 30. The B-washer can be dispensed with, as it is no longer necessary due to the clamping, thus further cost savings are achieved. The B-bolt is subject to a reduced load, since it is now used to adjust the chain-gap and no longer to absorb rear derailleur shocks during bouncing, due to the energy-absorbing clamping of the rear derailleur by the B-bolt similar to EP'324.

Figure 37:
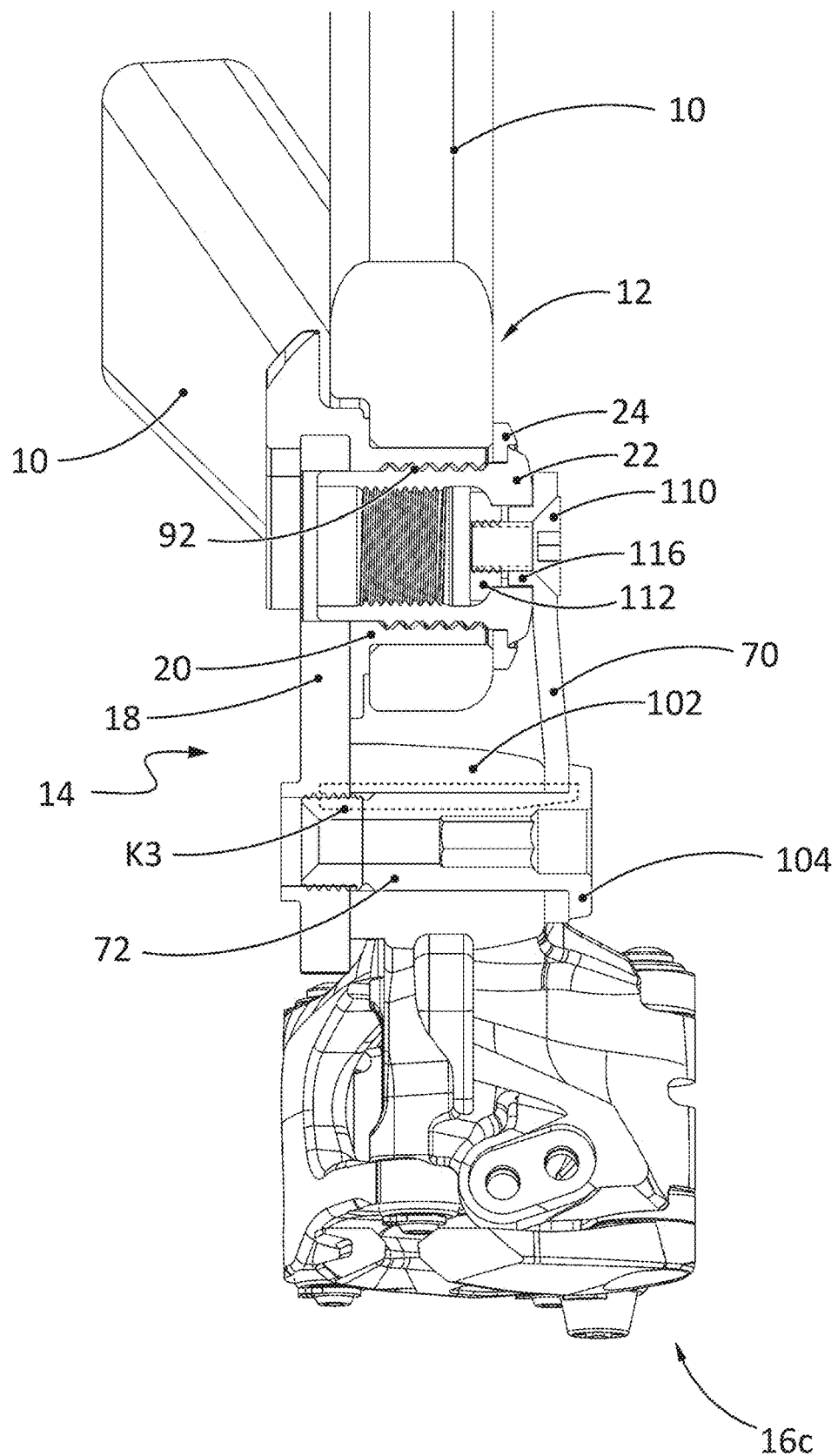
FIG. 37 shows the components of FIG. 35 in a partially cut view.

FIGS. 35 to 37 show a further embodiment for a two-arm mounting of a largely conventional rear derailleur. In the area of the rear derailleur 16c and B-pin 72, this embodiment is practically identical to the previous embodiment as shown in FIGS. 31 to 34.

As shown particularly by a comparison of FIGS. 37 and 33, the rear derailleur is again fixed to the derailleur hanger base plate 18 by the B-bolt 72, with the same advantages as described above. The conventional B-washer is no longer required and the B-bolt is only subject to low loads.

As already explained, the B-bolt does not have to absorb any unbraked shifter impacts in the embodiments e.g. according to FIG. 31 and FIG. 35. In these embodiments, the B-bolt is therefore located radially further inwards relative to the bolt—without the B-washer—and thus lies directly against the front stop of the shifting eye. This is in contrast, for example, to the designs according to FIG. 15, FIG. 19, FIG. 22, FIG. 25 and FIG. 28, where a B-disc is still present and the B-bolt is arranged on a larger radius.

In contrast to the previous embodiment according to FIGS. 31 to 34, however, in the embodiment according to FIGS. 35 to 37 the upper attachment of the reinforcing element 70 in the area of the dropout 12 or the UDH bolt 22, respectively, is effected by an additional fastening bolt 110, which engages in a threaded insert 112 arranged in the UDH bolt 22 or alternatively (not shown) in a thread arranged directly in the UDH bolt. In this way, the UDH bolt 22 including the UDH washer 24 (see FIG. 1A) can remain completely unchanged.

Instead of the upper eye of the other corresponding embodiments, the reinforcing element 70 has a receptacle 114 for the fastening bolt 110 and an extension 116 which engages in an opening of the UDH bolt 22 as shown in FIG. 37. The fastening screw 110 extends through a passage of the extension 116, which connects to the receptacle 114.

Without this being specifically shown or described in detail, the embodiments according to FIGS. 2 to 37 can be combined and exchanged with each other in detail, in particular by a) exchanging the respective attachment (clamped or screwed) of the derailleur hanger or UDH in the dropout and b) combination with or exchange of the respective upper attachment of a possibly provided reinforcing element in the area of the dropout or UDH bolt and c) combination with or exchange of the respective lower connection between reinforcing element and rear derailleur B-Knuckle in the area of the B-bolt.

In particular, the screw connection 92 between the UDH sleeve 20 and the UDH bolt 22 can be replaced by a snap-on or snap-in connection in the above-described embodiments, according to the embodiments described further above.

For the assembly of the different embodiments, the following must be pointed out. For the embodiments shown in FIGS. 15 to 24, the UDH with the reinforcing element and the rear derailleur is best mounted to the frame as follows: First attach the rear derailleur to the UDH and then position the UDH on the frame by inserting the UDH sleeve 20 into the mounting opening of the right dropout. Then the reinforcing element is positioned on the outside, making the reinforcing element engage with the bolt, after which the UDH bolt is fixed in the UDH sleeve from the outside. In the case of the embodiment shown in FIGS. 19 to 21, engagement of the reinforcing element 70 with the B-pin 72 by means of the fixing screw 98 could also be achieved later, after fixing the UDH pin 22 in the UDH sleeve 20. Alternatively, in this embodiment, the rear derailleur can also be mounted later, after positioning the UDH 14 with the UDH bolt 22 at the dropout, by turning the reinforcing element 70 to the side, if it has not yet been tightened by the UDH bolt 22, in order to position the rear derailleur at the UDH and mounting it on the UDH by screwing the B-bolt into the lower mounting opening of the base plate 18. Then, the reinforcing element 70 can be turned to the correct position and be mounted to the B-bolt using the fastening screw 98. Then the screw connection 92 between the UDH bolt 22 and the UDH sleeve 20 can be tightened.

FIGS. 38 to 46 show further examples of rear derailleurs and their assembly respectively, whereby the rear derailleurs are configured as single-arm units like conventional rear derailleurs (see FIG. 1A), but due to their special design in the assembled state together with a derailleur hanger used they form a two-arm arrangement similar to the revelation in EP'324, with the same advantages described there and mentioned again above in FIGS. 11 to 14.

The two-arm arrangement is achieved in the embodiments shown in FIGS. 38 to 46 by the fact that the B-Knuckle 274 of the respective rear derailleur is specially designed in such a way that, when the rear derailleur is mounted, it forms an integral two-arm unit supported on the right-hand derailleur hanger 212 together with the derailleur hanger 214.

As far as reasonable, the same reference marks are used in the following for corresponding or analogous elements as in the previous description of the previously treated embodiments, but in each case increased by 200. Additional or newly assigned reference marks start with reference mark 320.

This special design of the rear derailleurs according to the embodiments shown in FIGS. 38 to 46 is referred to in the following as the "1.5-arm version" or "1.5-arm rear derailleur", to distinguish it from conventional, single-arm rear derailleurs configured and mounted with one arm according to the Prior Art (see FIG. 1A) on the one hand, and from two-arm rear derailleurs as known from the EP'324 and also shown in FIGS. 47 to 55 as in another embodiment.

Figure 38:
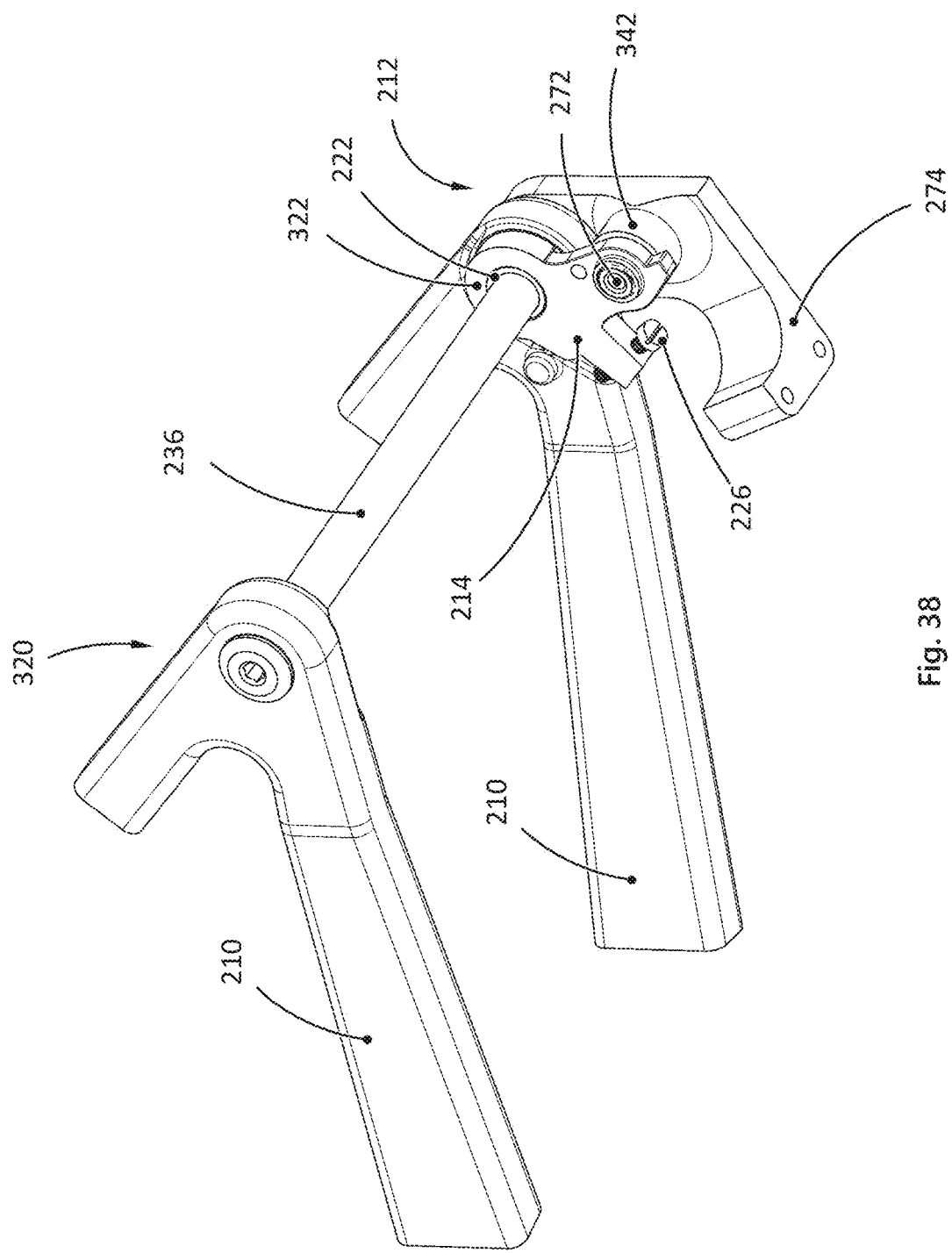
FIG. 38 shows a mounting element or derailleur hanger and a base element or B-Knuckle in an assembly situation on a bicycle frame according to a twelfth embodiment.
Figure 39:
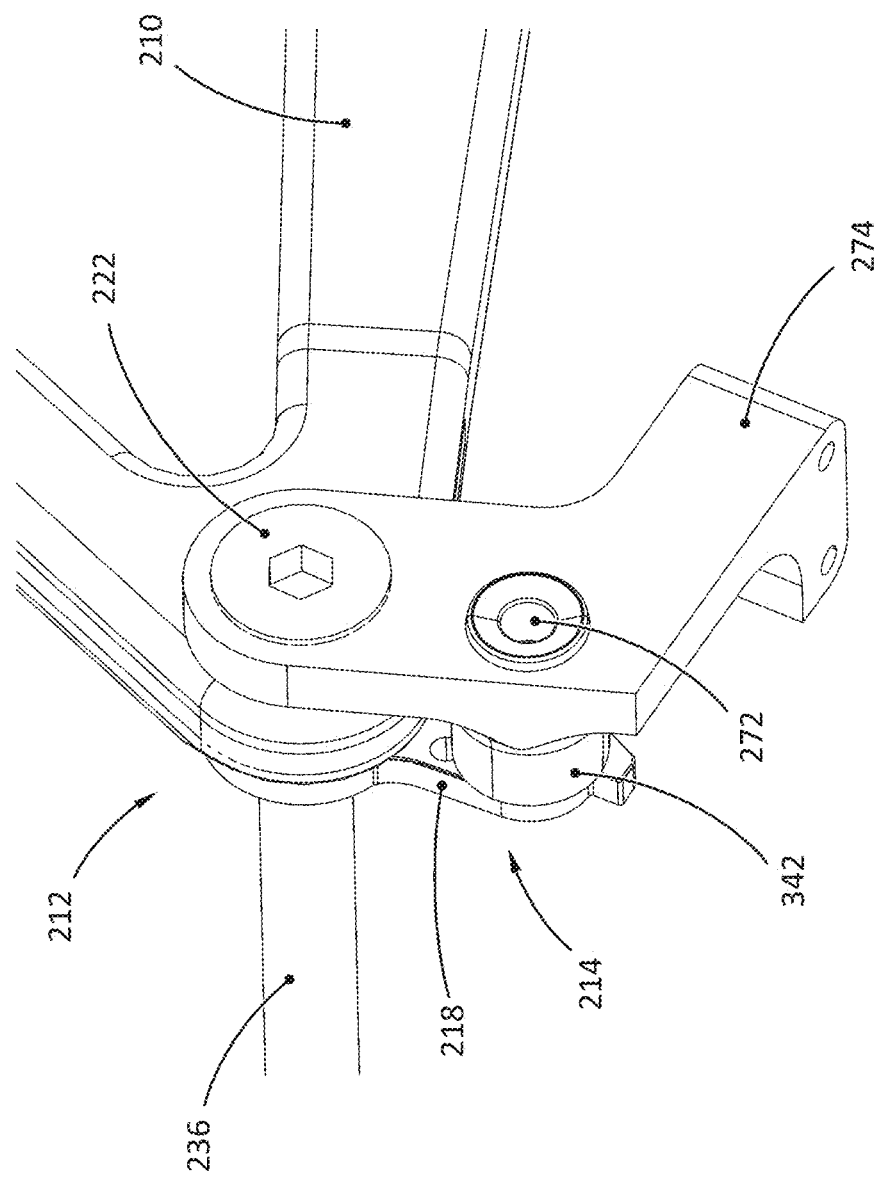
FIG. 39 shows the components of FIG. 38 from an inter alia different viewing direction.
Figure 40:
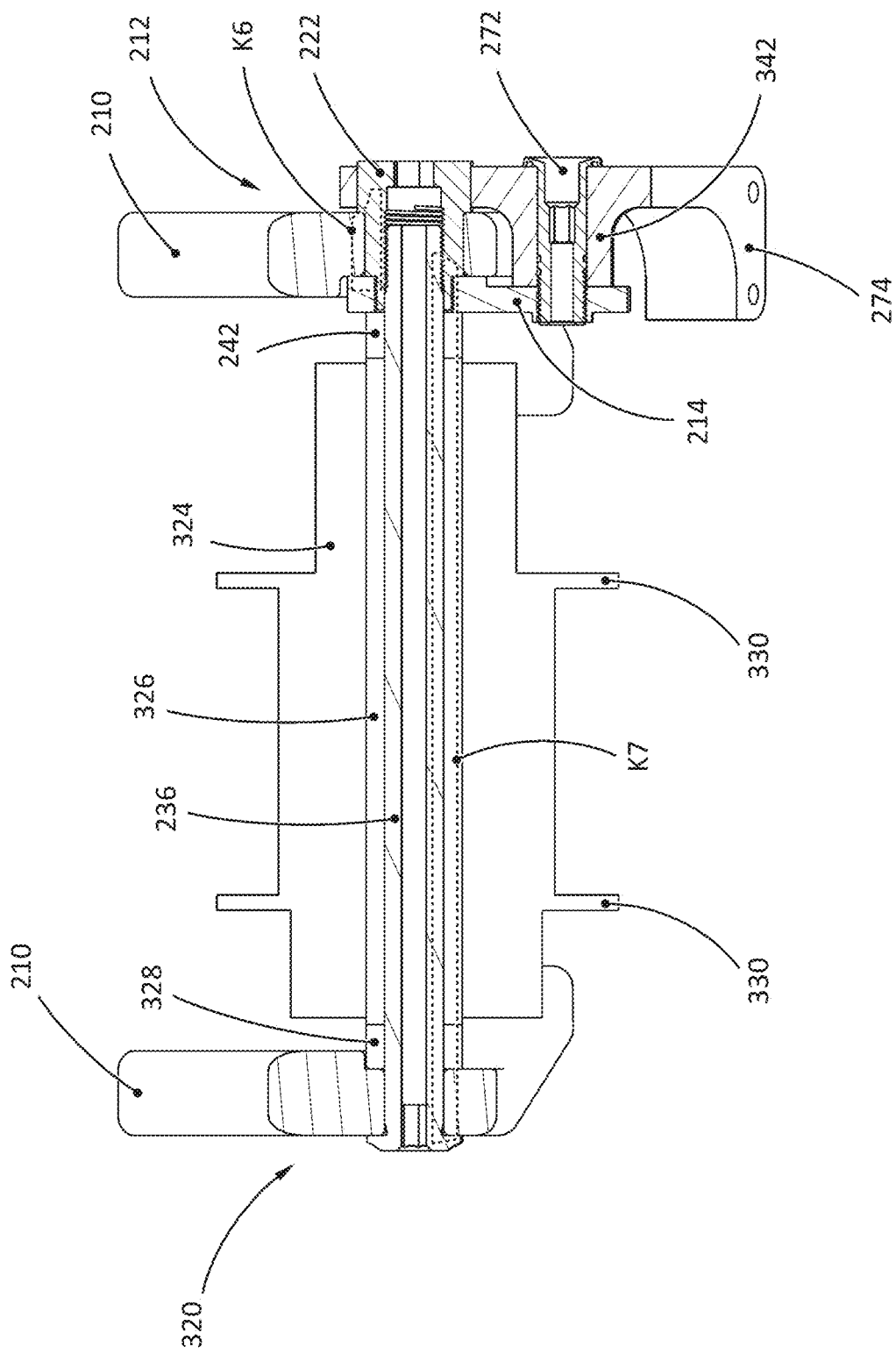
FIG. 40 shows the components of FIG. 38 in a sectional view.

A first embodiment for a 1.5-arm rear derailleur is shown in FIGS. 38 to 40. FIG. 38 shows a perspective view of the rear triangle of the bicycle frame 210, namely the left frame rear triangle with the left dropout 320 and the right frame rear triangle with the right dropout 212. A derailleur hanger 214 forms an inner rear derailleur arm, so to speak, which is rotatably clamped between the hub end cap and the B-pulley (if present) when the thru axle 236 is screwed in (see FIG. 40 and analogous situation according to FIG. 52). This has the advantage that in the event of rear derailleur collisions, friction causes energy to be dissipated and the rear derailleur does not hit. The outer rear derailleur arm is formed by a section of the B-Knuckle 274. To remove the rear wheel of the vehicle, the B-Knuckle 274 together with the derailleur hanger 214 can be swivelled backwards after loosening the thru axle. 322 indicates the clamping surface of the derailleur hanger 214 against which the hub axle or hub end cap rests, respectively. The derailleur hanger 214 is configured with a B-bolt 226 for chain gap adjustment by means of an angle lock between the derailleur hanger and the frame 210.

FIG. 39 shows particularly clearly how the derailleur hanger 214, together with the B-Knuckle 274, forms a two-arm arrangement for coaxial mounting on the right dropout 212 with respect to the hub axle, providing benefits similar to those obtained by the EP'324 solution.

In the embodiment shown, the derailleur hanger 214 is configured without a molded-on UDH-sleeve, i.e. it is simply formed by a base plate 218. Alternatively, a UDH-sleeve could be provided.

As can be seen in FIG. 38, a specially designed derailleur hanger 214 is present in this embodiment. With this derailleur hanger bracket, the B-bolt 226 (see e.g. FIGS. 11 and 22) usually located in the rear derailleur hanger is instead located in or on the derailleur hanger 214. In this embodiment, the chain gap is thus adjusted by adjusting the B-bolt 226 located on the derailleur hanger.

For this purpose, the quick-release axle 236 is loosened at least slightly in order to enable the rotary adjustment movement of the two-armed unit formed by the derailleur hanger 214 and the 1.5-arm shifting mechanism represented here by the B-Knuckle 274, cf. force flow K7 with tightened quick-release axle in FIG. 40. Depending on the tolerance position configured in the range of the force flow K6 according to FIG. 40 (force flow without quick-release axle), the axle pin must also be loosened slightly.

In the case that the screwable thru axle 236 is still missing or not tightened (force flow K6), the B-Knuckle 274 and the derailleur hanger 214 are held together by the axle bolt 222 screwed into the corresponding mounting opening of the derailleur hanger 214 and fixed at the dropout 212. If the thru axle 236 is screwed into the internal thread of the axle bolt 222 and tightened, the force flow K7 results between the two dropouts.

In FIG. 40, some common components are represented only symbolically, namely the hub end cap 242, the rear wheel hub 324, the hub axle 326, the hub end cap 328 and spoke flanges 330.

As can be seen in each of FIGS. 38 to 40, in this embodiment, the two-arm arrangement is formed by connecting derailleur hanger 214 and B-Knuckle 274 of the 1.5-arm rear derailleur using two pins, namely axle pin 222 (see UDH pin according to FIG. 1A or the usual threaded pin of a thru axle, respectively) and B-pin 272 (see usual B-pin also on conventional rear derailleurs, e.g. in FIG. 11).

In contrast to conventionally mounted rear derailleurs, e.g. according to FIG. 1A or FIG. 11, whose swiveling movement and thus chain gap adjustment takes place around the pin and thus eccentrically to the rear wheel axle, the two-arm arrangement formed according to the embodiment as per FIGS. 38 to 40 (including the 1.5-arm rear derailleur contained therein) can be swivelled concentrically to the rear axle.

In terms of rear derailleur adjustment, this embodiment has the same advantages as the coaxial mounting rear derailleurs known from the EP'324, especially with regard to the considerably simplified adjustment of the chain gap (see e.g. FIG. 10 and paragraph item iv in EP'324), as well as with regard to the elimination of the stop screw (see B-bolt 76) for the inner (left) limit stop of the rear derailleur (see e.g. FIG. 11 and paragraph in EP'324).

The accuracy, reproducibility and permanent stability of the tolerance chain between the axial position of the individual sprockets and the axial position of the upper rear derailleur roller, which is decisive for the permanent shifting precision of the rear derailleur, is also guaranteed for the embodiment as per FIGS. 38 to 40 in the same way as for the rear derailleurs for coaxial mounting known from EP'324 (see e.g. FIG. 12 and paragraphs [0008], [0039], [0099] in EP'324).

A further advantage or a further special feature of the embodiment as shown in FIGS. 38 to 40 is that a conventional rear derailleur (see FIG. 1A) can also be mounted on the derailleur hanger 214 shown there instead of the 1.5-arm rear derailleur. This also applies to the embodiments described below according to FIGS. 41 to 46.

Figure 41:
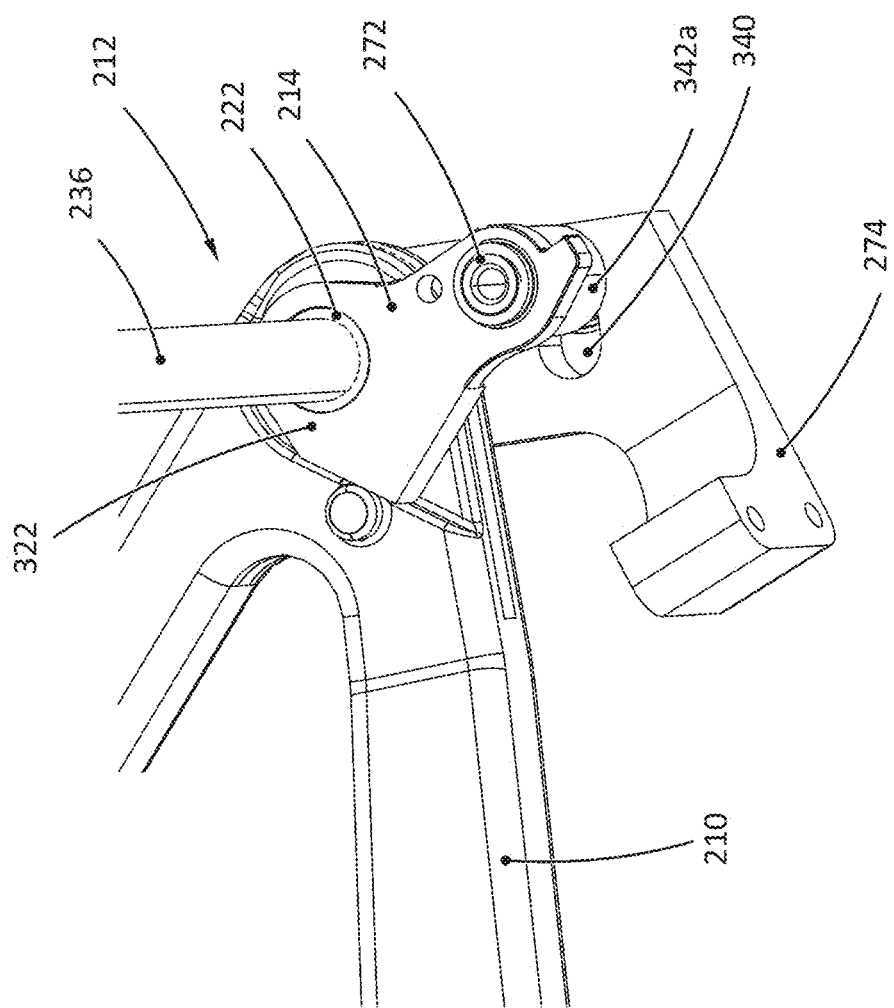
FIG. 41 shows a mounting element or derailleur hanger and a base element or B-Knuckle in an assembly situation on a bicycle frame according to a thirteenth embodiment.
Figure 42:
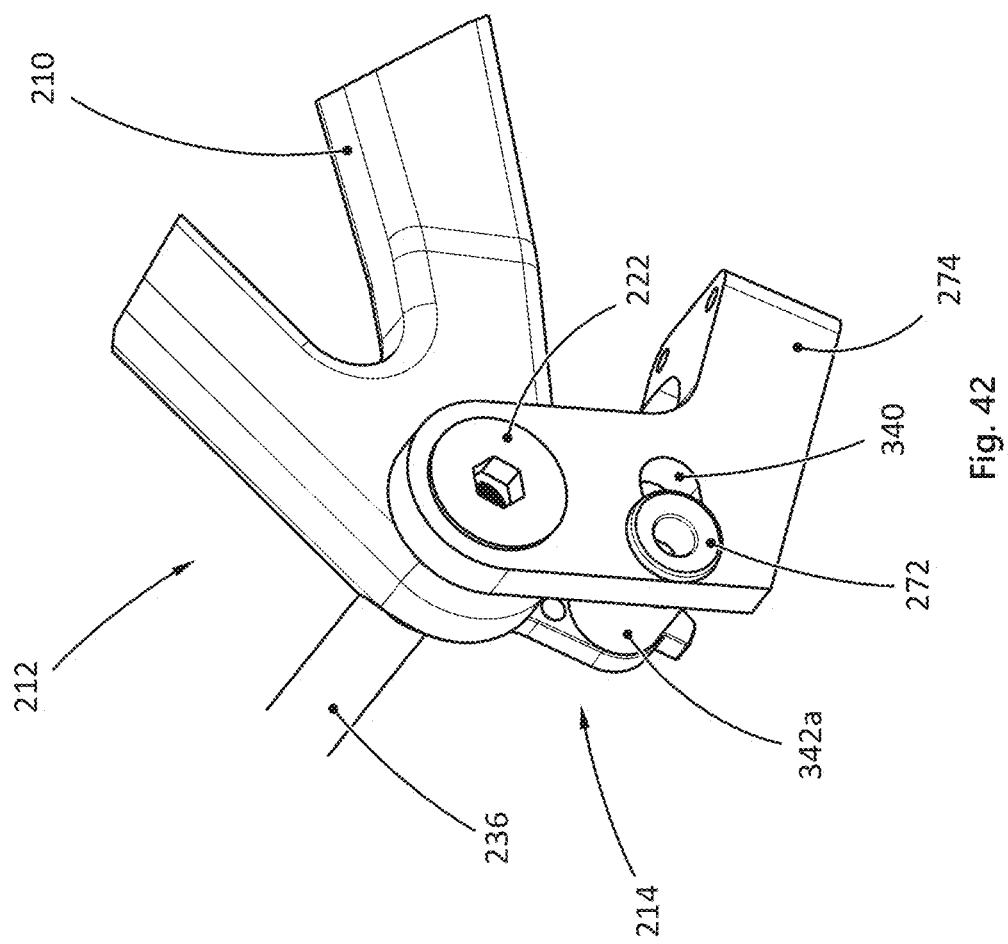
FIG. 42 shows the components of FIG. 41 from an inter alia different viewing direction.
Figure 43:
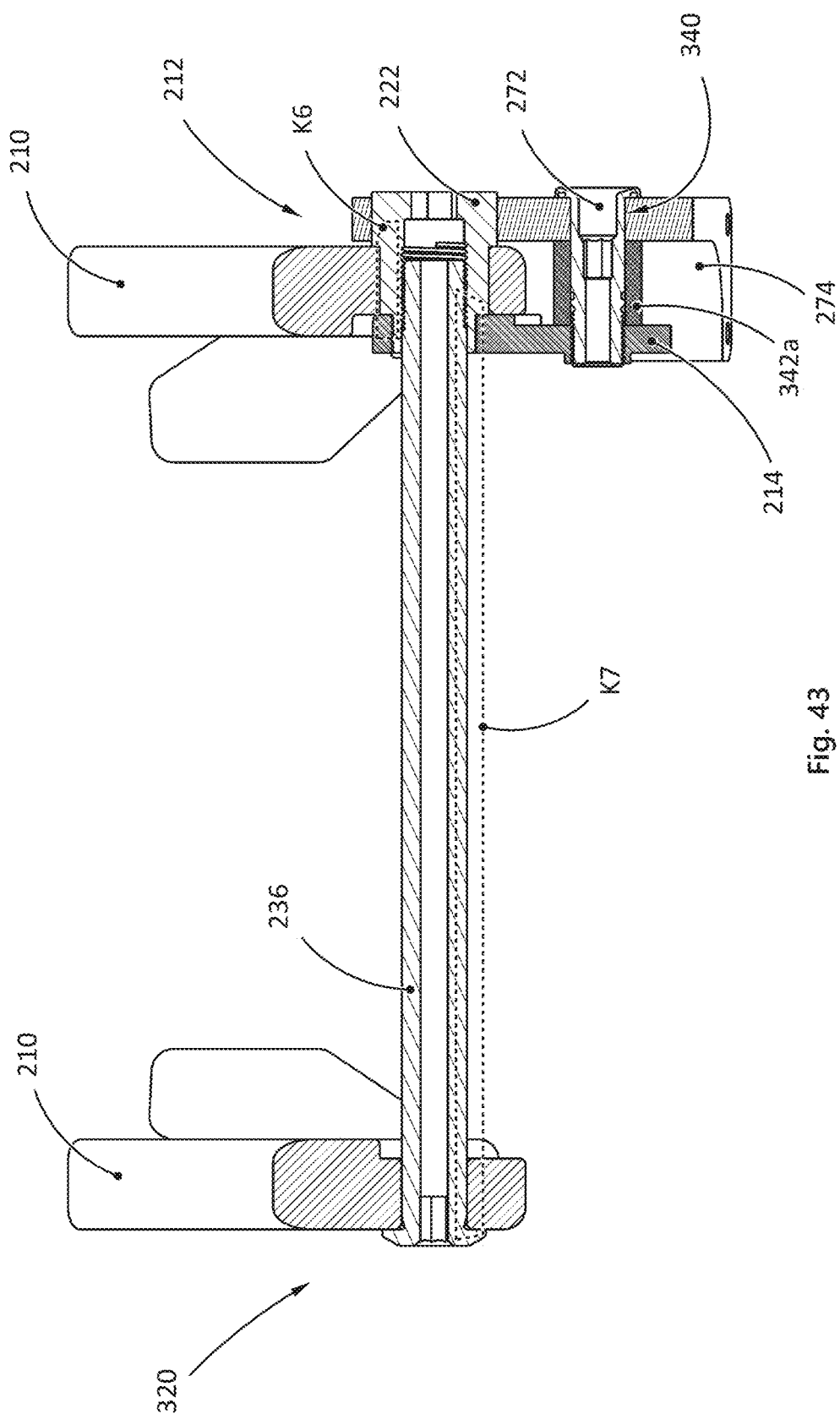
FIG. 43 shows the components of FIG. 41 in a sectional view.

The embodiment according to FIGS. 41 to 43 corresponds in most features and with regard to the advantages mentioned there to the previously described embodiment according to FIGS. 38 to 40.

The essential difference between the embodiment according to FIGS. 41 to 43 and the previously described embodiment according to FIGS. 38 to 40 consists in the fact that the derailleur hanger 214 in the embodiment according to FIGS. 41 to 43 is not pivotable for setting the chain gap but is mounted (for driving operation) in a fixed, defined angular position relative to the frame dropout, as can be seen in particular from FIG. 41.

The swivelability required for the adjustment of the chain-gap is achieved in this embodiment by a slotted hole 340 in the B-Knuckle 274 of the 1.5-arm rear derailleur, allowing the rear derailleur to swivel around the axle pin 222 after (slight) loosening of the B-pin 272, thus allowing the chain-gap or the chain tension to be adjusted, respectively.

The rear derailleur can also be swivelled to remove the rear wheel in the embodiment shown in FIGS. 41 to 43 by loosening the screw connection of the quick-release axle or removing the quick-release axle, respectively. Depending on the configured tolerance position in the range of the force flow K6 (force flow without thru axle, see FIG. 43), the axle pin must also be slightly loosened. The rear derailleur hanger and rear derailleur assembly is then swivelled backwards around the rear wheel axle and the rear wheel is removed.

In the embodiment shown in FIGS. 38 to 40, the B-Knuckle 274 is configured with an extension 342 that protrudes in the direction of the derailleur hanger 214 and is supported by it when mounted. Due to the tightened B-bolt 272, the B-Knuckle at this extension is in direct clamping engagement with the derailleur hanger 214.

In the embodiment shown in FIGS. 41 to 43, the clamping engagement between the B-Knuckle and derailleur hanger 214 is achieved with the tightened B-bolt 272 by means of an intermediate spacer 342a, which can be configured as a simple sleeve through which the B-bolt 272 extends.

Figure 44:
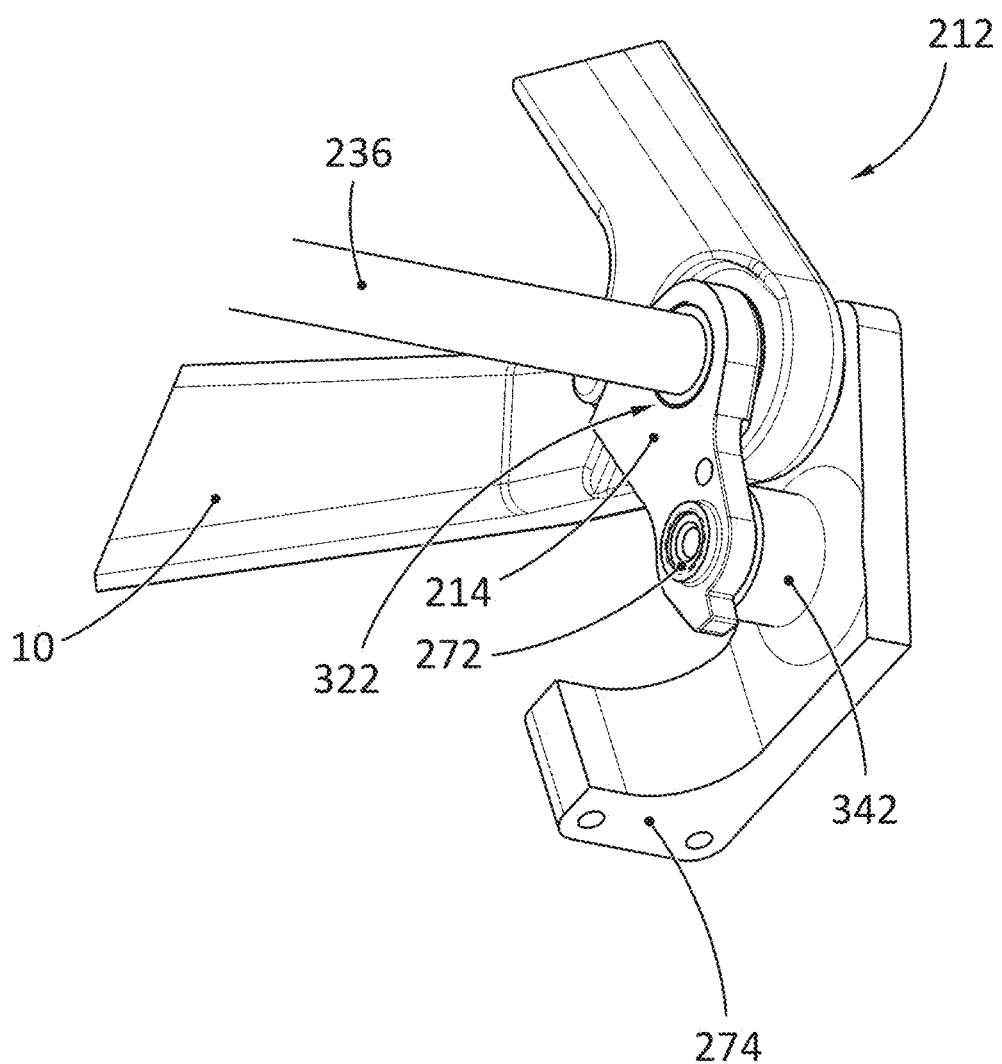
FIG. 44 shows a mounting element or derailleur hanger and a base element or B-Knuckle in an assembly situation on a bicycle frame according to a fourteenth embodiment.
Figure 45:
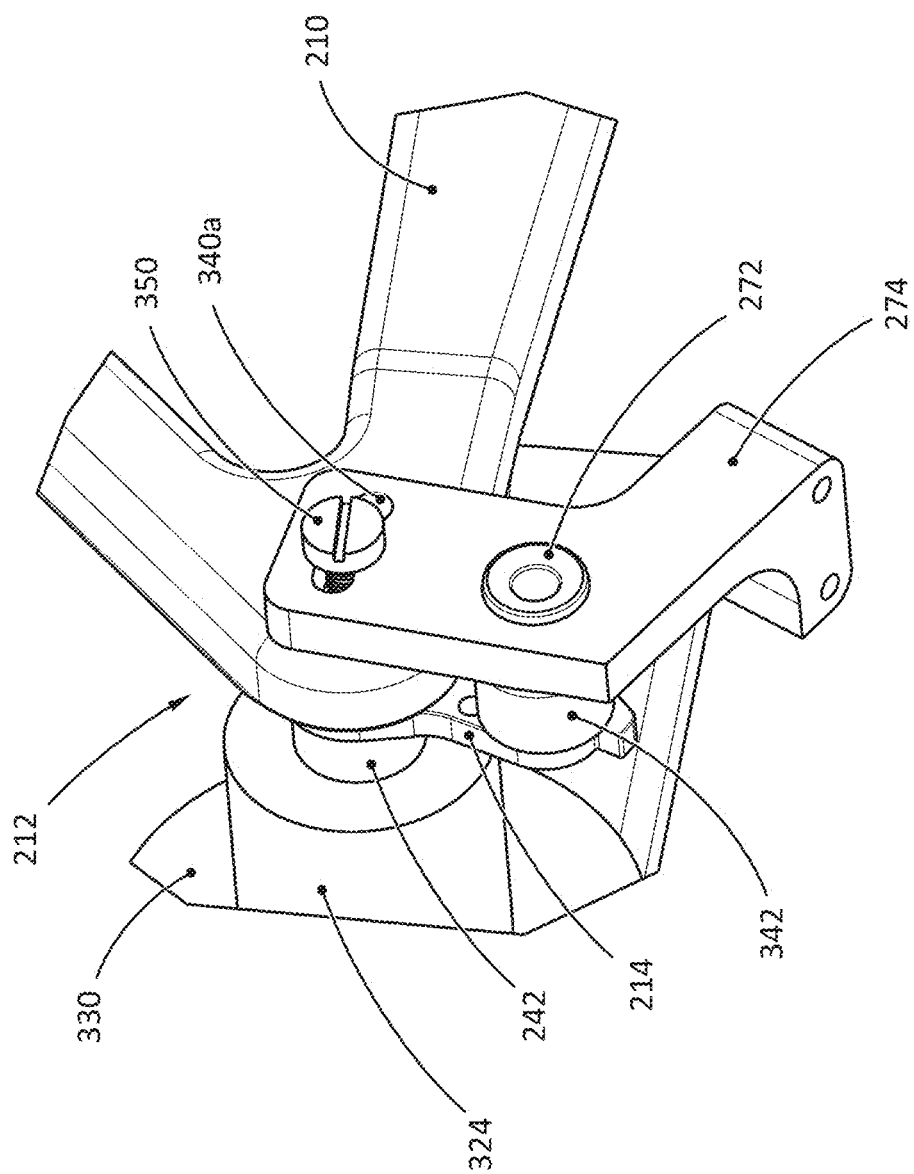
FIG. 45 shows the components of FIG. 44 from an inter alia different viewing direction.
Figure 46:
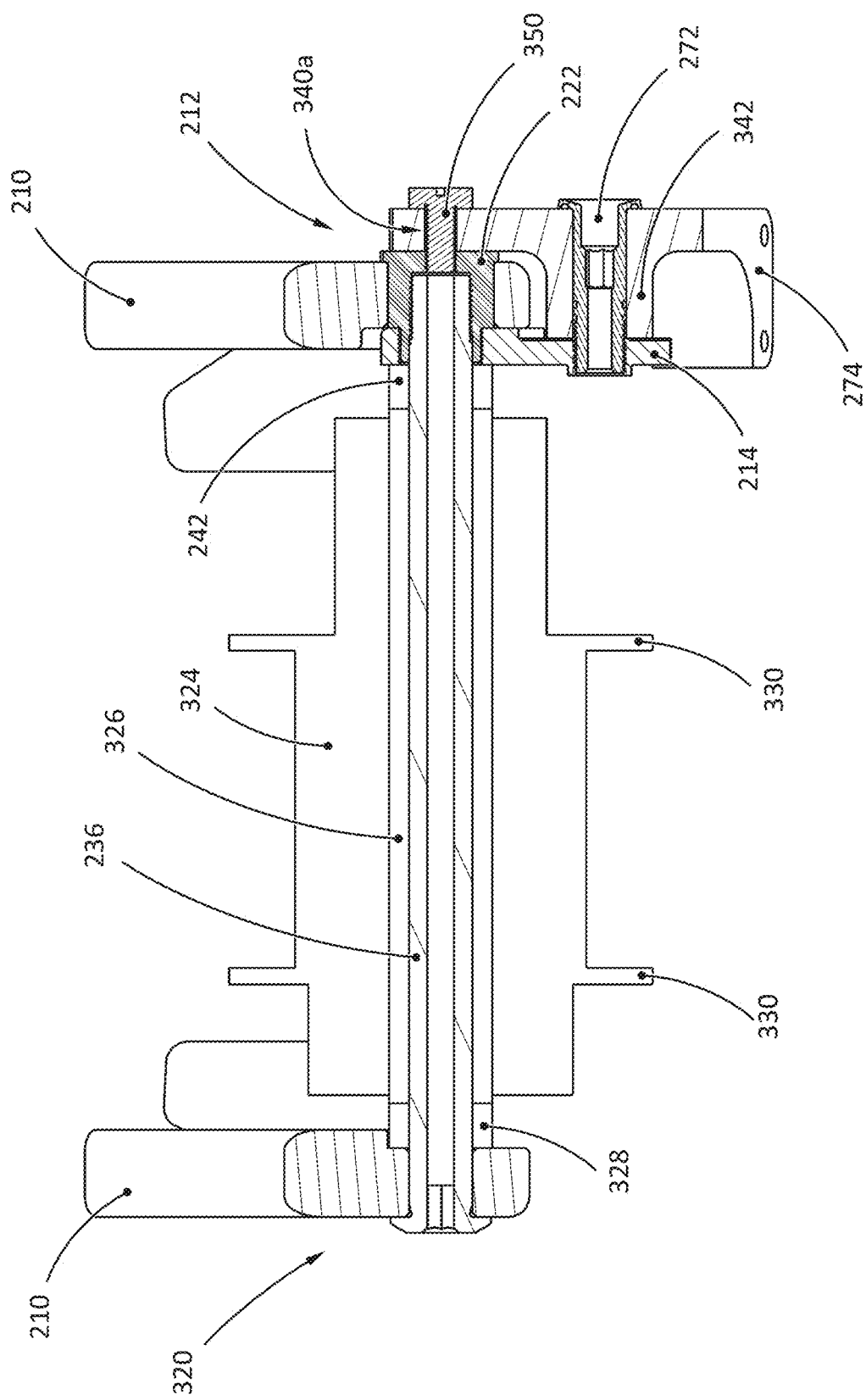
FIG. 46 shows the components of FIG. 44 in a sectional view.

A further embodiment for a two-arm arrangement is shown in FIGS. 44 to 46. At first glance, this embodiment appears to be very similar to the previous embodiment shown in FIGS. 41 to 43.

The difference between these two designs becomes clear when looking at FIGS. 45 and 42 in particular. This shows that in the embodiment according to FIGS. 45 to 47, the chain gap adjustment is not performed by swiveling the B-Knuckle 274 around the axle bolt 222 (as in the embodiment according to FIGS. 41 to 43), but eccentrically to the wheel axle by swiveling around the B-bolt 272, similar to a conventionally mounted rear derailleur (see FIG. 1A or FIG. 11).

For this purpose, the base element (B-Knuckle) 274 has a slotted hole 340a adjacent to axle bolt 222, through which a clamping screw 350 is passed and screwed into a screw opening of axle bolt 222. By tightening the clamping screw 350, the B-Knuckle 274 is fixed in a respective swivel position to achieve the desired chain gap setting.

The advantages of the 1.5-arm B-Knuckle with the associated derailleur hanger explained in connection with FIGS. 38 to 40 also apply to the embodiment of FIGS. 41 to 45, for which only the differences to the embodiment of FIGS. 38 to 40 have been explained.

In the following, embodiments and proposed solutions for Type A) rear derailleurs will be discussed.

FIGS. 47 to 55 show a two-arm rear derailleur arrangement or the B-Knuckle (base element) $20z$ of a two-arm rear derailleur $10z$, respectively. This illustration and the following description are based on the contents of EP 3 388 324 A1 (EP'324) and explains further training of the rear derailleur known from this on the basis of this revelation of EP'324, which is assumed in the following.

Accordingly, in the following description the same reference signs are used for analog or corresponding elements as in the figures of EP'324. Compared to EP'324, newly introduced numerical reference signs have a numerical value greater than 400.

The description of the inventive performance of FIGS. 47 to 55 concentrates on the differences in the sense of changes or additions compared to the known solutions of EP'324 in order to avoid repetition of already known solutions and to concentrate the description on the inventive innovation. For the basic construction of the rear derailleur according to the embodiment and its mounting on the bicycle frame and further details and embodiment options, it is expressly referred to the figures and the entire contents of EP'324.

For an easier reference to the embodiments and further training suggestions of the figures discussed above and for a good explanation in the context of this description, reference signs for some elements are given in brackets in FIGS. 47 to 55 and the following description, which correspond to the reference signs of the previously discussed embodiments.

The rear derailleur arrangement of FIGS. 47 to 55 or a rear derailleur designed as shown in FIGS. 47 to 55, respectively, thus corresponds in its essential characteristics and associated advantages to the two-arm rear derailleur for coaxial mounting revealed in EP'324.

Figure 47:
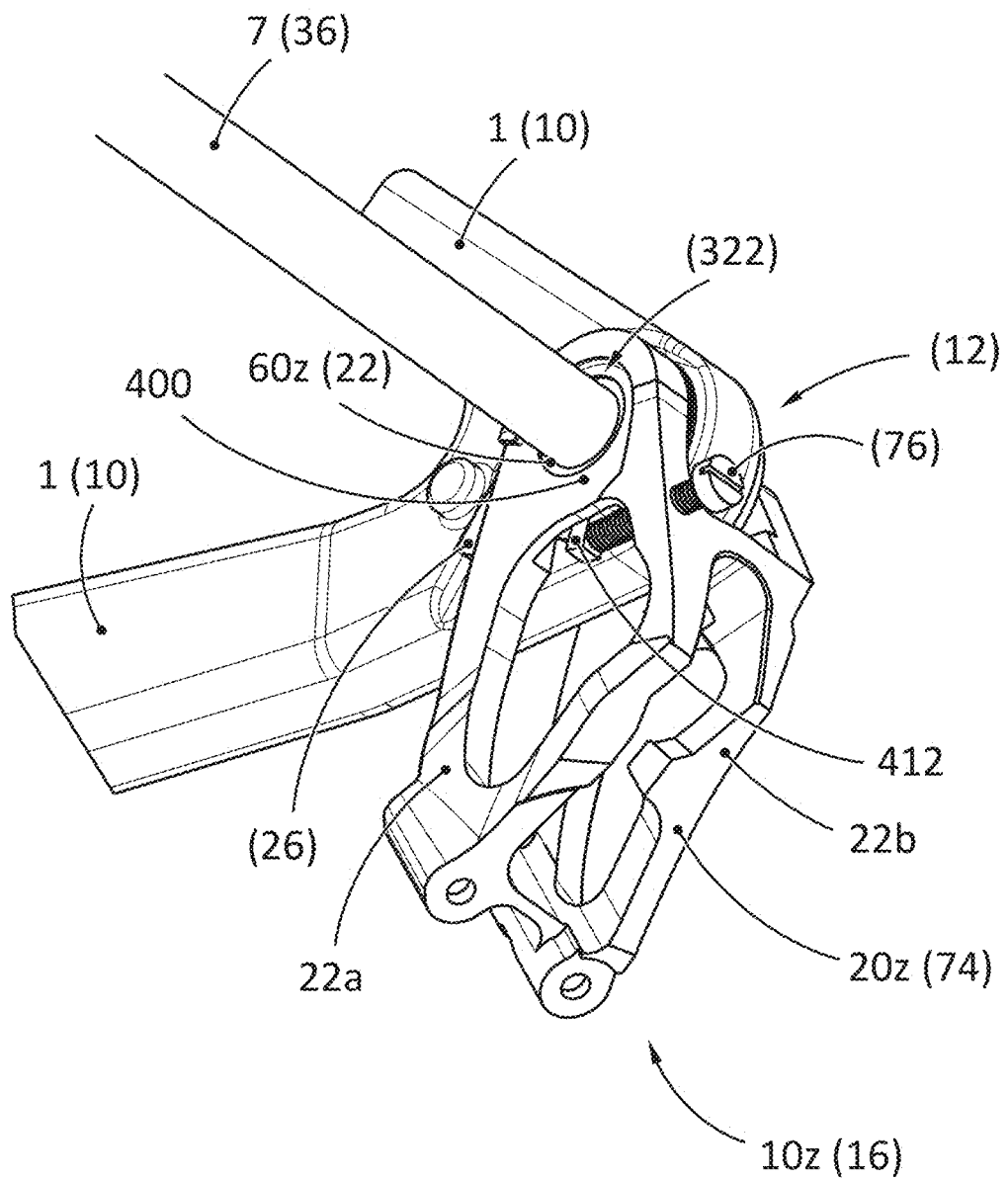
FIG. 47 shows a two-armed base element or B-Knuckle in a coaxial assembly situation on the frame of a bicycle.
Figure 48:
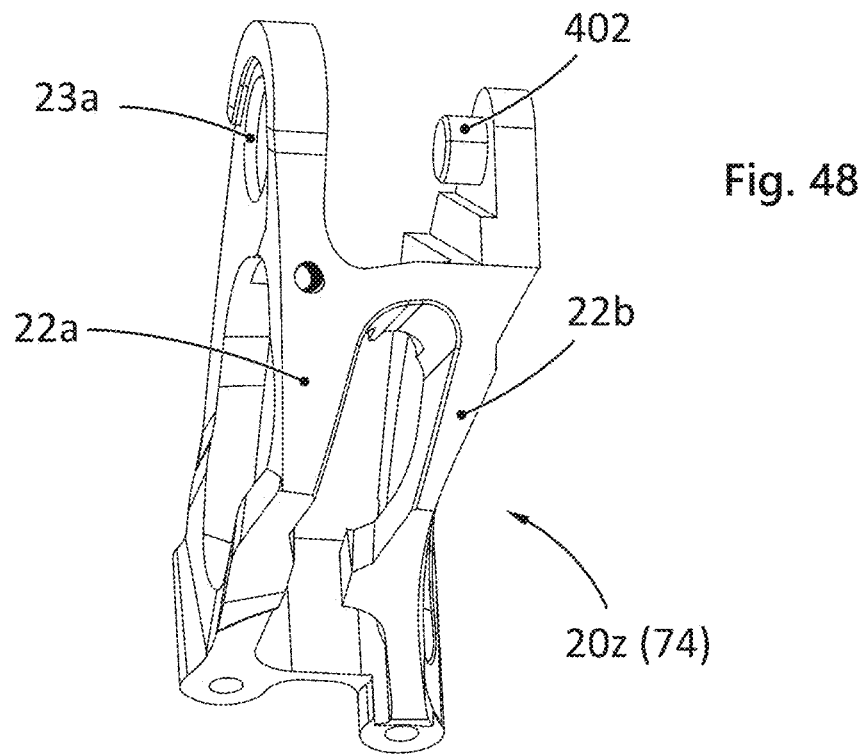
FIG. 48 shows the two-armed base element on its own in a first view.
Figure 49:
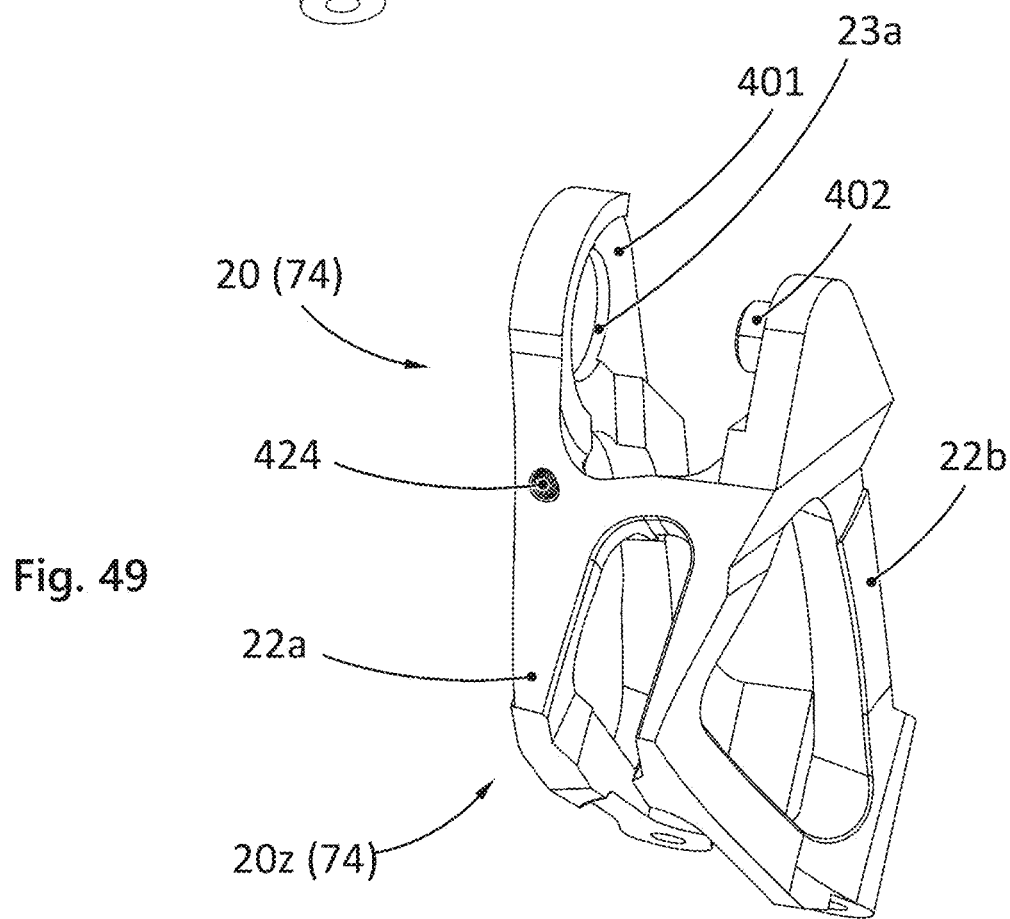
FIG. 49 shows the two-armed base element in a second view.
Figure 50:
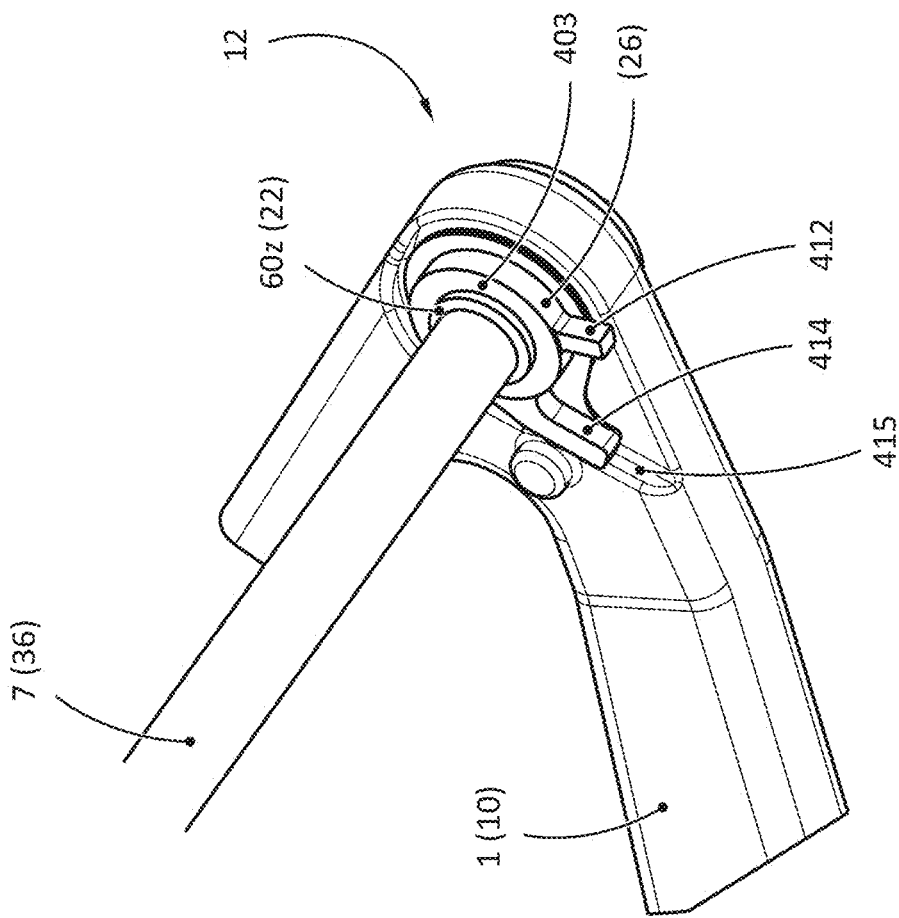
FIG. 50 shows the assembly situation of FIG. 47 without the two-armed base element.
Figure 51:
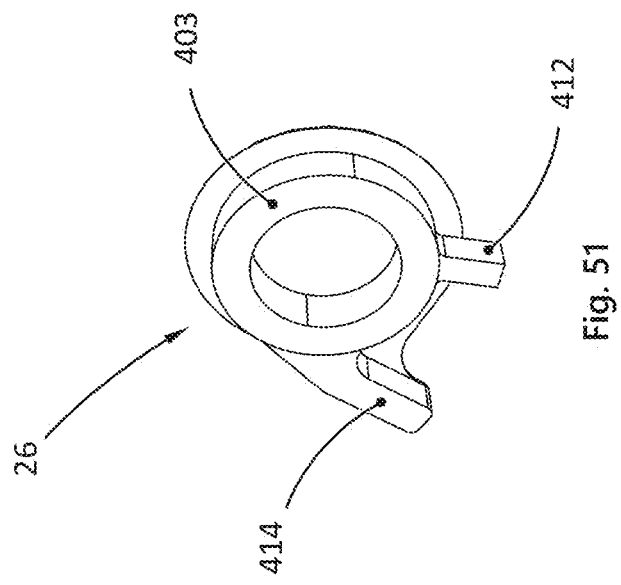
FIG. 51 shows a so-called B-pulley on its own which provides support on the bicycle frame.
Figure 52:
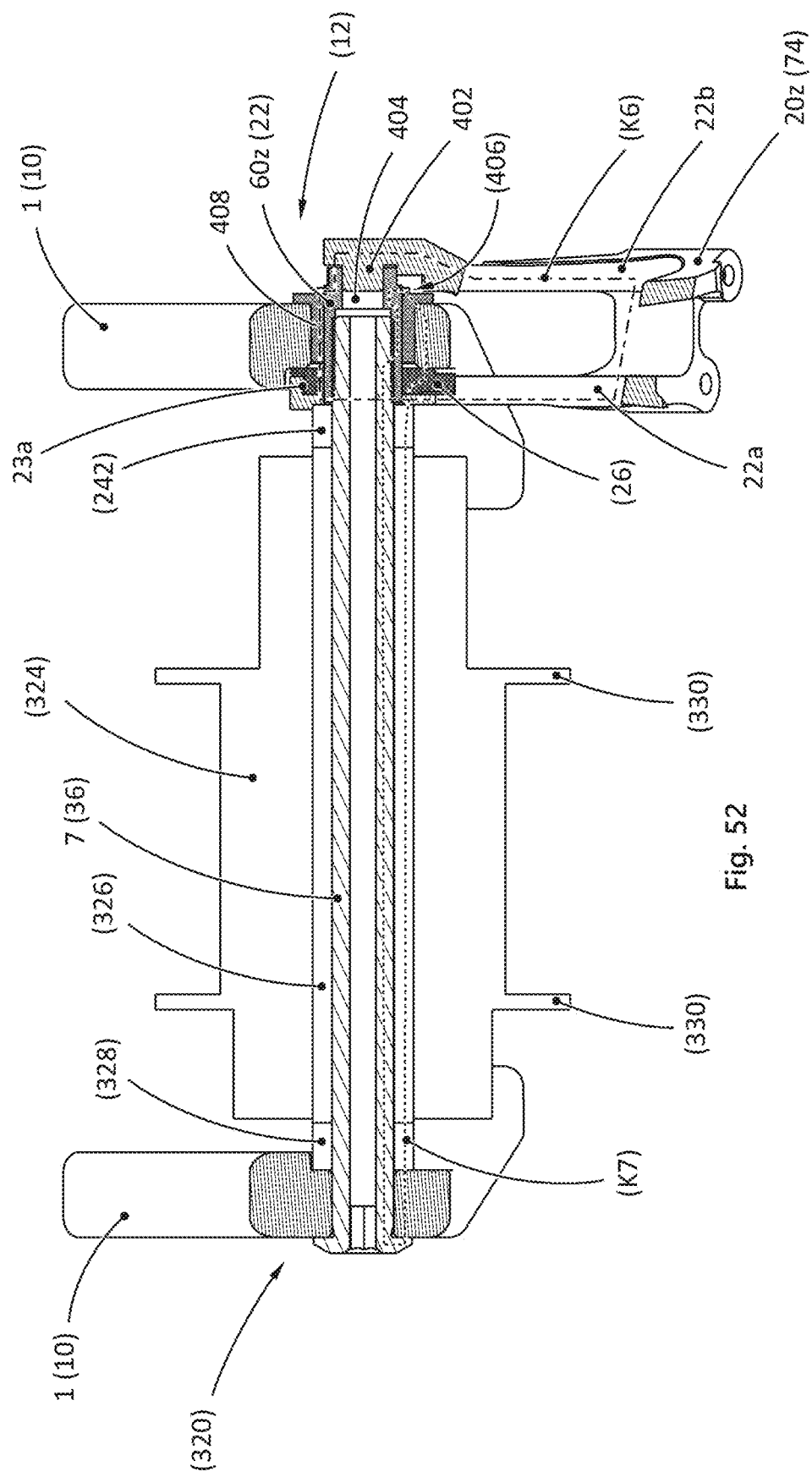
FIG. 52 shows a sectional view of the assembly situation of FIG. 47.
Figure 54:
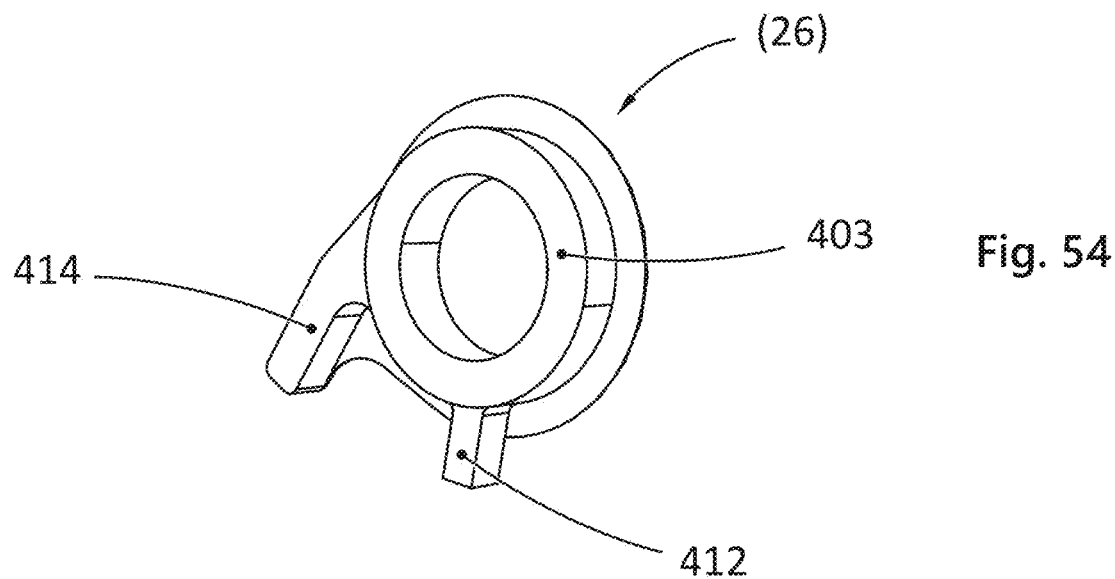
FIG. 54 shows once again the B-disc designed with two radially projecting arms in a perspective view.

The inner rear derailleur arm 22a, which has a centering opening 23a, is rotatably clamped between the hub end cap and a B-disk (26) adjacent to the thru axle 7 (36), approximately on an annular surface at 400 in FIG. 47 (see also FIG. 52). The opposite clamping surface for contact with the B disk (26) is marked 401 in FIG. 49. 403 designates the assigned counter clamping surface of the B-disc (see FIGS. 50 and 51). This has the advantage of preventing the rear derailleur from knocking. In case of rear derailleur collisions, energy is dissipated. When the thru axle is released, the B-Knuckle $20z$ (74) can be freely swivelled backwards, e.g. for removing the wheel.

A significant difference between the rear derailleur according to the embodiment as shown in FIGS. 47 to 55 and the two-arm rear derailleur according to the teaching of the EP'324 is the design of the right rear derailleur arm 22b and its connection to axle bolt $60z$ (22) of thru axle 7 (36).

While the right rear derailleur arm 22b according to the teaching of EP'324 (see e.g. FIG. 8) slides in rotation on a corresponding contact surface 63a of axle pin 62 by means of a cylindrical inner surface or centering opening 23a respectively, the right rear derailleur arm 22b is connected to the axle pin $60z$ (22) of quick-release axle 7 (36). The right rear derailleur arm (22) in the embodiment as per FIGS. 47 to 55 is centered via a centering projection 402 arranged on the right rear derailleur arm, which engages in recess 404 at the right end of axle bolt $60z$ (22) and is guided by this in a centering manner.

In the embodiment as shown in FIGS. 47 to 55, this is due to the fact that the axle bolt $60z$ (22) is no longer screwed into the dropout (12) (as shown in the EP'324 teaching). Instead, in the embodiment as per FIGS. 47 to 55, the axle bolt is merely inserted and axially fixed by means of an axial securing device, in this case a snap ring 406, as shown in the sectional drawing in FIG. 52 and FIG. 55. The axle bolt $60z$ (22) to be inserted from the inboard or inside, i.e. from the left, and inserted into the dropout (12) or the compensating bushing 408 inserted from the outside, respectively, has a corresponding coupling formation, in this case a groove 407 for the snap ring.

With regard to the associated advantages, in particular with regard to the flow of force, the same applies as described above in the description of the embodiment as per FIGS. 2 to 4 regarding the advantages of plug-in or snap-on connections between UDH pin/axle pin and UDH sleeve, respectively.

Figure 55:
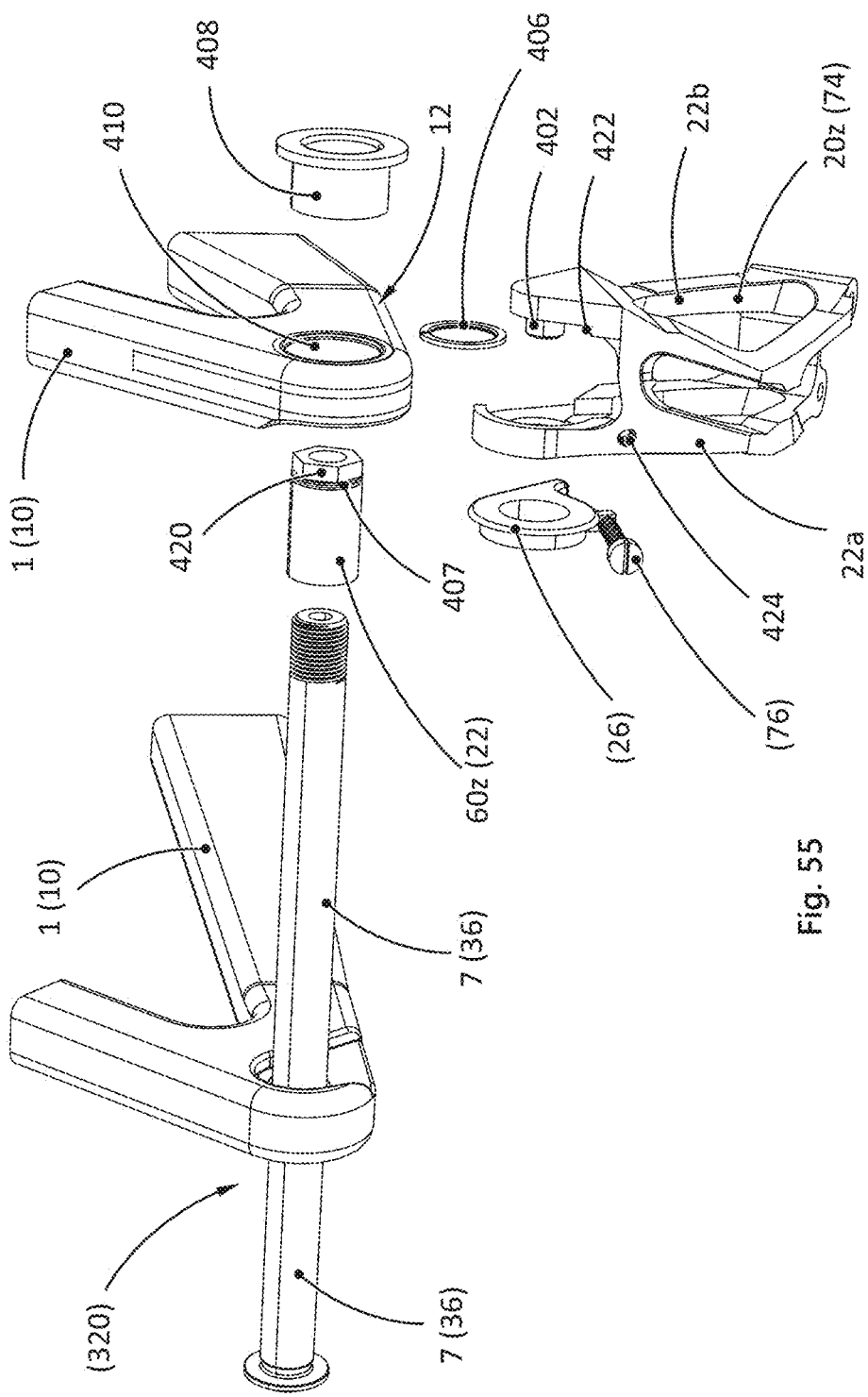
FIG. 55 shows the various components visible in FIG. 52 in a perspective exploded view.

The compensating bushing 408 shown in FIGS. 52 and 55 is not absolutely necessary. In inter alia other diameter ratios, e.g. when the dropout inner diameter 410 and the axle pin outer diameter are identical, the compensating bushing may be omitted.

Another important difference between the rear derailleur according to the embodiment as shown in FIGS. 47 to 55 and the two-arm rear derailleur according to the EP'324 teaching is the way in which the chain gap is adjusted in the present embodiment. For this purpose, the B-Knuckle $20z$ (74) of the rear derailleur, as particularly visible in FIGS. 47 and 53, comprises a B-bolt (76) screwed into a screw opening 424 of the B-Knuckle, which comes to rest on a stop face of a radially projecting stop arm 412 arranged on the B-disk (26) of this embodiment. The B-disk (26) is supported by a radially projecting support arm 414 on an associated support formation 415 on the inside of the bicycle frame 1(10).

The associated torque support between the B-Knuckle and the B-disc (26) and further on the frame 1(10) firstly leads to an easy to perform and then at any time reproducible adjustment of the chain gap. In terms of function, the B-disk in the embodiment as shown in FIGS. 47 to 55 thus corresponds to the adapter nut from EP'324 described above.

Figure 53:
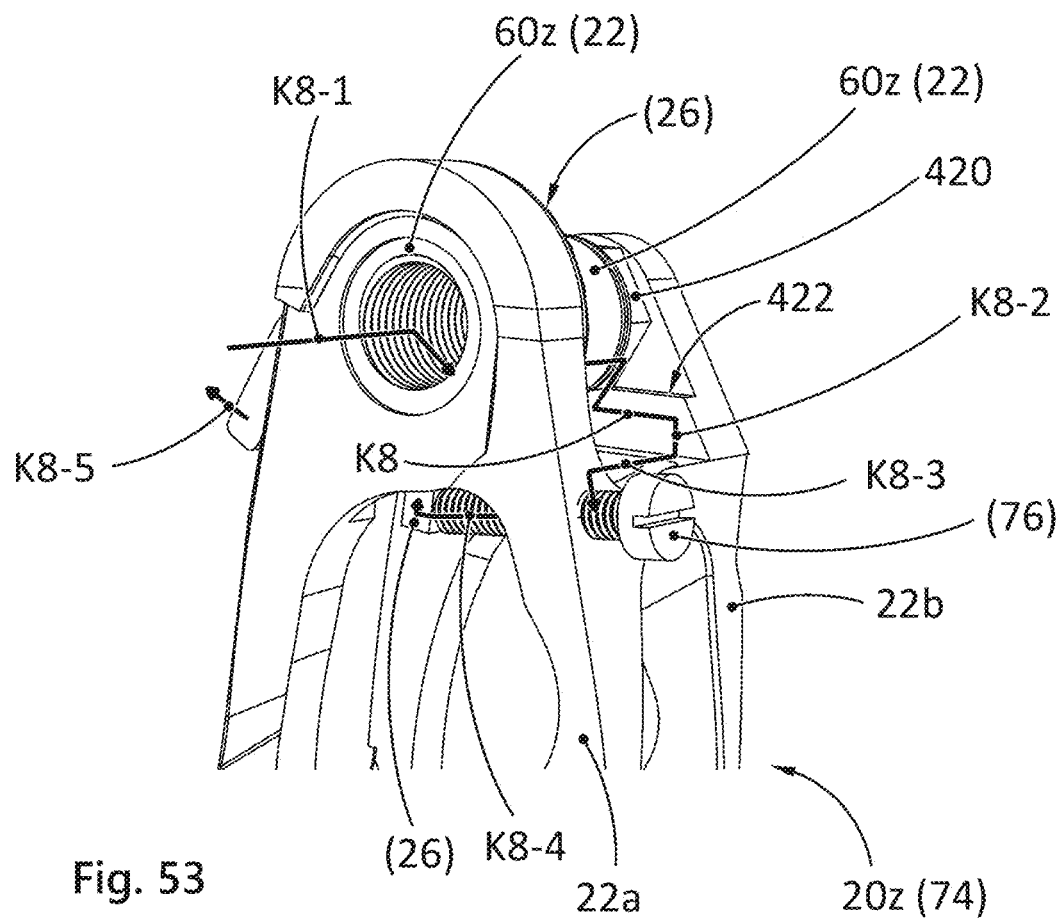
FIG. 53 shows an upper area of the two arms of the base element of the fifteenth embodiment together with an associated adapter or axle bolt, which can also be seen in FIG. 52.

In addition, in the embodiment according to FIGS. 47 to 55, the threaded torque that occurs when screwing in the thru axle 7 (36) is also introduced via the B-bolt (76) and the B-disk (26) into the arrangement of B-Knuckle $20z$ (74) and B-disk (26) in such a way that correct contact of both the B-bolt on the B-disk and the stop face of the support arm 414 of the B-disk (26) on the frame dropout is ensured by screwing in the thru axle (see FIG. 53).

This prevents adjustment errors when installing the rear wheel or tightening the quick-release axle, in particular if, for example, no chain is mounted which would otherwise pull the rear derailleur to its front stop via the chain pretension.

Instead, the B-Knuckle $20z$ (74) automatically assumes its target rotational position around the rear wheel axle at the front stop opposite the dropout (see FIG. 50) and thus opposite the frame rear triangle, even without the bicycle chain fitted (see FIGS. 47 to 55), which is necessary for correct adjustment of the chain gap.

This adjustment and therefore the chain gap are regulated via the B-bolt (76), see FIG. 47. This also eliminates the knurl on the B-disc required according to the teaching of EP'324, which secures the rotational position of the adapter nut 66 there (see there e.g. FIG. 6), which fixes the chain gap adjustment made via the stops, see section in EP'324.

When unscrewing the thru axle 7 (36), the force flow K8 from the axle bolt 60z (22) to the B-Knuckle 20z (76) runs in a similar manner to FIG. 53, i.e. via the hexagon 420 arranged on the axle bolt, which in the illustrated, mounted state is positively seated against an associated stop projection 422 of the B-Knuckle. The B-Knuckle 20z (76) is then held in position by hand, for example, to be able to unscrew the quick-release axle 7 (36). In detail: 1) The force flow or the torque from the thru axle thread to the axle bolt thread is marked K8-1, respectively. 2) K8-2 describes the torque from the axle bolt to the B-Knuckle. 3) K8-3 denotes the torque from the B-Knuckle to the B-Bolt, 4) K8-4 denotes the torque from the B-Bolt to the B-Disc and 5) K8-5 denotes the torque from the B-Disc to the dropout and thus the frame.

Further force flows are shown in FIG. 52. The force flow (K7) is the force flow when the thru axle is screwed on. The B-Knuckle is rotatably clamped by this force flow with the bolted thru axle to absorb energy, similar to EP'324, paragraph [0082], FIGS. 4, 16 and 24a. The force flow without thru axle is marked (K6) and holds the B-Knuckle 20z (74), the axle bolt 60z (22), the compensating bushing 408 and the B-disk (26) together without stress by means of the snap ring 406, so that the B-Knuckle can be freely swivelled backwards for wheel removal.

The rear derailleurs or base elements (B-Knuckle) of type A), respectively, achieve a much stiffer overall system, which is very advantageous for a better shifting quality. In addition, the system is less susceptible to bending in the event of a shock/impact.

However, not using the derailleur hanger as the intended bending/breaking point carries the risk of damaging the derailleur without the possibility of repair. The bicycle frame is also more prone to damage.

According to an embodiment, it is therefore suggested that the base element (the B-Knuckle) is configured to perform an avoidance movement, at least in sections, which is released by a shock overload protection of the base element if necessary. In this respect, the following solutions illustrated in FIGS. 56 to 61 are considered:

i) B-Knuckle with Easily Adjustable Deformable Element

An embodiment involves the use of a material or element 450 which absorbs the load from the impact and deforms. The material or element, respectively, is constructed or designed in such a way that the B-Knuckle 20z (74) can easily be bent back into its original position several times, preferably without the need for an additional aid.

In principle, any material, e.g. metal or plastic, can be used which is suitable for being bent back again, be it elastic or plastic.

This material or element connects and holds in position an upper part of the B-Knuckle, which is attached to the bicycle frame, with the lower part of the B-Knuckle, which holds the parallelogram.

It is advantageous to provide a secondary element on the unbent part of the two-part B-Knuckle, which indicates the original position and allows the rider to make the repair and return the two B-Knuckle parts to their original position.

In order not to affect the overall stiffness of the b-axle leg, a simple plug, plug, pin, insert or similar (see element 452 in FIG. 56) can hold the two parts in place. It may be a predetermined breaking element whose strength is set to a certain value which is lower than the force required to deform the rear derailleur parts. This element can be replaced by a replacement element after realignment or repair.

Figure 56:
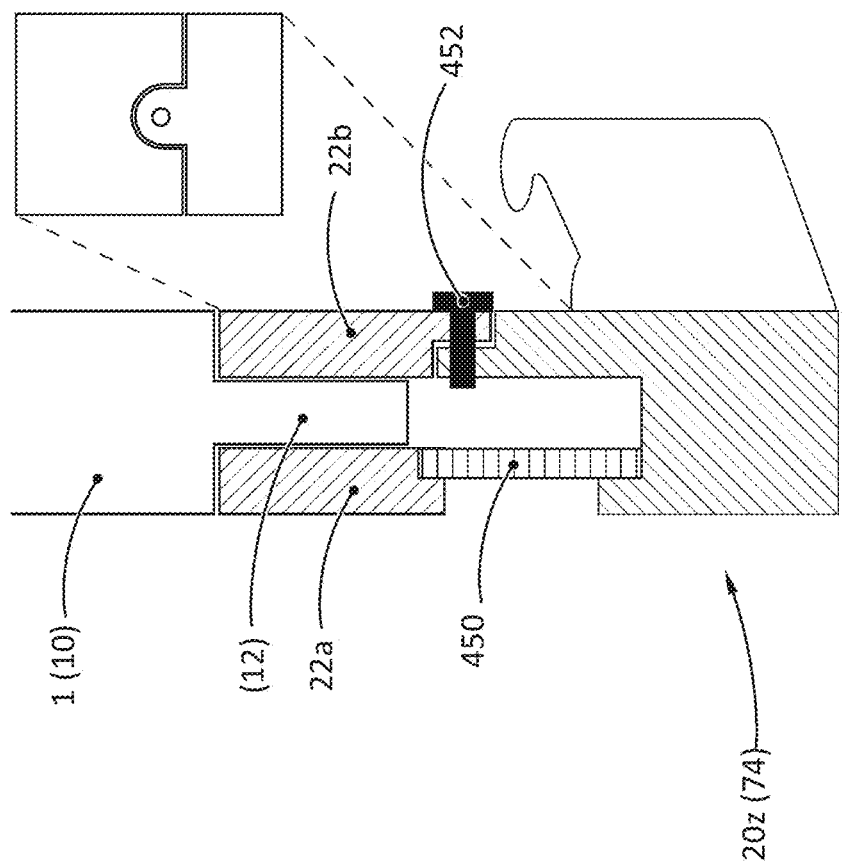
FIG. 56 schematically shows a two-armed base element or B-Knuckle in an assembly situation on the bicycle frame in a partially cut view.

A concrete implementation possibility that comes into question is shown in FIG. 56.

It is advantageous to provide an end stop for the lower, pivoting part of the B-Knuckle to prevent the rear derailleur from colliding with elements of the rear wheel (e.g. the spokes).

ii) B-Knuckle with One Hinge Element

This solution corresponds to solution i), but the flexible material or element is replaced by a hinge 454.

Figure 57:
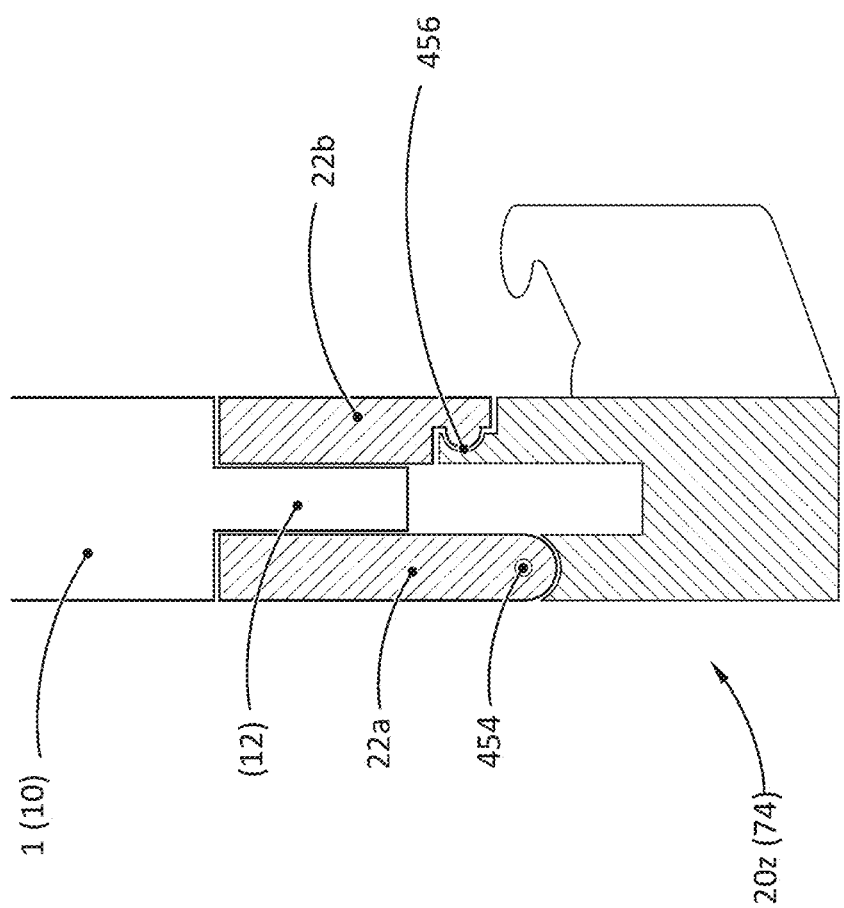
FIG. 57 schematically shows a seventeenth type of two-armed base element in an assembly situation on the bicycle frame in a partially cut view.

A concrete realization possibility that comes into question is shown in FIG. 57. Instead of a predetermined breaking element, a snap-in connection 456 is provided.

Preferably, an end stop should also be provided for this solution to prevent the rear derailleur from colliding with elements of the wheel such as spokes in order to prevent further damage to the wheel.

iii) B-Knuckle with One Clutch Element

This solution again corresponds to solution i), but the flexible material or element is replaced by a coupling 458, which also makes the predetermined breaking element dispensable. It can be a friction clutch, for example in the form of a so-called slip clutch.

Figure 58:
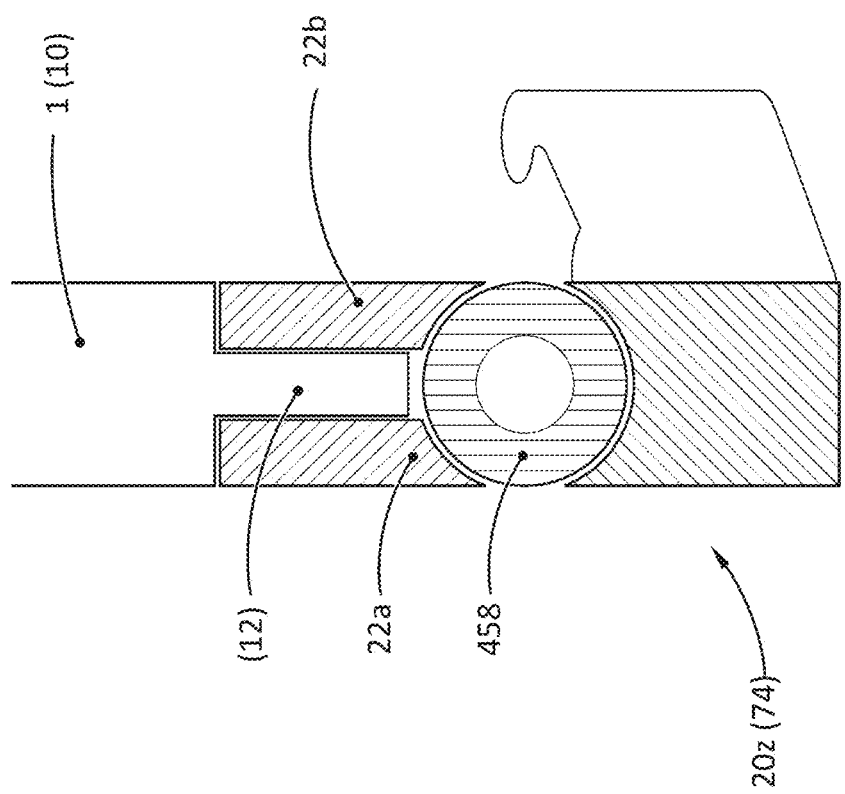
FIG. 58 schematically shows a two-armed base element in its eighteenth embodiment in an assembly situation on the bicycle frame in a partially cut view.

A concrete implementation possibility that comes into question is shown in FIG. 58.

The clutch allows the rear derailleur to move in case of an impact/fall. As an option, the clutch can be indexed in order to assume the function of an end stop (also possible in principle).

iv) Display of the Nominal Alignment

In all the solutions discussed above, a marker or display, for example in the form of a graphic element 460 on the B-Knuckle 20z (74), can be provided to make the straightness or the deviation from the straightness, respectively, of the B-Knuckle easily recognizable.

A straight line can be provided as a graphic element or marker, for example. FIGS. 59 and 60 illustrate this possibility.

An inter alia possibility is an element that can be measured or recorded with a special measuring device. One could provide special tools that can be used to align the B-Knuckle in its original position.

At least one tapped hole (e.g. M10) or other coupling formation on the B-Knuckle, if any, could allow the use of standard tools for straightening derailleur housings or a tool specialized for this solution.

v) B-Knuckle Dividing into Several Parts in Case of Overload

If all parts of the derailleur system are too heavily loaded, e.g. due to an impact or a chain jam, at least one predetermined breaking element 462 provided for this purpose, which holds two B-Knuckle parts 464 and 466 together, breaks and allows the B-Knuckle to be disassembled into the two individual parts. This separation separates the derailleur (lower B-Knuckle part 466, pivoting mechanism 468, moving element and chain guide assembly) from frame 1 (10) and allows it to move away from any impact forces acting on it. From this moment on, it is only connected to the bicycle via the chain and the shift cable (if no wireless shifting is implemented).

The rear derailleur is repaired by using a new predetermined breaking element 462 and reassembling the B-Knuckle. The B-Knuckle is kept in the assembled state by the predetermined breaking element and, if necessary, suitable engagement and counter-engaging formations 470 and 472 of the two B-Knuckle parts. The predetermined breaking element 462 can be configured e.g. as a plug or pin.

Figure 61:
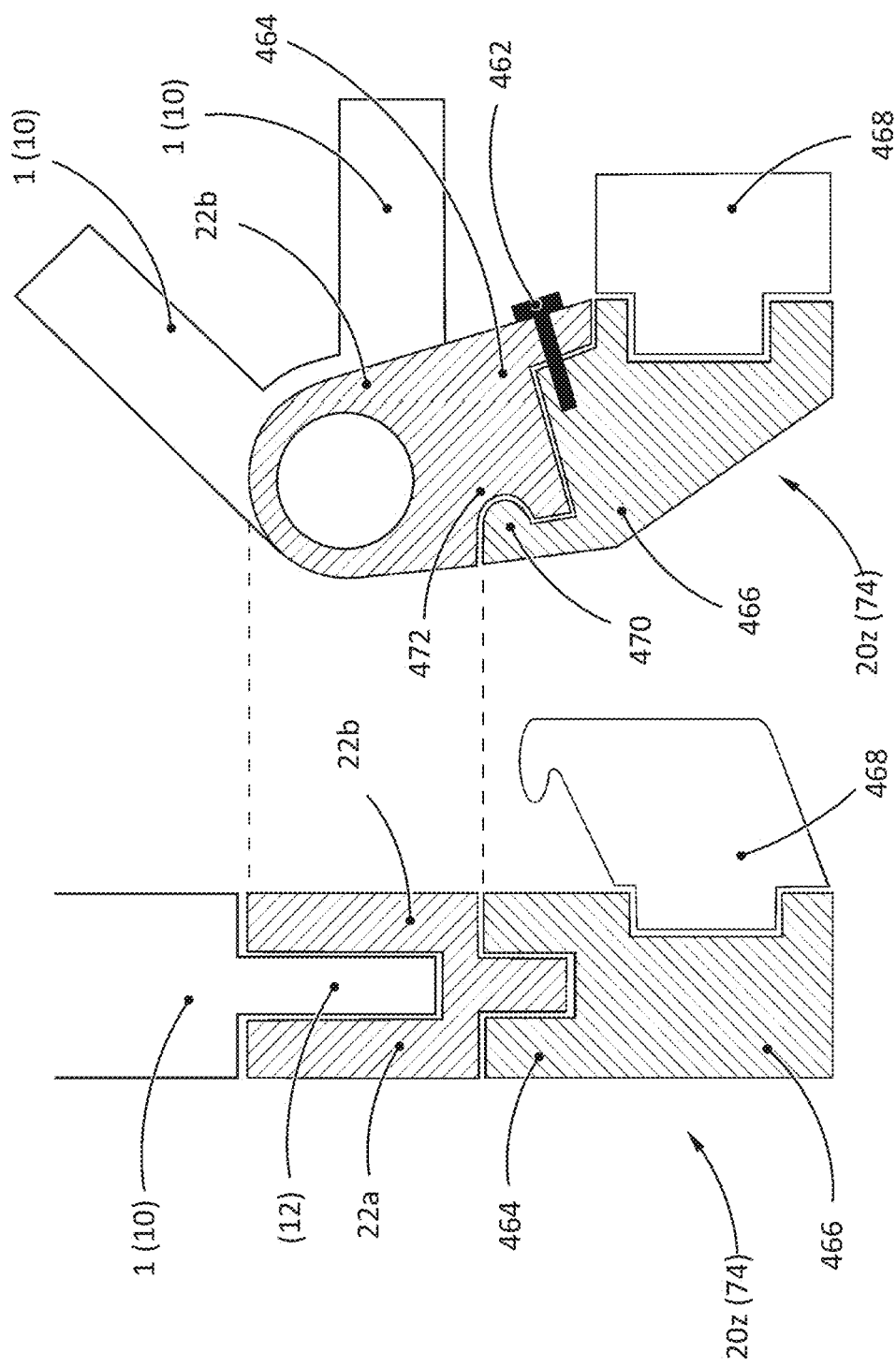
FIG. 61 schematically shows a nineteenth embodiment of a two-armed base element in an assembly situation on the bicycle frame in a rear view and in a side view.

A concrete implementation possibility that comes into consideration is shown in FIG. 61.

In an embodiment, a combination of a base element (274) of a rear derailleur system derailleur and a mounting set comprising a mounting element (214) with an associated retaining bolt (222) adapted to be mounted to a mounting section (212) of a bicycle frame (210), the mounting element (214) being further adapted to mount the base element (274) to the mounting section (212). The mounting element (214) comprising a first section having a through opening which is associated with a mounting opening of the mounting section and is coaxial therewith in the state of the mounting element being mounted on an inner side of the mounting section;

a second section having a mounting hole by means of which a base element of the rear derailleur can be mounted or is mounted on an outside of the second section;

and wherein the retaining bolt (222) is formed with an internal thread into which an external thread at a free end of a thru axle (236) of a rear wheel axle assembly (236) of the bicycle passing through the through opening of the first section is screwable or screwed to fix the mounting element (214) with the retaining bolt (222) to the mounting section (212);

characterized in that in that the base element (274) has a first section having a first coupling formation and a second section having a second coupling formation, wherein the first coupling formation is couplable or coupled to an end region of the retaining bolt (222) projecting outwardly from the mounting opening of the mounting section, and wherein the second coupling formation is radially offset relative to the first coupling formation and is couplable or coupled directly or indirectly to the second section of the retaining element (214) using the mounting opening thereof.

At least one of the first coupling formation and the second coupling formation may be configured as a through opening through which the retaining bolt (222) or a/the mounting bolt (272), respectively, is passable or passed.

At least one of the first coupling formation and the second coupling formation may be configured as a through-opening in the form of an elongated hole (340), through which the retaining bolt or a/the mounting bolt (272), respectively, is passable or passed and which, at least in a pre-assembled state, allows the base element (274) to be pivoted relative to the mounting element (214).

At least one of the first coupling formation and the second coupling formation may be configured as a through opening through which a fastening screw (350) is passable or passed, respectively, which is screwable or screwed into a fastening screw opening of the retaining bolt or of a/the mounting bolt or of a threaded insert received in the retaining bolt (222) or the mounting bolt.

In an embodiment, a rear derailleur for mounting on a bicycle frame (210) of a bicycle, may include:

a base element (274),
a swivel mechanism,
a movable element, and
a chain guide arrangement;
said pivoting mechanism connecting said base element (274) to said movable element, and said chain guide assembly being rotatably connected to said movable element about an axis of rotation;

characterized in that in that the base element (274) has a first section having a first coupling formation and a second section having a second coupling formation, of which the first coupling formation can be coupled or is coupled to a counter-coupling formation coaxial with an axis of rotation of a rear wheel on the bicycle frame or to a coupling element (222) held on the bicycle frame, and forms a first support point for direct or indirect support on the outside of the bicycle frame (210), and of which the second coupling formation is radially offset from the axis of rotation and forms a second support point for direct or indirect support on the bicycle frame (210).

In an embodiment a rear derailleur for coaxial mounting on a bicycle frame (1) of a bicycle with respect to a rear wheel axle, may include:

a base element,
a swivel mechanism,
a movable element, and
a chain guide arrangement;
said pivoting mechanism connecting said base element to said movable element, and said chain guide assembly being rotatably connected to said movable element about an axis of rotation;
wherein the base element comprises a first connection end for coaxial mounting to the bicycle frame (1) with respect to the rear wheel axle and a second connection end for coupling to the pivoting mechanism;
wherein said first connecting end comprises a first arm (22a) and a second arm (22b) spaced apart from each other in the axial direction and adapted for mounting the rear derailleur to an associated mounting section of a rear frame portion of the bicycle frame (1) having a through mounting opening by means of an associated adapter, said adapter having a thread for making a screw connection;
and wherein in a defined premounted state and in a finished mounted state, the first arm (22a) is on an axially inner side of the mounting section and the second arm (22b) is on an axially outer side of the mounting section;

characterized in that the second arm (22b) has a coupling formation (402) which can be or is directly or indirectly brought into engagement with a counter-coupling formation (404) of the adapter premounted to the mounting section or, after positioning of the two arms on both sides of the mounting section, the adapter to be pushed or inserted into the through mounting opening from the axial inner side of the mounting section.

The coupling formation may be configured as an axially protruding coupling projection (402) which is engageable or is engaged in a coupling opening (404) serving as counter-coupling formation of the adapter configured as retaining bolt.

The adapter may be configured as a retaining bolt is inserted or pushed into the through mounting opening from the axial inner side of the mounting section and is axially fixable or fixed on the axial outer side of the mounting section by an associated securing element (406).

In an embodiment, a rear derailleur for coaxial mounting on a bicycle frame (1) of a bicycle with respect to a rear wheel axle, may include:

a base element,
a swivel mechanism, a movable element, and a chain guide arrangement;

said pivoting mechanism connecting said base element to said movable element, and said chain guide assembly being rotatably connected to said movable element about an axis of rotation;

wherein the base element comprises a first connection end for coaxial mounting to the bicycle frame (1) with respect to the rear wheel axle and a second connection end for coupling to the pivoting mechanism;

wherein said first connecting end comprises a first arm (22a) and a second arm (22b) spaced apart from each other in the axial direction and adapted for mounting the rear derailleur to an associated mounting section of a rear frame portion of the bicycle frame (1) having a through mounting opening by means of an associated adapter, said adapter having a thread for making a screw connection;

and wherein in a mounted state, the first arm (22a) is on an axially inner side of the mounting section and the second arm (22b) is on an axially outer side of the mounting section;

characterized in that the base element has a shock overload protection (450, 452; 454, 456; 485; 454, 456; 462, 470, 472) in at least one of the arms or in a portion of the base element having the arms or in an intermediate portion of the base element between a portion of the base element having the arms and a portion of the base element equipped with the pivoting mechanism, which is adapted to respond to a load force exceeding a triggering threshold as a result of a direct or indirect impact action on the base element in order to release an avoidance movement of a portion of the base element equipped with the pivoting mechanism.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system comprising:

a base element of a rear derailleur comprising a first section having a first coupling formation and a second section having a second coupling formation; and a mounting kit comprising:

a mounting element for mounting the base element to a bracket portion of a bicycle frame, the mounting element comprising a first portion and a second portion, wherein the first portion has a through hole associated with a bracket mounting hole of the bracket portion and the through hole is coaxial with the bracket mounting hole when the mounting element is mounted to an inner side of the bracket portion, and the second portion has a base element mounting hole to which the base element of the rear derailleur is mounted to an outer side of the second portion; and a retaining bolt adapted to be mounted to the bracket portion of the bicycle frame, wherein the retaining bolt has an internal thread into which an external thread on a free end of a through axle of a rear wheel axle assembly of a bicycle is screwed to fix the mounting element with the retaining bolt to the bracket portion, the through axle passing through the through hole of the first portion;

wherein the first coupling formation is coupled to an end portion of the retaining bolt projecting outwardly from the bracket mounting hole, the second coupling formation is radially offset from the first coupling formation, and the second coupling formation is coupled to the second portion of the mounting element via the base element mounting hole.

2. The system of claim 1, the mounting element further comprising an adjusting device having at least one adjusting screw for pivoting the mounting element, or at least the second portion, relative to the through axle in a chain tensioning direction when the mounting element is mounted on the bicycle frame.

3. The system of claim 1 further including a mounting bolt for mounting the base element to the mounting element via the base element mounting hole.

4. The system of claim 3, wherein the at least one of the first coupling formation and the second coupling formation defines a through opening through which the retaining bolt or the mounting bolt is passed.

5. The system of claim 4, wherein the retaining bolt has at least one flange portion engaging externally around an edge of the through opening.

6. The system of claim 4 further including a bearing bushing received in the through opening, wherein the bearing bushing is configured, with the mounting bolt, to support axial clamping forces of the tightened mounting bolt and to provide for pivotability of the base element relative to the mounting element.

7. The system of claim 6, wherein any one or both of the first coupling formation or the second coupling formation further comprises an axially projecting coupling projection that is inserted into an associated coupling opening of any one or both of the retaining bolt or the mounting bolt.

8. The system of claim 7, further comprising a fastening screw configured to be screwed into a fastening screw opening of the retaining bolt, or of a mounting bolt, or of a threaded insert accommodated in the retaining bolt or the mounting bolt.

9. The system of claim 8, wherein the through opening is an elongated hole for the fastening screw, the fastening screw allowing the base element to be pivoted relative to the mounting element when in an assembled state.

10. The system of claim 9, further comprising: a spacer configured between the mounting element and the base element, the spacer having a passage through which the mounting bolt extends.

11. The system of claim 10, the base element further comprising a spacer section projection axially relative to the mounting element wherein the spacer section has a passage through which the mounting bolt extends.

12. The system of claim 1, wherein the rear derailleur further comprises:
a swivel mechanism;
a movable element; and
a chain guide assembly;

wherein the swivel mechanism connects the base element to the movable element, and the chain guide assembly is rotatably connected to the movable element about an axis of rotation.

13. A rear derailleur for mounting on a bicycle frame of a bicycle, the rear derailleur comprising:
a base element comprising a first section having a first coupling formation and a second section having a second coupling formation;
a movable element;
a swivel mechanism connecting the base element to the movable element; and
a chain guide assembly rotatably connected to the movable member about an axis of rotation;
wherein the first coupling formation is coupled to a mating coupling formation on the bicycle frame or a retaining bolt held on the bicycle frame, the mating coupling formation coaxial with an axis of rotation of a rear wheel, and the mating coupling formation forms a first support point on the outside on the bicycle frame; and
wherein the second coupling formation is radially offset with respect to the axis of rotation of the rear wheel and forms a second support point on the inside bicycle frame.

14. A rear derailleur for mounting coaxially with a rear wheel axle on a bicycle frame of a bicycle, the rear derailleur comprising:
a base element comprising a first connection end for mounting the rear derailleur to an associated mounting portion of a rear end of the bicycle frame coaxially with respect to the rear wheel axle, and a second connection end for coupling to a swivel mechanism;
the first connection end comprising a first arm and a second arm arranged spaced apart from each other in an axial direction,
at least one of the first arm and the second arm having an impact overload protection adapted to respond to a loading force exceeding a trigger threshold as a result of an impact on the base element to release an avoidance movement of a portion of the base element equipped with the swivel mechanism;
the first connection end having a through mounting opening by means of an associated adapter, the adapter having a thread for making a screw connection;
a movable element;
the swivel mechanism connecting the base element to the movable element; and
a chain guide assembly rotatably connected to the movable member about an axis of rotation;
wherein the first arm is located on an axial inner side of a holder section and the second arm is located on an axial outer side of the holder section when the rear derailleur is installed on the bicycle frame.

15. The rear derailleur of claim 14, the impact overload protection is at least one, or a combination of, an element of reversibly bendable material, a predetermined breaking element, a joint, a snap connection, a latch connection, or a coupling.

16. The rear derailleur of claim 14, the impact overload protection further including one or more markers that facilitates recognition of a target positioning or target orientation or target straightness property.

17. The rear derailleur of claim 14, further comprising:
a first base element part having the first arm and the second arm; and a second base element part that is separate from the base element;

wherein the impact overload protection connects the first arm and the second arm to the second base element part, and the second base element part is released by the impact overload protection in order to detach the second base element part from the first base element part in the event of the loading force exceeds the trigger threshold.

\* \* \* \* \*